(12) United States Patent
Koga et al.

(10) Patent No.: US 6,226,681 B1
(45) Date of Patent: *May 1, 2001

(54) COMMUNICATION TERMINAL AND NETWORK UNIT IN INFORMATION OFFERING SYSTEM, TERMINAL IDENTIFYING INFORMATION SETTING METHOD, INFORMATION OFFERING SYSTEM, AND FIXED-LENGTH CELL TRANSMITTING AND RECEIVING UNIT IN INFORMATION COMMUNICATION SYSTEM

(75) Inventors: Masayuki Koga; Shinichi Ishigaki, both of Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,164

(22) Filed: Nov. 12, 1997

(30) Foreign Application Priority Data

May 9, 1997 (JP) .................................................. 9-119968

(51) Int. Cl.[7] ................................................. G06F 15/16
(52) U.S. Cl. .......................... 709/236; 709/238; 709/245; 709/250
(58) Field of Search .................................. 709/236, 250, 709/245, 238, 225, 220, 203, 201, 222; 370/397, 409, 406

(56) References Cited

U.S. PATENT DOCUMENTS

| | | | |
|---|---|---|---|
| 5,357,508 | * 10/1994 | Le Boudec et al. | 370/58.3 |
| 5,450,399 | * 9/1995 | Sugita | 370/60.1 |
| 5,467,346 | * 11/1995 | Ito et al. | 370/60 |
| 5,583,863 | * 12/1996 | Darr, Jr. et al. | 370/397 |
| 5,627,836 | * 5/1997 | Conoscenti et al. | 370/397 |
| 5,649,108 | * 7/1997 | Spiegel et al. | 370/400 |
| 5,748,632 | * 5/1998 | Honda et al. | 370/399 |
| 5,751,799 | * 5/1998 | Mori | 379/114 |
| 5,859,848 | * 1/1999 | Miura et al. | 370/395 |

* cited by examiner

Primary Examiner—Mehmet B. Geckil
(74) Attorney, Agent, or Firm—Helfgott & Karas, P.C.

(57) ABSTRACT

A communication terminal in an information offering system used through an ATM network providing, for example, multicast connections. The information offering system is equipped with an information offering unit and a network unit accommodating a plurality of communication terminals including the communication terminal through lines and made to offer desired information transmitted from the information offering unit through a virtual path and virtual channel set peculiarly to the information to the communication terminal. The communication terminal comprises an identifying information inserting section for inserting information for identifying one of the communication terminals being the sender as terminal identifying information into data to be transmitted to the information offering unit side and a transmitting section for transmitting the data undergoing the insertion of the terminal identifying information in the identifying information inserting section through the virtual path and the virtual channel. Thus, the service offering side can recognize and identify the service receiving terminal side without using the connection of an ATM virtual channel different from the ATM virtual channel being in the multicast connection.

31 Claims, 62 Drawing Sheets

GFC: GENERIC FLOW CONTROL; NON-USED

VPI, VCI: SET CHANNEL VPI/VCI

PTI: PAYLOAD TYPE IDENTIFIER; SETTING TO 0

CLP: CELL LOSS PRIORITY; SETTING TO 0
(INDICATING "HIGH")

HEC: HEADER ERROR CONTROL

GFC: GENERIC FLOW CONTROL; NON-USED

VPI, VCI: SET CHANNEL VPI/VCI

PTI: PAYLOAD TYPE IDENTIFIER; SETTING TO 0

CLP: CELL LOSS PRIORITY; SETTING TO 0
                              (INDICATING "HIGH")

HEC: HEADER ERROR CONTROL

LEAF NODE IDENTIFIER: LEAF NODE NUMBER(1~255)

GFC: GENERIC FLOW CONTROL; NON-USED

VPI,VCI: SET CHANNEL VPI/VCI

PTI: PAYLOAD TYPE IDENTIFIER; SETTING TO 0

CLP: CELL LOSS PRIORITY;
　　　SETTING TO 0 (INDICATING "HIGH")

HEC: HEADER ERROR CONTROL

LEAF NODE IDENTIFIER: LEAF NODE NUMBER

*1: END BIT: BIT INDICATING FINAL BYTE OF
         LEAF NODE IDENTIFIER AREA

0 : AREA FURTHER CONTINUES

1 : FINAL BYTE OF AREA

GFC: GENERIC FLOW CONTROL; NON-USED

VPI,VCI: SET CHANNEL VPI/VCI

PTI: PAYLOAD TYPE IDENTIFIER, SETTING TO 0

CLP: CELL LOSS PRIORITY; SETTING TO 0
                                (INDICATING "HIGH")

HEC: HEADER ERROR CONTROL

GFC : GENERIC FLOW CONTROL; NON-USED

VPI, VCI : SETTING OF CHANNEL VPI/VCI

PTI : PAYLOAD IDENTIFIER; SETTING TO 5
(INDICATING END-TO-END OAM CELL)

CLP : CELL LOSS PRIORITY; SETTING TO 0 (INDICATING
"HIGH" OF CELL LOSS PRIORITY)

HEC : HEADER ERROR CONTROL

OAM CELL TYPE : 1011 (ADDITIONAL SERVICE CELL)

FUNCTION TYPE : 0010 (AUDIENCE RESEARCH DEMAND CELL)
0011 (AUDIENCE RESEARCH RESPONSE CELL)

FIG. 51

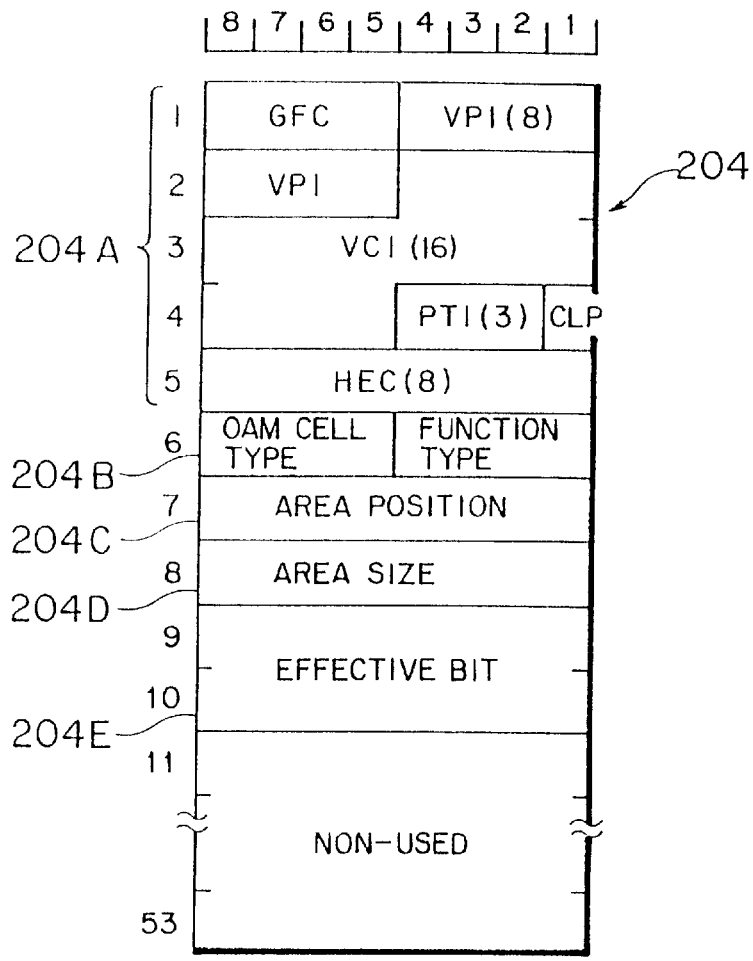

GFC: GENERIC FLOW CONTROL, NON-USED
VPI, VCI: SETTING OF CHANNEL VPI/VCI
PTI: PAYLOAD TYPE IDENTIFIER ; SETTING TO 4
  (INDICATING OAM CELL TO SEGMENT)
CLP: CELL LOSS PRIORITY ; SETTING TO 0 (INDICATING "HIGH" OF CELL
  LOSS PRIORITY)
HEC: HEADER ERROR CONTROL
OAM CELL TYPE : 1111 (SYSTEM INFORMATION CELL)
FUNCTION TYPE : 0001 (LEAF NODE POSITION CHANGE CELL)
AREA POSITION : INDICATING HOW MANY BYTES FROM HEAD OF PAYLOAD
  SECTION LEAF NODE IDENTIFIER AREA IS (0 TO 47)
AREA SIZE : VALUE OF SIZE OF IDENTIFIER AREA EXPRESSED IN BYTE
  (1 TO 48)
EFFECTIVE BIT : EFFECTIVE BIT OF LEAF NODE IDENTIFIER OBJECT AREA
  (LEFT EXAMPLE : WHEN LEAF NODE IDENTIFIER AREA
    ASSUMES 2 BYTES)

GFC: GENERIC FLOW CONTROL ; NON-USED
VPI, VCI : SETTING OF ATM NETWORK UNIT CONTROL VPI/VCI
PTI : PAYLOAD TYPE IDENTIFIER ; SETTING TO 0
CLP: CELL LOSS PRIORITY ; SETTING TO 0 (INDICATING "HIGH" OF CELL LOSS PRIORITY)
HEC: HEADER ERROR CONTROL
REQUEST TYPE : 10000001 (LEAF NODE INFORMATION NOTICE)

COMMUNICATION TERMINAL AND NETWORK UNIT IN INFORMATION OFFERING SYSTEM, TERMINAL IDENTIFYING INFORMATION SETTING METHOD, INFORMATION OFFERING SYSTEM, AND FIXED-LENGTH CELL TRANSMITTING AND RECEIVING UNIT IN INFORMATION COMMUNICATION SYSTEM

BACKGROUND OF THE INVENTION (1) Field of the Invention

The present invention relates to a communication terminal and a network unit for use in an information offering system suitably applicable to an ATM network which provides a multicast connection, for example, in an ATM (Asynchronous Transfer Mode), a terminal identifying information setting method, an information offering system, and a fixed-length cell transmitting and receiving unit for use in an information communication system.

(2) Description of the Related Art

FIG. 73 is an illustration of an information offering or distributing system being one example of multimedia services based upon a broadcast mode. In FIG. 73, an information offering system, generally designated at numeral 100, is composed of a service offering unit 101, an ATM network unit 102, and a plurality of (two in this case) leaf node units 103-1, 103-2 serving as service receiving terminals.

In this system, the service offering unit 101 is connected through a service offering channel 104 to the ATM network unit 102 to transmit desired information through the service offering channel 104, thus offering a service of giving multimedia information.

Furthermore, the ATM network unit 102 is for relaying information through the service channel 104 between the aforesaid service offering unit 101 and the respective leaf node units 103-1, 103-2, and not only controls a transmission line between the service offering unit 101 and the leaf node units 103-1, 103-2 but also manages the service offering operation to the leaf node units 103-1, 103-2.

Still further, the leaf node units 103-1, 103-2 function as service receiving terminals which receives, as a service, the information offer from the service offering unit 101 through, for example, the multicast connection.

In more detail, the service offering unit 101 is made up of a service offer processing section 101a, an ATM control section 101b, a transmission line control section 101c, a service control section 101d, and a storage section 101e.

In this arrangement, the service offer processing section 101a is for the purpose of outputting signals constituting various kinds of service offer information (for example, multimedia information such as pictures, voices and data), while the ATM control section 101b conducts the conversion of various kinds of signals from the service offer processing section 101a into ATM cells and the multiprocessing for channels, and further performs the conversion of ATM cells from the transmission line control section 101c into various kinds of signals and the extraction thereof.

Furthermore, the transmission line control section 101c maps the ATM cell from the ATM control section 101b into a transmission signal and further extracts the ATM cell from a transmission signal from the leaf node unit 103-1, 103-2 sides.

Still further, the service control section 101d serves to control the service offering operation to the leaf node units 103-1, 103-2, whereas the storage section 101e acts to register and manage various kinds of information in the service offering unit 101e, and is provided with a service channel corresponding data storage section 101e-1 for registering the aforesaid various information with the service offering channel correspondence and manages them.

Moreover, in more detail, the ATM network unit 102 is provided with two transmission line control sections 102a, 102b, an ATM switch section 102c, an ATM switch control section 102d, a leaf node control processing section 102e, and a storage section 102f.

The transmission line control section 102a conducts the interface processing (for example, the extraction of an ATM cell from a transmission signal, the mapping of an ATM cell into a transmission signal, and others) of a signal between a service offering unit 101 side line or circuit (the service offering channel 104) and the ATM switch section 102c.

In a similar way, the transmission line control section 102b performs the interface processing of a signal between the leaf node unit 103-1, 103-2 side line (the service offering channel 104) and the ATM switch section 102c.

The ATM switch section 102c switches the ATM cell between the aforesaid transmission line control sections 102a, 102b, while the leaf node control processing section 102d manages the leaf node units 103-1, 103-2 on the basis of control information it gets from the leaf node units 103-1, 103-2 through the transmission line control section 102b and the ATM switch section 102c, and further produces control information to be transmitted to the leaf node units 103-1, 103-2.

Furthermore, the ATM switch control section 102d connects the channel for various services from the service offering unit 101 to the leaf node units 103-1, 103-2 in accordance with an instruction the leaf node control processing section 102e gives.

Still further, the storage section 102f serves to register and manage various information in the ATM network unit 102, and includes leaf node control data 102f-1 for registering user control information corresponding to the respective leaf node units 103-1, 103-2 and ATM switch control data 102f-2 for registering control information for conducting processing to establish connection between the service offering channel 104 and the leaf node units 103-1, 103-2.

Moreover, the leaf node control processing section 102e manages user control information, stored with the leaf node control data 102f-1, on the basis of service control information inputted from the leaf node units 103-1, 103-2.

In this system, each of the leaf node units 103-1, 103-2 comprises a transmission line control section 103a, an ATM control section 103b, a service control section 103c, a service instruction section 103d, and a storage device 103e.

The transmission line control section 103a extracts an ATM cell from a transmission signal coming from the ATM network unit 102, and further maps an ATM cell, to be transmitted to the ATM network unit 102 side, into a transmission signal.

Furthermore, the ATM control section 103b converts ATM cells from the transmission line control section 103a into various signals, and further carries out the conversion of various signals, to be transmitted to the ATM network unit 102 side, into ATM cells.

Still further, the service control section 103c recognizes received multimedia information from the ATM control section 103b and offers a multimedia service to the user in accordance with the kind of signal.

Moreover, the service instruction section 103d converts a demand for a multimedia service set by the user as control information into an ATM cell producing demand and outputs the converted demand to the ATM control section 103b. Incidentally, this demand is sent through control channels 106-1, 106-2, provided separately from VPI/VCI of a transmission signal line (the service offering channel 104), to the leaf node control processing section 102e of the ATM network unit 102.

Still further, the storage section 103e registers and manages various information in the leaf node units 103-1, 103-2, and is equipped with a channel data storage section 103e-1 for registering channel information which is in use in the respective leaf node units 103-1, 103-2.

In the information offering system 100 shown in FIG. 73, with this arrangement, a multicast connection is established through the ATM network unit 102 between the service offering unit 101 and the leaf node units 103-1, 103-2, which allows the two leaf node units 103-1, 103-2 to simultaneously receive the same information offered from the service offering unit 101.

With the increase in the number of leaf node units 103-1, 103-2 getting service offers due to the progress of multimedia services such as a digital broadcast using the ATM based upon the broadcast mode, the preparation of a large number of ATM virtual channels (VPI/VCI; Virtual Path Identifier/Virtual Channel Identifier) constituting the service offering channel 104 becomes necessary, which increases the load on the ATM network.

For this reason, in cases where the service offering unit 101 offers the same information to the leaf node units 103-1, 103-2, it is proposed that the information offer is made through the same VPI/VCI between the service offering unit 101 and the leaf node units 103-1, 103-2.

The leaf node unit 103-2 forwards a demand for an information offer through the ATM network unit 102 to the service offering unit 101. If recognizing the fact that the information required by the leaf node unit 103-2 is the same as the information under the offer to the leaf node unit 103-1, the service offering unit 101 issues an instruction for copy of a cell relating to this information toward the ATM switch section 102c of the ATM network unit 102, thus creating the same information to be transmitted through the same ATM virtual channel (VPI/VCI) to the leaf node units 103-1, 103-2.

In the case of the multimedia service such as a digital broadcast based upon the broadcast mode, there is a tendency toward diversification of additional services, and particularly, a requirement has been made for the transmission of information from the service receiving terminal side to the service offering side.

However, since the service offering unit 101 is in connecting relation through the same ATM virtual channel (VPI/VCI) to the leaf node units 103-1, 103-2 receiving the offer of the same information, even if one leaf node receives an ATM cell, difficulty is encountered to identify the leaf node of the sender, and therefore the user management becomes impossible, which makes it difficult to make the aforementioned interactive or two-way communications.

In addition, in the case of transmitting information from the leaf node units 103-1, 103-2 to the service offering unit 101, although it is also possible to employ an ATM virtual channel for point-to-point connections different from the multicast ATM virtual channel (VPI/VCI), with the increase in the number of leaf node units as mentioned before, the enlargement in the ATM virtual channel (VPI/VCI) the ATM network manages occurs so that the load extremely increases.

Even in the case that, for example, different LANs (Local Area Networks) are coupled to each other through an ATM network so that terminals give and receive multimedia information or the like to/from each other between the LANs, it is desirable that the terminals can recognize each other while suppressing the load on the network.

SUMMARY OF THE INVENTION

The present invention has been developed with a view to eliminating these problems, and it is therefore an object of the present invention to provide a communication terminal in an information offering system, a terminal identifying information setting method, and an information offering system which are capable of establishing interactive communications through the same ATM virtual channel between a service offering side and a plurality of service receiving terminal sides to allow the service offering side to recognize and identify the service receiving terminal sides with no use of an ATM virtual channel (VPI/VCI) different from an ATM virtual channel (VPI/VCI) setting up a multicast connection.

In addition, another object of this invention is to provide a fixed-length cell transmitting and receiving unit in an information communication system which carries out information transmission between terminals placed in different networks, with the fixed-length cell transmitting and receiving unit being capable of performing recognition and identification of a transmission side terminal and further of conducting mutual recognition and identification between reception side terminals in a manner that interactive communication is made through the same ATM virtual channel.

For these purposes, in accordance with the present invention, in an information offering system equipped with an information offering unit for transmitting various information for offer to a communication terminal and a network unit accommodating or covering a plurality of communication terminals through lines or circuits and made to offer desired information transmitted from the information offering unit to the communication terminal through the use of a virtual path and a virtual channel both set peculiarly or uniquely to the information, a communication terminal comprises an identifying information inserting section for inserting information for identifying a communication terminal being the sender (the communication terminal which transmitted the information) as terminal identifying information into data to be transmitted to the information offering unit side and a transmitting section for transmitting the data, into which the terminal identifying information is inserted in the identifying information inserting section, through the use of the virtual path and the virtual channel.

Thus, according to this invention, the terminal identifying information is inserted into the data to be transmitted by the identifying information inserting section and the data including the terminal identifying information is transmitted through the transmitting section, and therefore, the information offering unit can identify the communication terminal and can individually offer an additional service to the user on each communication terminal side, with the result that the enlargement of additional information and the improvement of multimedia service become feasible and the addition of a special function to a fixed-length network becomes unnecessary.

In addition, according to this invention, without utilizing the connection of a virtual channel different from a virtual channel taking a multicast connection in the information offering unit, on the basis of the recognition of the communication terminal from the information offering unit, an interactive communication can be set up through the same channel as a multicast-connected virtual channel between the information offering unit and the communication terminal. Accordingly, irrespective of the increase in the number of the subscribed communication terminals, it is possible to individually offer additional services to users while suppressing the load on the network.

Furthermore, in accordance with this invention, in an information offering system equipped with an information offering unit for transmitting various information for offer to a communication terminal and a network unit accommodating a plurality of communication terminals through lines and made to offer desired information transmitted from the information offering unit to the communication terminal through the use of a virtual path and a virtual channel both set peculiarly to the information, a network unit comprises a plurality of line connection ports provided corresponding to lines between the network unit and the plurality of communication terminals and made to receive data to be transmitted from the communication terminal through the virtual path and the virtual channel to the information offering unit, an identifying information inserting section for identifying the communication terminal being the sender of the data on the basis of whether the plurality of line connection ports are in use or out of use and further for inserting terminal identifying information for the sender into the data, and a transmitting section for transmitting the data, to which the terminal identifying information is given in the identifying information inserting section, through the virtual path and the virtual channel.

Thus, according to this invention, without using a connection of a virtual channel different from a virtual channel being in multicast connection, on the basis of the recognition of the communication terminal by the information offering unit, an interactive communication can be established through the use of the same virtual channel as the multicast-connected virtual channel between the information offering unit and the communication terminals. Accordingly, irrespective of the increase in the number of the subscribed communication terminals, the individual offer of additional services to users is possible while suppressing the load on the network.

In addition, according to this invention, since the terminal identifying information is inserted into the data to be transmitted by the identifying information inserting section and the data is transmitted through the transmitting section, the information offering unit can identify the communication terminal and can individually offer an additional service to the user on each communication terminal side as well as the case mentioned above, with the result that the enlargement of additional information and the improvement of multimedia service become feasible, and the addition of a special function to the communication terminal becomes unnecessary.

Still further, in accordance with this invention, in an information offering system equipped with an information offering unit for offering various information to a communication terminal and a network unit accommodating a plurality of communication terminals and made to offer, of the various information from the information offering unit, information demanded from each communication terminal to that communication terminal through the use of a virtual path and a virtual channel both set peculiarly to that information, there is taken a terminal identifying information setting method comprising a terminal identifying information extracting step of, in the network unit, extracting desired terminal identifying information when receiving a set-up signal from the communication terminal, a response signal producing step of producing a response signal to the set-up signal on the basis of the terminal identifying information extracted in the terminal identifying information extracting step, a response signal transmitting step of transmitting the response signal produced in the response signal producing step to the communication terminal which transmits the set-up signal, and an information notifying step of notifying information included in the set-up signal and the terminal identifying information extracted to the information offering unit.

Accordingly, according to this invention, since the terminal identifying information is set through the terminal identifying information extracting step, the response signal producing step, the response signal transmitting step and the information notifying step, it is possible to easily set the terminal identifying information through the transmission and reception of the set-up signal and the response signal corresponding thereto.

Moreover, in accordance with this invention, in an information offering system equipped with an information offering unit for offering various information to a communication terminal and a network unit accommodating a plurality of communication terminals and made to offer, of the various information from the information offering unit, information demanded from each communication terminal to that communication terminal through the use of a virtual path and a virtual channel both set peculiarly to that information, there is taken a terminal identifying information setting method comprising a set-up signal producing step of, in the communication terminal, producing a set-up signal including preset terminal identifying information, a set-up signal transmitting step of transmitting the set-up signal produced in the set-up signal producing step to the network unit, a registration step of registering the terminal identifying information included in the set-up signal when the network unit receives the set-up signal transmitted in the set-up signal transmitting step, an information notifying step of notifying information included in the set-up signal to the information offering unit when the terminal identifying information is registered in the registration step, and a response signal transmitting step of transmitting a response signal corresponding to the set-up signal to the communication terminal which transmits the set-up signal.

Thus, according to this invention, the terminal identifying information is set through the set-up signal producing step, the set-up signal transmitting step, the registration step, the response signal transmitting step and the information notifying step, it is possible to easily set the terminal identifying information through the transmission and reception of the set-up signal and the response signal corresponding thereto.

Furthermore, in accordance with this invention, in an information offering system comprises an information offering unit for transmitting various information for offer to a communication terminal and a network unit accommodating a plurality of communication terminals through lines and made to offer desired information transmitted from the information offering unit to the communication terminal through the use of a virtual path and a virtual channel both set peculiarly to the information, either the communication terminal or the network unit includes an identifying information inserting section for inserting information for identifying a communication terminal being the sender as terminal identifying information into a fixed-length cell to be transmitted from each communication terminal side through the virtual path and the virtual channel to the information offering unit side, and the information offering unit includes a transmission terminal identifying section for identifying the communication terminal being the sender on the basis of the terminal identifying information inserted into the received fixed-length cell.

Thus, according to this invention, since the identifying information inserting section inserts the terminal identifying information into the data to be transmitted and the transmitting section transmits it, the identification of the communication terminal becomes possible in the information offering unit and it is possible to individually offer additional services to the user on each communication terminal side, with the result that not only the enlargement of the additional service and the improvement of the multimedia service becomes feasible but also the addition of a special function to the fixed-length network becomes unnecessary.

In addition, according to this invention, without utilizing the connection of a virtual channel different from a virtual channel being in a multicast connection in the information offering unit, on the basis of the recognition of the communication terminal from the information offering unit side, an interactive communication can be made through the same channel as a multicast-connected virtual channel between the information offering unit and the communication terminal. Accordingly, irrespective of the increase in the number of the subscribed communication terminals, it is possible to individually offer additional services to users while suppressing the load on the network.

Still further, in accordance with this invention, in an information communication system in which fixed-length cell transmitting and receiving units each accommodating a communication terminal network having an arbitrary communication protocol or rule and connected to at least one communication terminals to each other are coupled to each other through a fixed-length cell network and information communication is carried out by giving a first terminal identifying information conforming with the communication protocol between the communication terminals stored in the two fixed-length cell transmitting and receiving units being in opposed relation to each other, a fixed-length cell transmitting and receiving unit comprises, for converting information transmitted from the communication terminal into a fixed-length cell and for transmitting the fixed-length cell, a first terminal identifying information outputting section for receiving information transmitted from the communication terminal and further for outputting the first terminal identifying information, a second terminal identifying information extracting section for extracting second terminal identifying information conforming with the fixed-length cell network on the basis of the first terminal identifying information from the first terminal identifying information outputting section, a second terminal identifying information inserting section for inserting the second terminal identifying information extracted by the second terminal identifying information extracting section into the converted fixed-length cell, and further comprises, for converting a fixed-length cell received from said communication terminal stored in the opposed fixed-length cell transmitting and receiving unit through said fixed length cell network into information conforming with said communication protocol and for making the desired communication terminal receives the converted information, a third terminal identifying information deriving section for receiving the fixed-length cell from the opposed communication terminal to derive third terminal identifying information conforming with the fixed-length cell network which is included in the fixed-length cell, a fourth terminal identifying information extracting section for extracting fourth terminal identifying information conforming to the communication protocol on the basis of the third terminal identifying information from the third terminal identifying information deriving section, and a fourth terminal identifying information inserting section for inserting the fourth terminal identifying information extracted by the fourth terminal identifying information extracting section into the information after the conversion.

Thus, according to this invention, since the fixed-length cell transmitting and receiving unit is equipped with the first terminal identifying information outputting section, the second terminal identifying information extracting section, the second terminal identifying information inserting section, the third terminal identifying information deriving section, the fourth terminal identifying information extracting section and the fourth terminal identifying information inserting section, which allows the identification of the communication terminal of the sender while establishing the mutual communication between the communication terminals stored in the two opposed fixed-length cell transmitting and receiving units after the conversion of the information into the fixed-length cell, with the result that the easy management of the communication between the communication terminals becomes possible.

BRIEF DESCRIPTION OF THE DRAWINGS

The objects and features of the present invention will become more readily apparent from the following detailed description of the preferred embodiments taken in conjunction with the accompanying drawings in which:

FIG. 51 is an illustration of a cell format of an ATM cell to be transmitted and received in the fifth embodiment of this invention;

Figure 1:
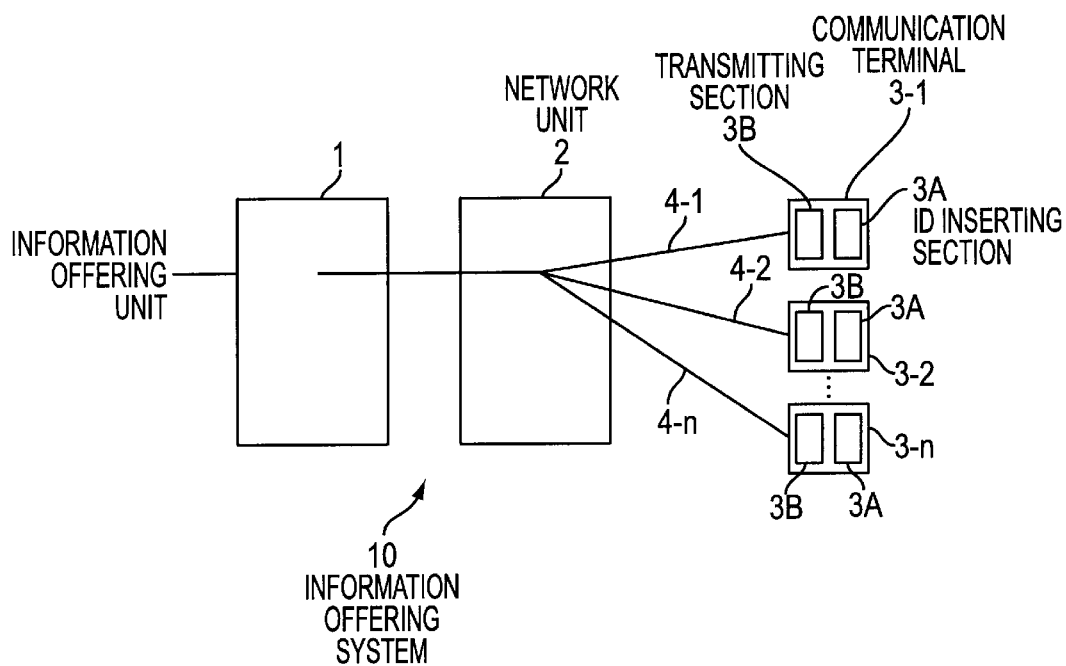
FIG. 1 is a block diagram showing an aspect according to the present invention.

DESCRIPTION OF THE PREFERRED EMBODIMENTS (a) Description of an Aspect of the Present Invention First of all, referring to the drawings, a description will be made hereinbelow of an aspect of the present invention.

FIG. 1 is a block diagram showing an aspect of this invention. In FIG. 1, generally designated at numeral 10 is an information offering system which comprises an information offering unit 1 for transmission of various kinds of information for offer to communication terminals, and a network unit 2 accommodating or covering a plurality of communication terminals 3-1 to 3-n through lines 4-1 to 4-n and made to offer desired information from the information offering unit 1 to the communication terminals 3-1 to 3-n through the use of a virtual path and a virtual channel both set peculiarly or uniquely to information.

In this arrangement, each of the communication terminals 3-1 to 3-n is composed of an identifying information inserting section 3A for inserting information for identifying a communication terminal being the sender as terminal identifying information into data to be transmitted to the information offering unit 1, and a transmitting section 3B for transmitting the data, into which the terminal identifying information is inserted in the identifying information inserting section 3A, through the virtual path and the virtual channel.

In addition, the identifying information inserting section 3A can be arranged to insert the terminal identifying information into fixed-length cell data constituting the aforesaid data, or to insert the terminal identifying information into a non-used area of a header section of a fixed-length cell constituting the aforementioned data. Further, an arrangement of the identifying information inserting section 3A can also be made to insert the terminal identifying information into a fixed-length cell for system maintenance and operation.

Furthermore, the terminal identifying information can also be created as information set peculiarly to each of communication terminals 3-1 to 3-n, or produced as information set peculiarly at every group comprising a plurality of communication terminals 3-1 to 3-n.

Furthermore, the terminal identifying information can be composed of variable-length bit data, or can also be arranged to be variable in accordance with instructions from the information offering unit 1.

Accordingly, according to this invention, since the terminal identifying information can be inserted into data to be transmitted in the identifying information inserting section 3A and transmitted through the transmitting section 3A, the identification of the communication terminals 3-1 to 3-n becomes possible in the information offering unit 1. What's more, it becomes possible to individually offer additional services to the users on the respective communication terminal 3-1 to 3-n sides, with the result that not only the enlargement of the additional service and the improvement of the multimedia service are feasible but also the addition of a special function to the fixed-length network becomes unnecessary.

In addition, according to this invention, without utilizing the connection of a virtual channel different from a virtual channel being in a multicast connection in the information offering unit 1, on the basis of the recognition of the communication terminals 3-1 to 3-n from the information offering unit 1, an interactive communication can be set up through the same channel as a multicast-connected virtual channel between the information offering unit 1 and the communication terminals 3-1 to 3-n. Accordingly, irrespective of the increase in the number of the subscribed communication terminals 3-1 to 3-n, it is possible to individually offer additional services to users while suppressing the load on the network.

Moreover, since the identifying information inserting section 3A can insert the terminal identifying information into a non-used area of a header section of a fixed-length cell constituting the data to be transmitted, even if useful data exists in all pay load portions of the fixed-length cell, the identification of the communication terminals 3-1 to 3-n being the sender of the reception fixed-length cell is possible on the information offering unit 1 side. That is, even if the data band to be transmitted from the communication terminals 3-1 to 3-n enlarges, since the fixed-length cell can be created in a manner that all the pay load portions of the fixed-length cell serve as effective data, simultaneously with the enhancement of the efficiency in converting the transmission data into a cell, the identification of the communication terminals 3-1 to 3-n can be done on the information offering unit 1 side without affecting the offering services, which allows the generalization of the services to which the information offering system 10 according to this invention is applicable.

Furthermore, according to this invention, since the terminal identifying information can be inserted into the fixed-length cell for system maintenance and operation, even on the virtual channel being in multicast operation, the information offering unit 1 can confirm the channel connection between the respective communication terminals 3-1 to 3-n, which allows the maintenance and operation management such as the confirmation of communicating conditions.

Still further, according to this invention, since it is possible to produce information set peculiarly at every group comprising arbitrary communication terminals 3-1 to 3-n, arbitrary grouping having no limitation due to an ATM network unit to be stored becomes possible in terms of the communication terminals 3-1 to 3-n stored in a plurality of network units. Accordingly, the managing and controlling modes for the communication terminals 3-1 to 3-n can arbitrarily be taken, thereby extending the degree of freedom in system designs.

Moreover, according to this invention, since the terminal identifying information inserting mode into the data is variable in accordance with instructions from the information offering unit 1, particularly if there is a need for increasing the quantity of the terminal identifying information because of the increase in number of subscribers, the easy alteration in the information insertion can improve the system expansion.

Figure 2:
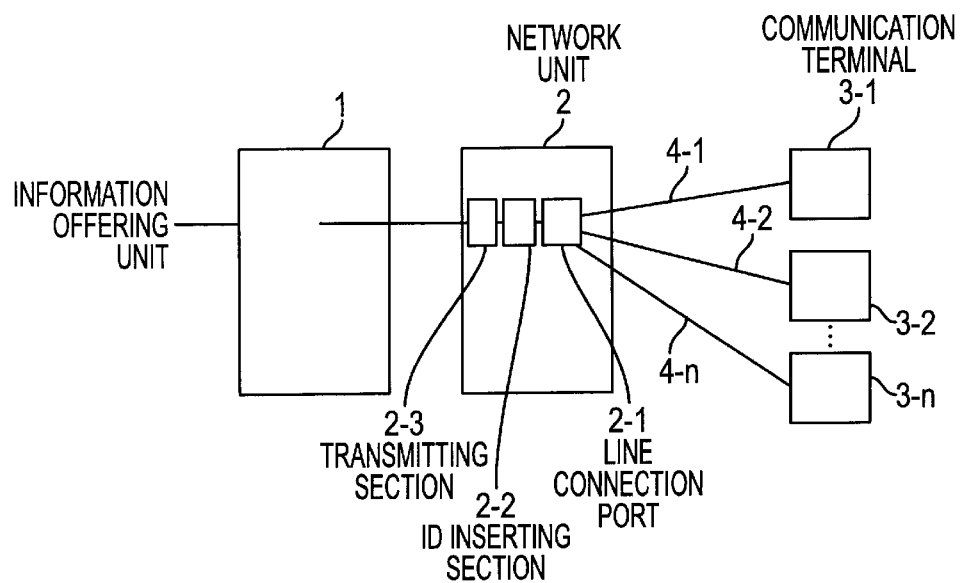
FIG. 2 is a block diagram showing another aspect according to this invention.

FIG. 2 is a block diagram showing another aspect of this invention. In FIG. 2, generally denoted at numeral 10A is an information offering system which includes an information offering unit 1 for transmission of various information for offer to communication terminals, and a network unit 2 incorporating a plurality of communication terminals 3-1 to 3-n through lines and designed to offer desired information from the information offering unit 1 to the communication terminals 3-1 to 3-n through the use of a virtual path and a virtual channel both set peculiarly to information.

The network unit 2 is made up of a line connection port 2-1, an identifying information inserting section 2-2 and a transmitting section 2-3, which will be described below.

The line connection ports 2-1 are provided corresponding to lines 4-1 to 4-n among the plurality of communication terminals 3-1 to 3-n, and are for the purpose of inputting data to be transmitted from the communication terminals 3-1 to 3-n through the virtual path and the virtual channel to the information offering unit 1.

Furthermore, the identifying information inserting section 2-2 identifies the communication terminal being the sender of the aforesaid data on the basis of whether the plurality of line connection ports 2-1 are in use or out of use (in-use/out-of-use conditions), and is for inserting the terminal identifying information on the sender into the data.

Still further, the transmitting section 2-3 serves to transmit the data, to which the terminal identifying information is given in the identifying information inserting section 2-2, through the use of the virtual path and the virtual channel.

The identifying information inserting section 2-2 is composed of an identifying information table for retaining terminal identifying information in correspondence with the port numbers of the line connection ports 2-1, a port state storing section for storing information relating to the in-use/out-of-use conditions of the line connection ports 2-1, a port number extracting section for extracting the number of a line connection port 2-1 to which the aforesaid data is inputted from the port state storing section when the data to the information offering unit 1 is inputted to the line connection port 2-1 being in use, an identifying information extracting section for extracting the terminal identifying information corresponding to the port number extracted in the port number extracting section with reference to the identifying information table, and an inserting section for inserting the terminal identifying information extracted in the identifying information extracting section into the aforesaid data.

Furthermore, the identifying information inserting section 2-2 can be arranged to insert the terminal identifying information into a data section of a fixed-length cell constituting the data, or arranged to inserting the terminal identifying information into a non-used area of a header section of a fixed-length cell organizing the data, or arranged to put the terminal identifying information in a fixed-length cell for system maintenance and operation.

Still further, the foregoing terminal identifying information can be information set peculiarly to each of the communication terminals, or information representative of the communication terminal it possesses, or information set peculiarly at every communication terminal group comprising the communication terminals.

Moreover, the foregoing terminal identifying information can be of the type comprising variable-length bit data, and the network unit 2 according to this invention can also be designed to change the inserting condition of the terminal identifying information into the aforesaid data in accordance with instructions from the information offering unit 1.

Thus, in the network unit 2 of the information offering system 10A according to this invention, the terminal identifying information is inserted into the data to be transmitted in the identifying information inserting section 2-2 and the information inserted data is transmitted through the transmitting section 2-3, and therefore, it becomes possible to identify the communication terminals 3-1 to 3-n in the information offering system, and as in the case of the above-mentioned arrangement, it is possible to individually offer the additional services to the users on the communication terminal 3-1 to 3-n sides, whereupon the requirement for the addition of a special function to the communication terminals 3-1 to 3-n is eliminable in addition to the fact that the enlargement of the additional service and the improvement of the multimedia service are possible.

Moreover, since the identifying information inserting section 2-2 can insert the terminal identifying information into a non-used area of a header section of a fixed-length cell constituting the data to be transmitted, even if useful data exists in all pay load portions of the fixed-length cell, the identification of the communication terminals 3-1 to 3-n being the sender of the reception fixed-length cell is possible on the information offering unit 1 side. That is, since, regardless of the enlargement of the data band for the transmission from the communication terminals 3-1 to 3-n, the fixed-length cell can be made in a state that all the pay load portions of the fixed-length cell serve as effective data, simultaneously with the enhancement of the efficiency in converting the transmission data into a cell, the identification of the communication terminals 3-1 to 3-n can be conducted on the information offering unit 1 side without affecting the offering services, which allows the generalization of the services to which the information offering system 10A according to this invention is applicable.

Furthermore, according to this invention, the terminal identifying information can be of the type indicative of the communication terminals 3-1 to 3-n its own network unit 2 stores, and hence, the management and control of the respective communication terminals 3-1 to 3-n can be facilitated in such a manner as to lessen the managing and controlling data for the communication terminals 3-1 to 3-n in the information offering unit 1 and the network unit 2.

Still further, according to this invention, without utilizing the connection of a virtual channel different from a virtual channel being in a multicast connection in the information offering unit 1, on the basis of the recognition of the communication terminals 3-1 to 3-n from the information offering unit 1, an interactive communication can be set up through the same channel as a multicast-connected virtual channel between the information offering unit 1 and the communication terminals 3-1 to 3-n. Accordingly, irrespective of the increase in the number of the subscribed communication terminals 3-1 to 3-n, it is possible to individually offer additional services to users while suppressing the load on the network.

Furthermore, according to this invention, since the terminal identifying information can be inserted into the fixed-length cell for system maintenance and operation, even on the virtual channel being in multicast operation, the information offering unit 1 can confirm the channel connection between the respective communication terminals 3-1 to 3-n, which allows the maintenance and operation management such as the confirmation of communicating conditions.

Still further, according to this invention, since information can be set peculiarly at every group comprising arbitrary communication terminals 3-1 to 3-n, arbitrary grouping having no limitation due to an ATM network unit to be contained becomes possible in terms of the communication terminals 3-1 to 3-n stored in a plurality of network units. Accordingly, the managing and controlling modes for the communication terminals 3-1 to 3-n can arbitrarily be taken, thereby extending the degree of freedom in system designs.

Moreover, according to this invention, since the terminal identifying information inserting condition into the data is changeable in accordance with instructions from the information offering unit 1, particularly if there is a need to increase the quantity of the terminal identifying information because of the increase in number of subscribers, owing to the easy change in the information insertion, the system expansion can improve.

Figure 3:
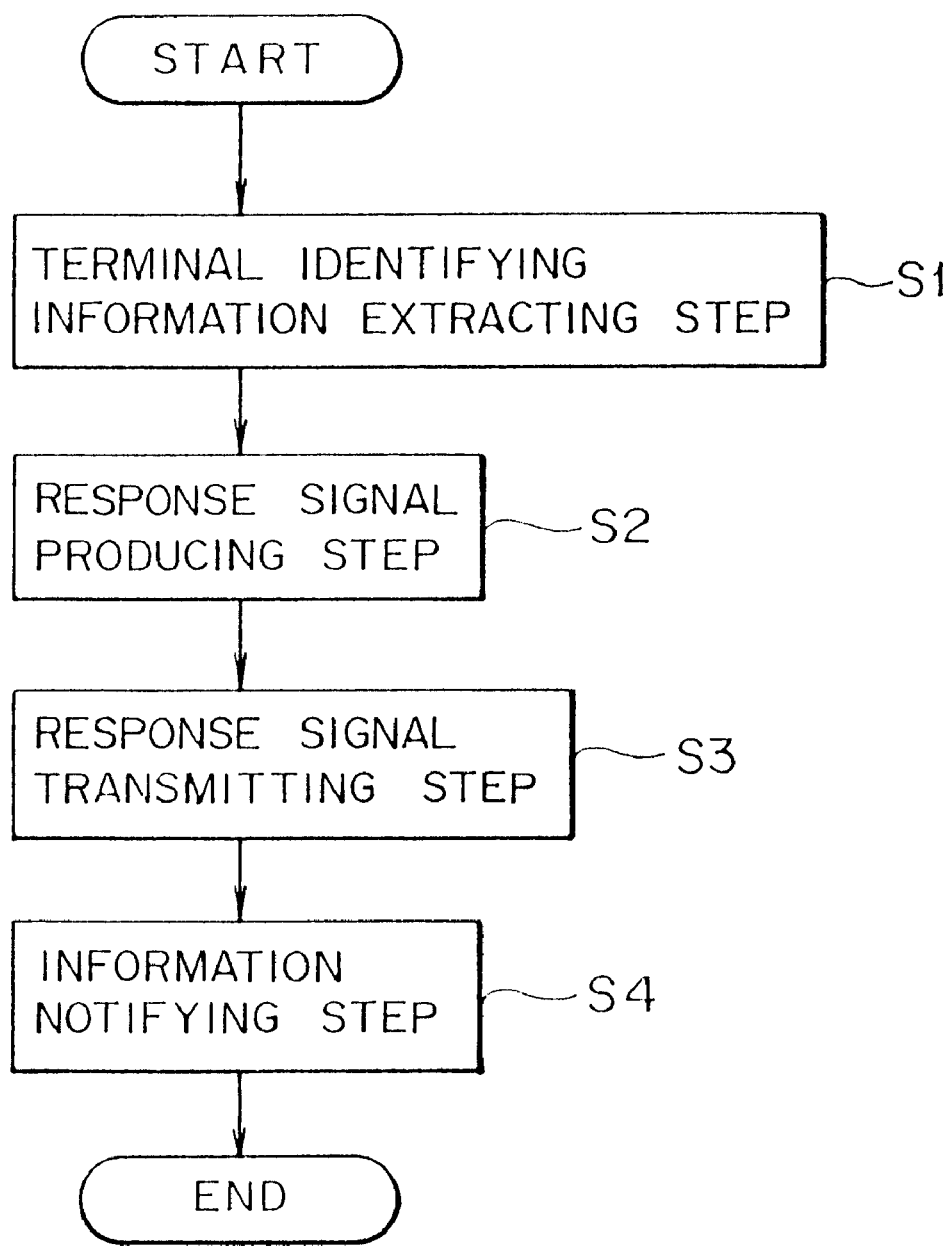
FIG. 3 is a flow chart useful for describing a further aspect of this invention.

FIG. 3 is an illustration of a further aspect of this invention. In an information offering system, as shown in FIG. 3, the setting of terminal identifying information is based upon a method comprising the following steps S1 to S4. In this case, the information offering system is composed of an information offering unit for transmission of various kinds of information to communication terminals, and a network unit incorporating a plurality of communication terminals and made to offer, of the various information from the information offering unit, the information demanded from each communication terminal to that communication terminal through the use of a virtual path and a virtual channel both set peculiarly to information.

That is, in a terminal identifying information extracting step S1, when receiving a set-up signal from the communication terminal, the network unit extracts desired terminal identifying information, and in a response signal producing step S2, it creates a response signal corresponding to the set-up signal on the basis of the terminal identifying information extracted in the terminal identifying information extracting step S1.

Subsequently, in a response signal transmitting step S3, the response signal created in the response signal producing step S2 is transmitted to the communication terminal which transmitted the aforesaid set-up signal, and in an information notifying step S4, information included in the set-up signal and the terminal identifying information extracted is communicated with the information offering unit.

Accordingly, according to this invention, in a manner that the terminal identifying information is set through the terminal identifying information extracting step S1, the response signal producing step S2, the response signal transmitting step S3 and the information notifying step S4, it is possible to easily set the terminal identifying information through the transmission and reception of the set-up signal and the corresponding response signal.

Figure 4:
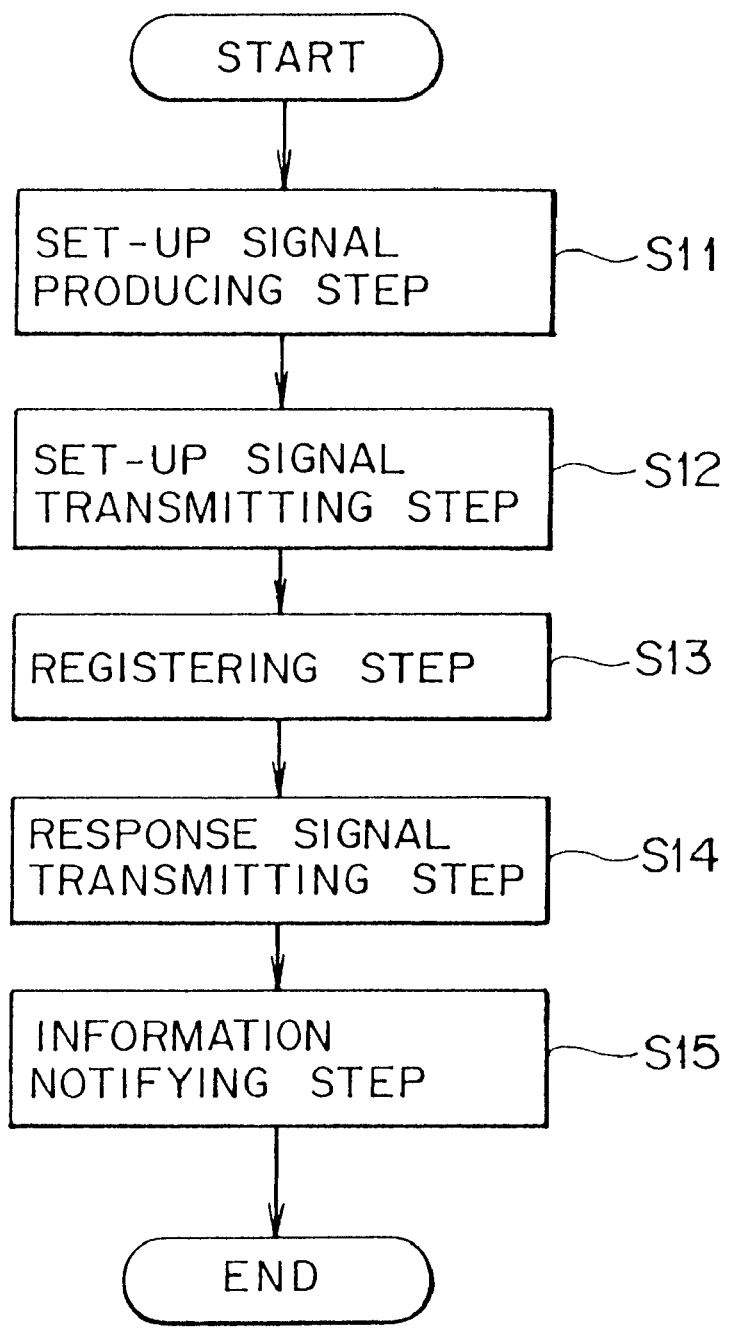
FIG. 4 is a flow chart available for explaining a further aspect of this invention.

Furthermore, FIG. 4 is an illustration of a further aspect of this invention. In an information offering system, as shown in FIG. 4, the setting of terminal identifying information is based upon a method comprising the following steps (S11 to S15). In this case, the information offering system is composed of an information offering unit for transmission of various kinds of information to communication terminals, and a network unit accommodating a plurality of communication terminals and made to offer, of the various information from the information offering unit, the information demanded from each communication terminal to that communication terminal through the use of a virtual path and a virtual channel both set peculiarly to information.

That is, in a set-up signal producing step S11, a set-up signal including preset terminal identifying information is produced in a communication terminal 1, and in a set-up signal transmitting step S12, the set-up signal produced in the set-up signal producing step S11 is transmitted to the network unit.

Following this, in a registration step S13, when receiving the set-up signal transmitted in the set-up signal transmitting step S12, the network unit registers the terminal identifying information included in the set-up signal.

After this, in a response signal transmitting step S14, when the terminal identifying information is registered in the registration step S13, a response signal corresponding to the aforesaid set-up signal is given to the communication terminal which transmitted the set-up signal, and in an information notifying step S15, the information included in the set-up signal is notified to the information offering unit.

Thus, according to this invention, since the terminal identifying information is set through the set-up signal producing step S11, the set-up signal transmitting step S12, the registration step S13, the response signal transmitting step S14 and the information notifying step S15, it is possible to easily set the terminal identifying information through the transmission and reception of the set-up signal and the response signal corresponding thereto.

Figure 5:
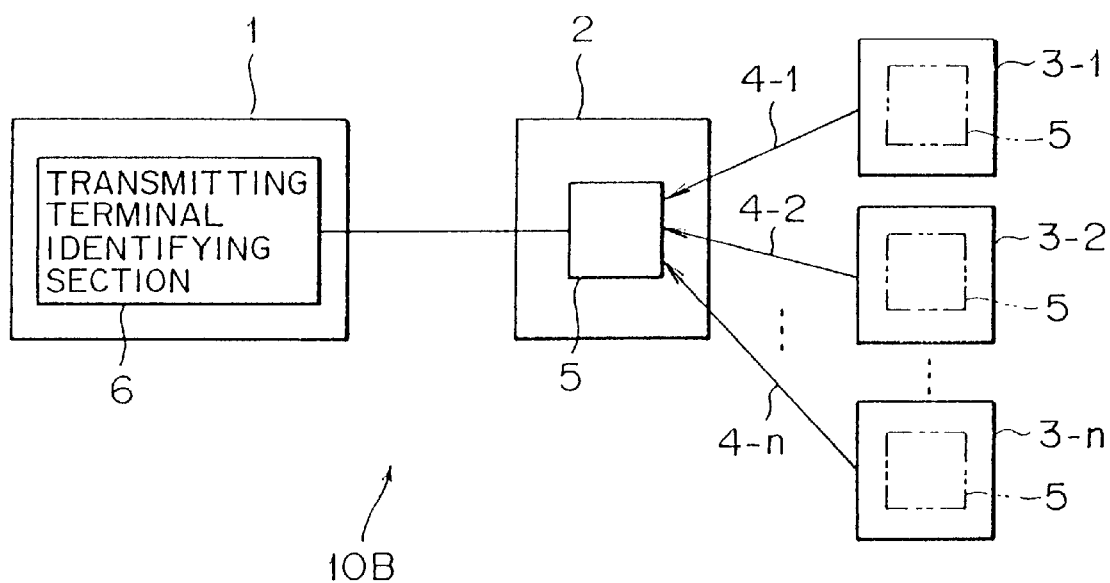
FIG. 5 is a block diagram showing a further aspect of this invention.

Still further, FIG. 5 is a block diagram showing a further aspect of this invention. In FIG. 5, generally depicted at numeral 10B is an information offering system comprising an information offering unit 1 for transmitting various information for offer to communication terminals, and a network 2 accommodating a plurality of communication terminals 3-1 to 3-n through lines 4-1 to 4-n and made to offer desired information from the information offering unit 1 to the communication terminals 3-1 to 3-n through the use of a virtual path and a virtual channel both set peculiarly to information.

In this information offering system 10B according to this invention, either the communication terminals 3-1 to 3-n or the network unit 2 is equipped with an identifying information inserting section 5 which inserts, as the terminal identifying information, information for identifying any one of the communication terminals 3-1 to 3-n being the sender into a fixed-length cell to be transmitted from each of the communication terminals 3-1 to 3-n through the virtual path and the virtual channel to the information offering unit 1 side.

In addition, the information offering unit 1 is provided with a transmission terminal identifying section 6 which identifies any one of the communication terminals 3-1 to 3-n being the sender on the basis of the aforesaid terminal identifying information inserted into the received fixed-length cell.

In this case, as a high-rank (host) unit of the network unit 2, at least one high-rank network unit can be provided which can store a plurality of network units 2, and the data from each of the communication terminals 3-1 to 3-n can be transmitted through the network unit 2 and the high-rank network unit to the information offering unit 1.

Furthermore, in this case, the high-rank network unit can be arranged to transmit the aforesaid terminal identifying information included in the data from the network unit 2 after the conversion into identifying information the high-rank network unit manages. In addition, the high-rank network unit or the network unit 2 can be arranged to peculiarly set the aforesaid terminal identifying information at every communication terminal group comprising arbitrary communication terminals 3-1 to 3-n.

Thus, according to this invention, since the terminal identifying information can be inserted into data to be transmitted in the identifying information inserting section 5 and transmitted through a transmitting section, the identification of the communication terminals 3-1 to 3-n becomes possible in the information offering unit 1 and it becomes possible to individually offer additional services to the users on the respective communication terminal 3-1 to 3-n sides, with the result that not only the enlargement of the additional service and the improvement of the multimedia service are feasible but also the addition of a special function to the fixed-length network becomes unnecessary.

In addition, according to this invention, with no use of the connection of a virtual channel different from a virtual channel being in a multicast connection in the information offering unit 1, on the basis of the recognition of the communication terminals 3-1 to 3-n from the information offering unit 1, an interactive communication can be set up through the same channel as a multicast-connected virtual channel between the information offering unit 1 and the communication terminals 3-1 to 3-n. Accordingly, irrespective of the increase in the number of the subscribed communication terminals 3-1 to 3-n, it is possible to individually offer additional services to users while suppressing the load on the network.

Furthermore, according to this invention, since, as a high-rank unit of the network unit 2, at least one high-rank network unit is provided which can store a plurality of network units 2, and the data from each of the communication terminals 3-1 to 3-n is transmitted through the network unit 2 to the information offering unit 1, it is possible to enhance the system expansion.

Still further, according to this invention, since the high-rank network unit can convert the terminal identifying information included in the data from the network unit 2 into the identifying information to be managed in the high-rank network unit before transmission thereof, on the information offering unit 1 side, it is possible to set as a control unit a communication terminal 3-1 to 3-n group made by the collection of arbitrary communication terminals 3-1 to 3-n, thereby facilitating the management and control of the respective communication terminals 3-1 to 3-n.

Figure 6:
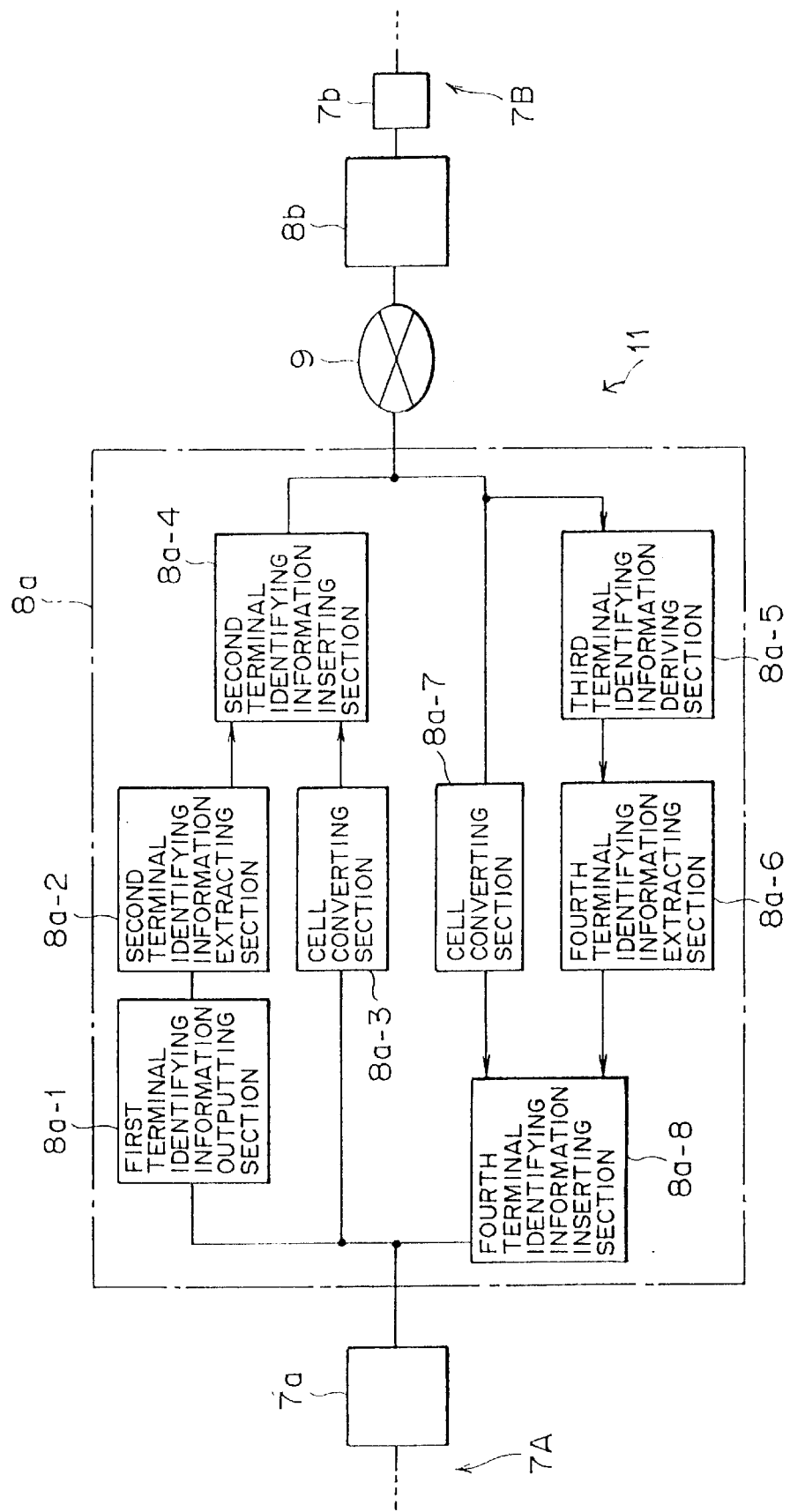
FIG. 6 is a block diagram showing a further aspect of this invention.

Moreover, FIG. 6 is a block diagram showing a further aspect of this invention. In FIG. 6, generally signified at numeral 11 is an information communication system in which fixed-length cell transmitting and receiving units 8a, 8b are coupled to each other in a state a fixed-length cell network 9 is interposed therebetween and each of the fixed-length cell transmitting and receiving units 8a, 8b has an arbitrary communication protocol and at least one communication terminals 7a, 7b store communication terminal networks 7A, 7B which are in a connecting relation to each other.

With this arrangement, in the information communication system 11, an information communication can be made between the communication terminals 7a, 7b stored in the two opposed fixed-length cell transmitting and receiving units 8a, 8b in a manner that first terminal identifying information is given according to the communication protocol.

Because the fixed-length cell transmitting and receiving units 8a, 8b can have the same arrangement, the following description will be made about the function of only the fixed-length cell transmitting and receiving unit 8a.

The fixed-length cell transmitting and receiving unit 8a is composed of a first terminal identifying information outputting section 8a-1, a second terminal identifying information extracting section 8a-2, a cell converting section 8a-3, a second terminal identifying information inserting section 8a-4, a third terminal identifying information deriving section 8a-5, a fourth terminal identifying information extracting section 8a-6, a cell converting section 8a-7, and a fourth terminal identifying information inserting section 8a-8.

Of these sections, the first terminal identifying information outputting section 8a-1 receives information coming from the communication terminal 7a and outputs the aforesaid first terminal identifying information. The second terminal identifying information extracting section 8a-2 extracts second terminal identifying information conforming with the fixed-length cell network 9 on the basis of the first terminal identifying information from the first terminal identifying information outputting section 8a-1.

Furthermore, the cell converting section 8a-3 converts information coming from the communication terminals 3-1 to 3-n into a fixed-length cell, while the second terminal identifying information inserting section 8a-4 inserts the second terminal identifying information extracted in the second terminal identifying information extracting section 8a-2 into the fixed-length cell after the conversion.

The fixed-length cell undergoing the insertion of the second terminal identifying information is transmitted through the fixed-length cell network 9 to the fixed-length cell transmitting and receiving unit 8b.

Still further, the third terminal identifying information deriving section 8a-5 receives the fixed-length cell from the opposed communication terminal 7b and fetches third terminal identifying information, while the fourth terminal identifying information extracting section 8a-6 extracts fourth terminal identifying information conforming with the aforesaid communication protocol on the basis of the third terminal identifying information from the third terminal identifying information deriving section 8a-5.

Moreover, the cell converting section 8a-7 acts to convert a fixed-length cell received through the fixed-length cell network 9 from the communication terminal 7b stored in the opposed fixed-length cell transmitting and receiving unit 8b into information conforming to the foregoing communication protocol, while the fourth terminal identifying information inserting section 8a-8 is for inserting the fourth terminal identifying information extracted in the fourth terminal identifying information extracting section 8a-6 into the converted information.

The information subjected to the insertion of the fourth terminal identifying information can be received by the communication terminal 7a at its request.

The above-mentioned fixed-length cell transmitting and receiving unit 8a (8b) of the information communication system according to this invention can further have an identifying information table retaining information about the corresponding relation between the first terminal identifying information and the second terminal identifying information or between the third terminal identifying information and the fourth terminal identifying information.

Furthermore, the second terminal identifying information inserting section 8a-4 can be arranged to insert the aforesaid second terminal identifying information into a data section of a fixed-length cell constituting the foregoing data, or arranged to insert the terminal identifying information into a non-used area of a header section of a fixed-length cell constituting the data.

In addition, the second terminal identifying information can be information set peculiarly at every communication terminal 7a (7b) or information set peculiarly at every communication terminal group comprising a plurality of communication terminals 7a (7b), or can also be based on variable-length bit data.

Thus, according to this invention, since the fixed-length cell transmitting and receiving unit 8a or 8b is equipped with the first terminal identifying information outputting section 8a-1, the second terminal identifying information extracting section 8a-2, the second terminal identifying information inserting section 8a-4, the third terminal identifying information deriving section 8a-5, the fourth terminal identifying information extracting section 8a-6, and the fourth terminal identifying information inserting section 8a-8, and hence the identification of the communication terminal 7a or 7b being the sender becomes feasible while the conversion of the information into a fixed-length cell and the mutual communication are made between the communication terminals 7a, 7b stored in the two opposed fixed-length cell transmitting and receiving units 8a, 8b, which permits easy management of the communication between the respective communication terminals 7a, 7b.

Embodiments of the present invention will be described hereinbelow with reference to the drawings.

(b) Description of First Embodiment

Figure 7:
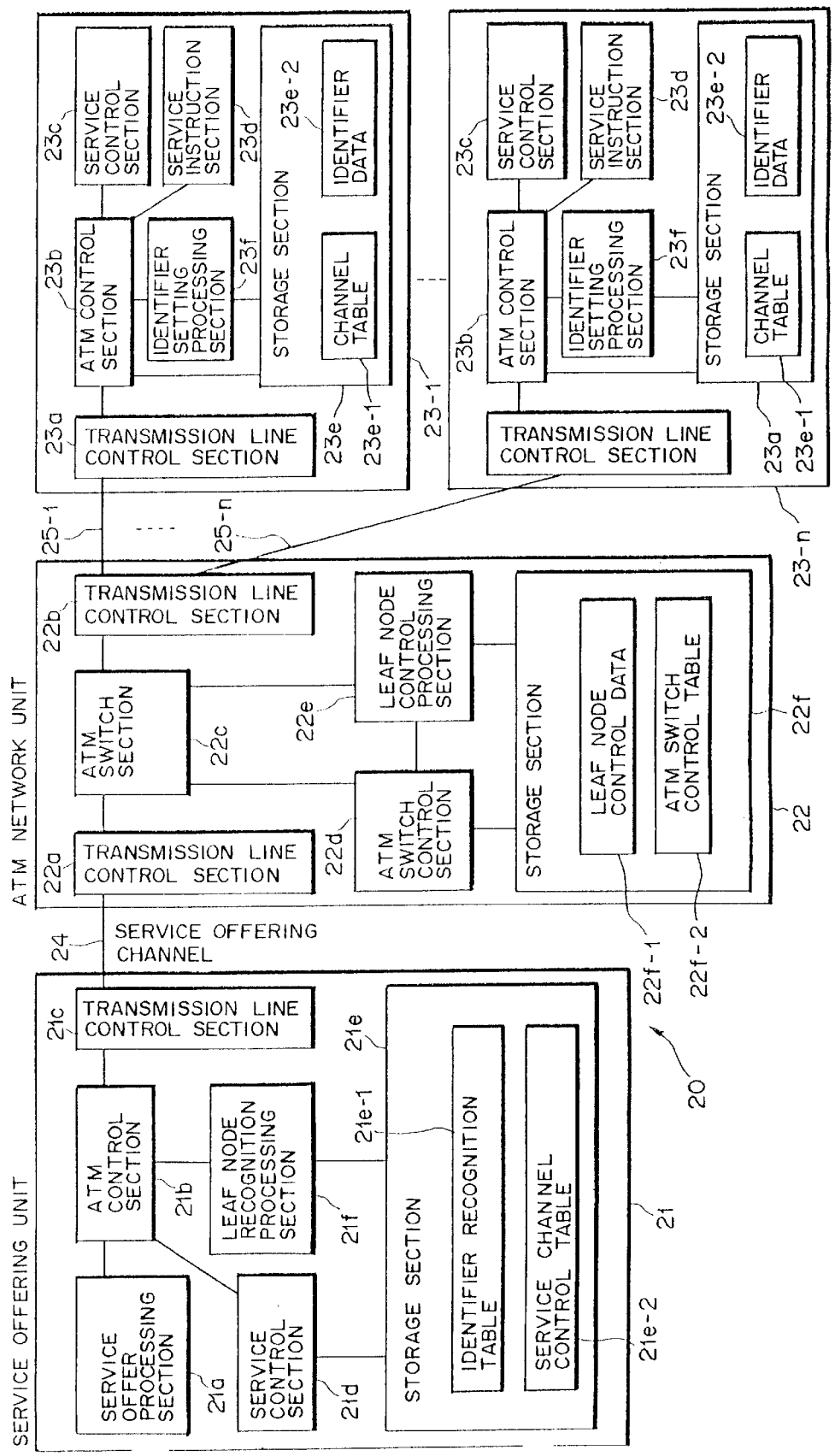
FIG. 7 is a block diagram showing an information offering system according to a first embodiment of this invention.

FIG. 7 is a block diagram showing an information offering system according to a first embodiment of this invention. As well as the above-described system 100 shown in FIG. 73, the information offering system, generally designated at numeral 20, is also capable of offering, for example, multimedia information through a multicast connection and further of establishing the communication of information from the service receiving terminal side to the service offering side through the use of the same VPI/VCI as the VPI/VCI through which the service offering side assumes the multicast connection to the service receiving terminal side.

That is, the information offering system 20 according to the first embodiment carries out the information offer based upon the broadcast mode through the multicast connection and performs the interactive communication through the use of the multicast-connected lines, and is provided with a service offering unit 21, an ATM network unit 22, and a plurality of (in this case, n) leaf node units 23-1 to 23-n serving as service receiving terminals.

The service offering unit 21 is in connection (for example, PVC (Permanent Virtual Channel) connection) through a service offering channel 24 to the ATM network unit 22, and offers a service of giving information by transmitting desired information through this service offering channel 24. In other words, the service offering unit 21 functions as an information offering unit to transmit various information for offer to the leaf node units 23-1 to 23-n.

The ATM network unit 22 is in connection through the service offering channel 24 to the service offering unit 21, and further is in connection through lines 25-1 to 25-n (service offering channel 24) to the respective leaf node units 23-1 to 23-n, thus controlling the transmission line between the service offering unit 21 and the leaf node units 23-1 to 23-n and managing the leaf node units 23-1 to 23-n.

That is, the ATM network unit 22 stores the plurality of leaf node units 23-1 to 23-n through the lines 25-1 to 25-n, and functions as a network unit to offer the desired information from the service offering unit 21 through the VPI/VCI set peculiarly to information to the leaf node units 23-1 to 23-n.

The leaf node units 23-1 to 23-n acting as communication terminals get as a service the information offer from the service offering unit 21, for example, through the multicast connection, and makes a communication of information to the service offering unit 21.

For instance, in the case that the service offering unit 21 offers the same information to n leaf node units 23-1 to 23-n, for the offer of information, the multicast connection is set up between the service offering unit 21 and the leaf node units 23-1 to 23-n through the use of the same ATM virtual channel (VPI/VCI).

As will be mentioned later, the sender identifying information is added to the information to be transmitted from the leaf node units 23-1 to 23-n, and therefore, even in the case of using the same VPI/VCI between the service offering unit 21 and the leaf node unit 23-1 to 23-n, the reception side service offering unit 21 is capable of identifying any one of the leaf node units 23-1 to 23-n which is the sender of information.

For example, in the information offering system 20 according to the first embodiment, in the case that the service offering unit 21 transmits information about carrying out a questionnaire through the same VPI/VCI to the leaf node units 23-1 to 23-n in a broadcast mode, even during the transmission of the information about carrying out this questionnaire (in the middle of reproducing a program in the leaf node units 23-1 to 23-n), the service offering unit 21 can successively receive the results of the questionnaire from the leaf node units 23-1 to 23-n, thus allowing immediate counting-up of the results of the questionnaire in the service offering unit 21 side.

Figure 73:
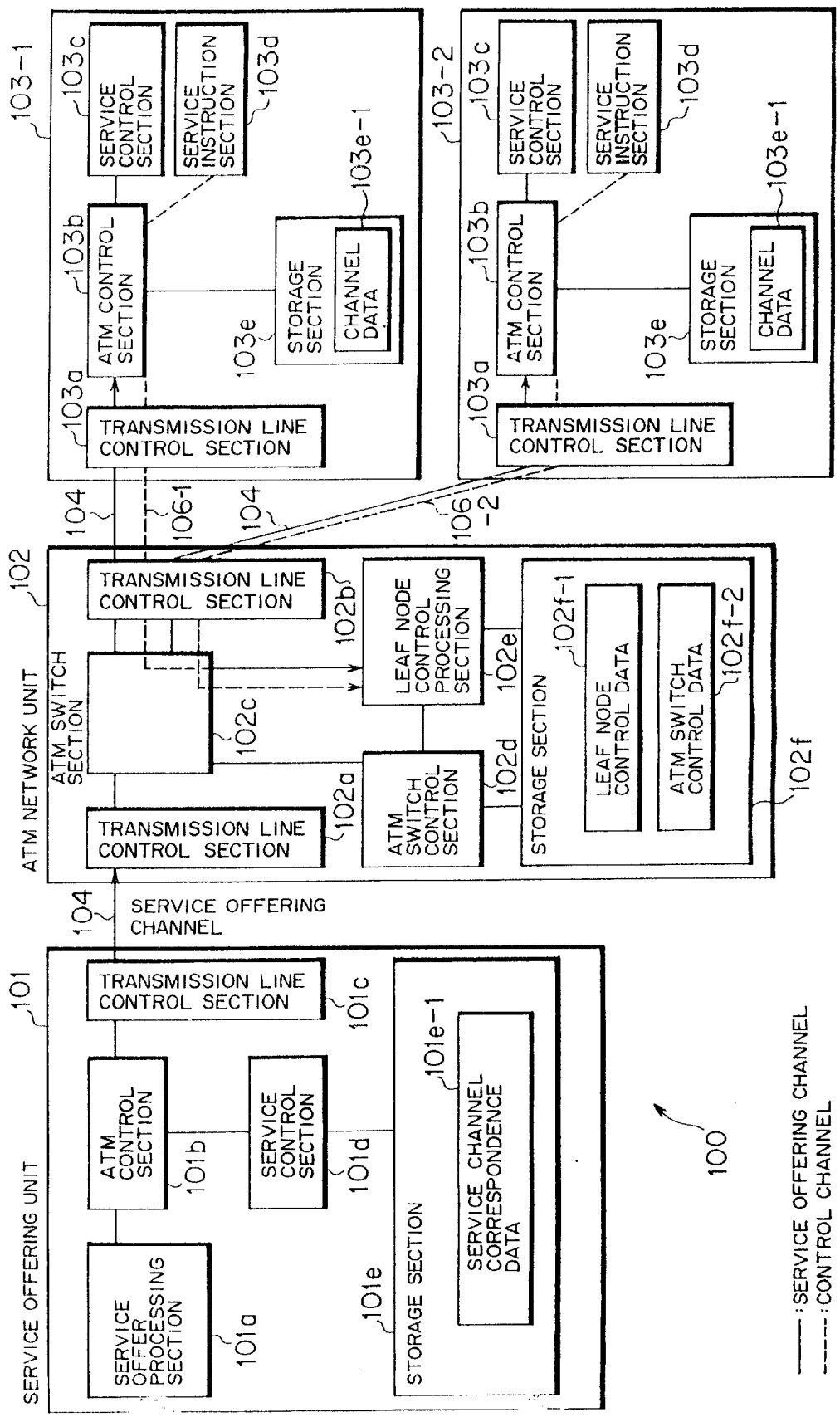
FIG. 73 is a block diagram showing a prior information offering system being one example of multimedia services based upon a broadcast mode.

In more detail, the service offering unit 21 comprises a service offer processing section 21a, an ATM control section 21b, a transmission line control section 21c and a service control section 21d which are substantially similar to those shown in FIG. 73, and includes a storage section 21e.

The service offer processing section 21a outputs signals constituting various information (for example, multimedia information such as pictures, voices and data) for the service offer, while the ATM control section 21b conducts the conversion of various signals from the service offer processing section 21a into an ATM cell and the multiprocessing of channels, and further performs the conversion of an ATM cell from the transmission line control section 21c into various signals and the extraction thereof.

The transmission line control section 21c maps the ATM cell from the ATM control section 21b into a transmission signal and transmits it through the service control channel 24, and further extracts the ATM cell from the transmission signal from the leaf node unit 23-1 to 23-n sides.

Figure 14:
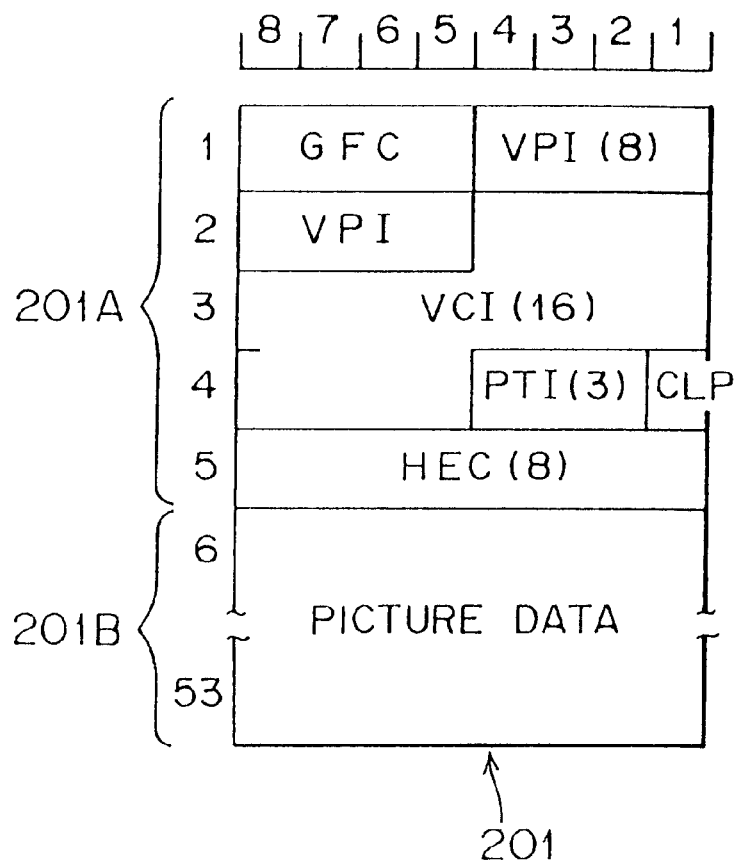
FIGS. 14 to 18 are illustrations of cell formats of an ATM cell to be transmitted and received in the information offering system according to the first embodiment of this invention.
Figure 15:
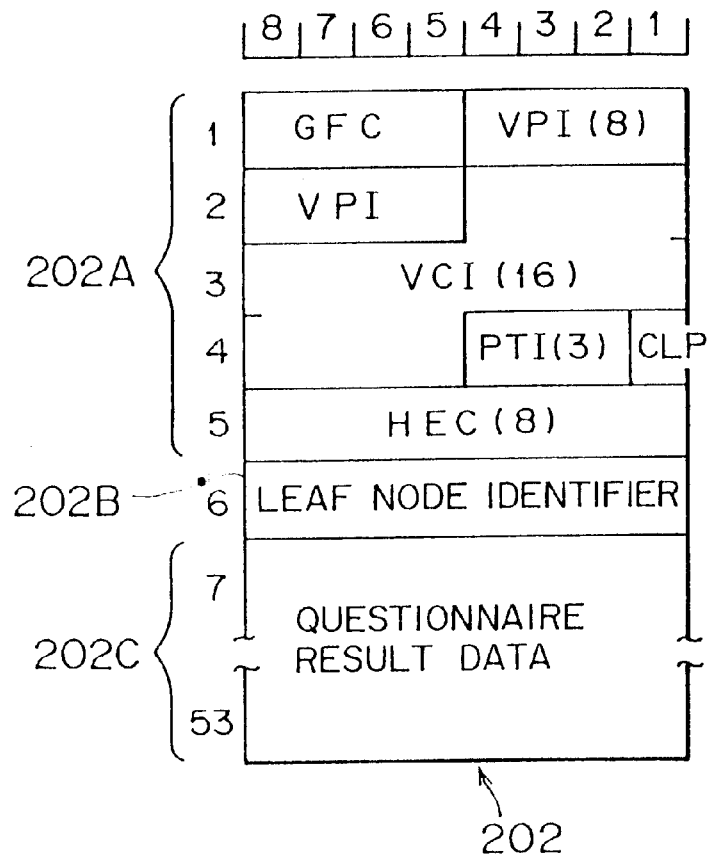

For instance, in the service offering unit 21, in transmitting picture data as multimedia information, the ATM control section 21b produces an ATM cell 201 as shown in FIG. 14, and the transmission line control section 21c gives a leaf node identifier 202B to an ATM cell 202 extracted from the transmission signal as shown in FIG. 15.

The ATM cell 201 shown in FIG. 14 has a 5-byte header area 202A and a 48-byte data area 201B subsequent to this header area 202A, whereas the ATM cell 202 shown in FIG. 15 has 5-byte header area 202A, a 1-byte leaf node identifier area 202B following the header area 202A, and a 47-byte data area 202C following the leaf node identifier area 202B.

For example, when transmitting information about carrying out a questionnaire from the service offering unit 21 through the service offering channel 24 to a plurality of leaf node units 23-1 to 23-n, the data area 201B of the ATM cell 201 is composed of the data (picture data or sound data) relating to the practice of that questionnaire.

Furthermore, the data area 202C of the ATM cell 202 to be transmitted from the leaf node units 23-1 to 23-n to the service offering unit 21 is organized with the contents of the questionnaire results due to the input by the users of the leaf node units 23-1 to 23-n.

Figure 8:
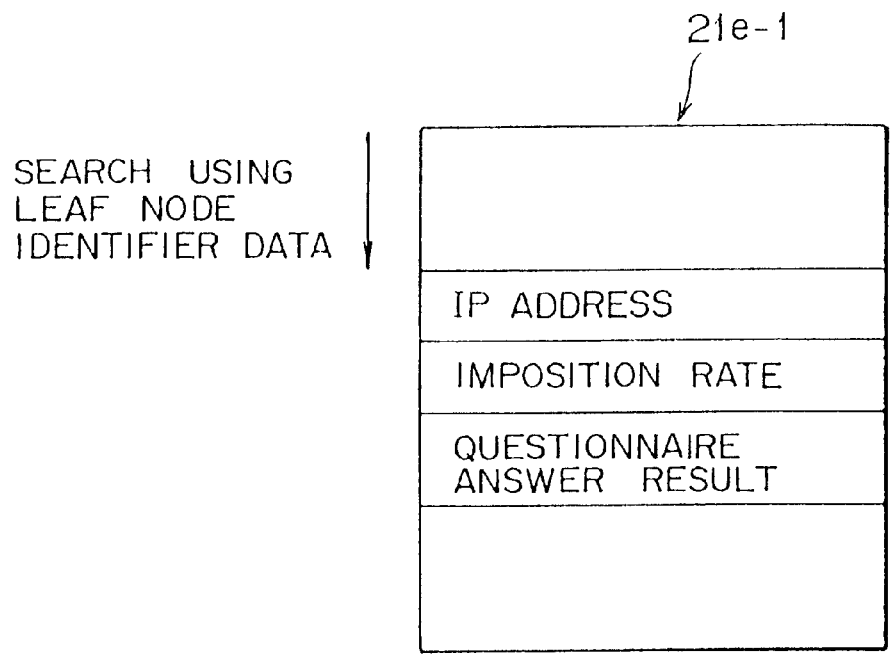
FIGS. 8 and 9 show arrangements of principal portions of a service offering unit in the first embodiment of this invention.
Figure 9:
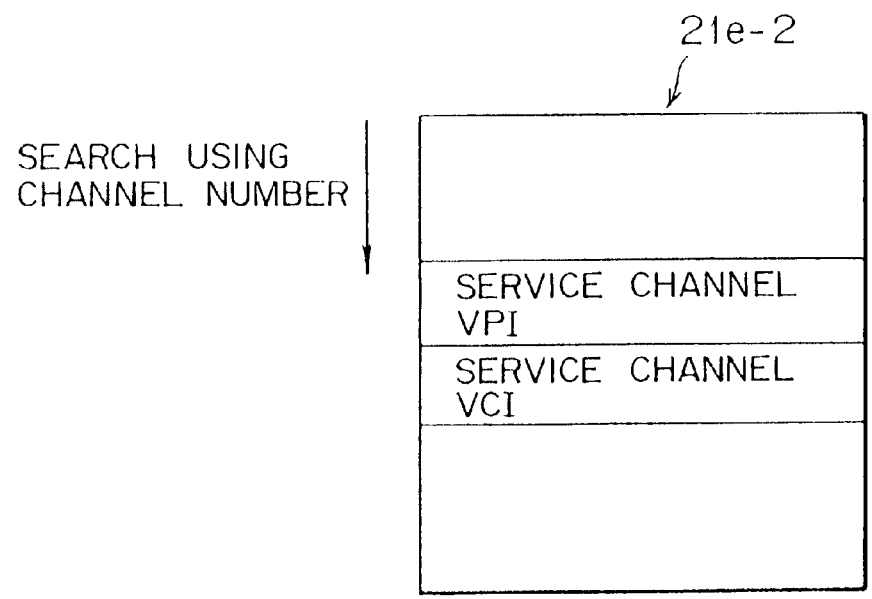

Still further, the storage section 21e is for registering and managing various multimedia information in the service offering unit 21, and is equipped with an identifier recognition table 21e-1 exemplified in FIG. 8 and a service channel control table 21e-2 exemplified in FIG. 9.

In this case, the identifier recognition table 21e-1 is for registration of information (for example, information about IP (Internet Protocol) address, imposition rate and questionnaire results) relating to the leaf node units 23-1 to 23-n with the correspondence with the leaf node number being an identifier registered on each of the leaf node units 23-1 to 23-n, whereas the service channel control table 21e-2 is for the registration of VPI/VCI information about the aforesaid various multimedia information with the correspondence with a service-offering channel (a channel through which the user selects the service to be offered) and is for the management thereof.

Furthermore, the service control section 21c refers to the aforementioned service channel control table 21e-2 to extract the VPI/VCI corresponding to the channel number (an identification number by which the user selects the service to be offered), and offers desired information through this VPI/VCI to the leaf node units 23-1 to 23-n.

In addition, a leaf node recognition processing section 21f identifies and recognizes the leaf node units 23-1 to 23-n on the basis of the identification information about the leaf node units 23-1 to 23-n given to the information transmitted from the leaf node units 23-1 to 23-n, and further registers and updates the contents of the identifier recognition table 21e-1 on the basis of the information from the recognized and identified leaf node units 23-1 to 23-n.

Incidentally, in the leaf node recognition processing section 21f, in a manner of indexing information with the aforesaid leaf node numbers, it is possible to extract the information on each of the leaf node units 23-1 to 23-n retained in the identifier recognition table 21e-1.

Furthermore, more specifically, the ATM network unit 22 is made up of two transmission line control sections 22a, 22b, an ATM switch section 22c, an ATM switch control section 22d, a leaf node control processing section 22e, and a storage section 22f.

The transmission line control section 22a is designed to conduct interface processing (for example, the extraction of an ATM cell from a transmission signal, a mapping operation of an ATM cell into a transmission signal, and others) of a signal between the service offering channel 24 and the ATM switch section 22c, and similarly, the transmission line control section 22b is made to perform interface processing of a signal between the lines 25-1 to 25-n and the ATM switch section 22c.

Incidentally, the transmission line control section 22b is provided with line connection ports (not shown) for the physical connection between the aforesaid lines 25-1 to 25-n and the ATM network unit 22, with different port numbers being given to the ports connected to the lines 25-1 to 25-n, respectively.

In other words, these line connection ports are provided corresponding to the lines 25-1 to 25-n between the plurality of leaf node units 23-1 to 23-n, and the data to be transmitted are inputted from the leaf node units 23-1 to 23-n to the service offering unit 21 through the use of the same VPI/VCI as the VPI/VCI for the transmission from the ATM network unit 22 to the respective leaf node units 23-1 to 23-n.

The ATM switch section 22c takes the charge of switching an ATM cell between the aforesaid transmission line control sections 22a, 22b, while the leaf node control processing section 22d manages the leaf node units 23-1 to 23-n on the basis of control information obtained from the leaf node units 23-1 to 23-n through the transmission line control section 22b and the ATM switch section 22c, and further creates control information to be sent to the leaf node units 23-1 to 23-n.

The ATM switch control section 22d operates the ATM switch section 22c in accordance with instructions from the leaf node control processing section 22e to control the connection and disconnection of the channels for various services coming from the service offering unit 21 to/from the leaf node units 23-1 to 23-n, and further updates the contents of an ATM switch control table 22f-2.

For the multicast connection between the service offering unit 21 and the leaf node units 23-1 to 23-n, the ATM switch control section 22d issues an instruction to the ATM switch section 22c for the copy of information inputted from the service offering unit 21 through the service offering channel 24, thereby producing the same information to be transmitted through the same VPI/VCI to the leaf node units 23-1 to 23-n.

Figure 10:
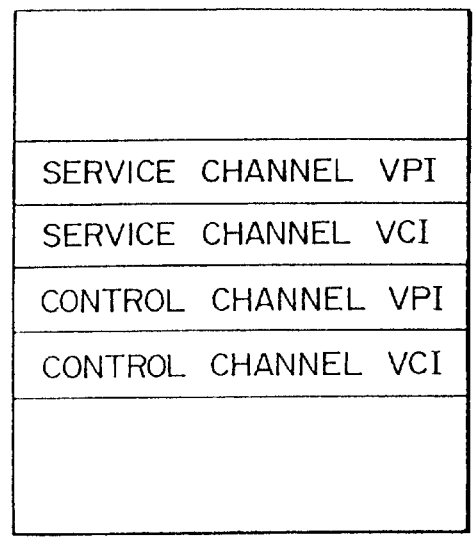
FIGS. 10 and 11 illustrate arrangements of principal portions of an ATM network in the first embodiment of this invention.
Figure 11:
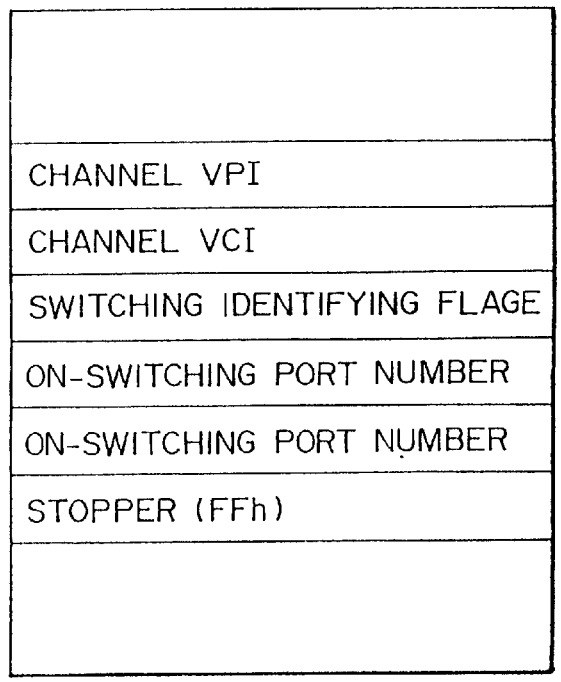

The storage section 22f is for registering and managing various information in the ATM network unit 22, and for example, has leaf node control data 22f-1 shown in FIG. 10 and an ATM switch control table 22f-2 shown in FIG. 11.

The leaf node control data 22f-1 shown in FIG. 10 stores data to be used for the channel connection control in the ATM network unit 22 for the leaf node units 23-1 to 23-n that is, stores the service channel VPI/VCI and control channel VPI/VCI on each of the port numbers corresponding to the lines 25-1 to 25-n connected to the leaf node units 23-1 to 23-n which are currently on the reception of the service offer.

More specifically, by indexing the leaf node control data 22f-1 with the port numbers corresponding to the aforesaid lines 25-1 to 25-n, the values of the VPI, VCI of the service channel and the values of VPI, VCI of the control channel, which are currently on the service offer reception, are extractable in terms of each of the leaf node units 23-1 to 23-n.

Furthermore, the ATM switch control table 22f-2 shown in FIG. 11 records the information to be used for executing the switching control in the ATM network unit 22, that is, stores a switching identifying flag at every VPI/VCI of the service offering channel 24, an on-switching port number, and a stopper (FFh).

More specifically, in a manner of indexing the ATM switch control table 22f-2 with VPI. VCI of the service offering channel 24, the object service channel 24 and the port number under the cross connection are extracted, thereby identifying the leaf node units 23-1 to 23-n which are on the reception of information through the service offering channel 24.

The aforesaid switching identifying flag is indicative of whether or not the object VPI/VCI is in connection to the leaf node units, while the on-switching port number is representative of the line connection port of the own network unit 22 which is on the connection.

The leaf node control processing section 22e manages, on the basis of service control information inputted from the leaf node units 23-1 to 23-n, user control information recorded with the leaf node control data 22f-1 of the storage section 22f.

Moreover, each of the leaf node units 23-1 to 23-n is composed of a transmission line control section 23a, an ATM control section 23b, a service control section 23c, a service instruction section 23d, a storage section 23e and an identifier setting processing section 23f.

The transmission line control section 23a extracts an ATM cell from a transmission signal from the ATM network unit 22, and further maps an ATM cell to be transmitted to the ATM network unit 22 side into a transmission signal.

The ATM control section 23b performs the conversion of an ATM cell from the transmission line control section 23a into various signals while conducting the conversion of various signals to be transmitted to the ATM network unit 22 side into an ATM cell, with the converted signals being transmitted through the transmission line control section 23a and the lines 25-1 to 25-n.

Furthermore, at the transmission of the ATM cell after the conversion of the various signals to be transmitted to the ATM network unit 22 side into the ATM cell, the ATM control section 23b is made to perform the insertion processing of a leaf node identifier (leaf node number) through the identifier setting processing section 23f, which will be described later, to add to the converted ATM cell the leaf node identifier serving as the terminal identifying information of the sender.

The service control section 23c recognizes the reception multimedia service information coming from the ATM control section 23b and offers a multimedia service to the user according to the kind of signal.

The service instruction section 23d converts a demand for the multimedia service, the user sets, as control information into an ATM cell producing demand and outputs it to the ATM control section 23b.

Figure 12:
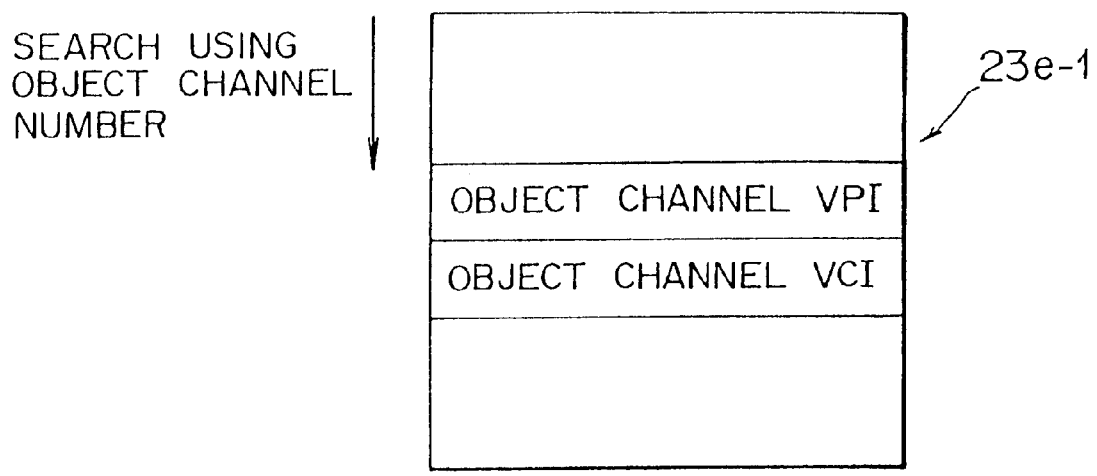
FIGS. 12 and 13 are illustrations of arrangements of principal portions of a leaf node unit in the first embodiment of this invention.
Figure 13:
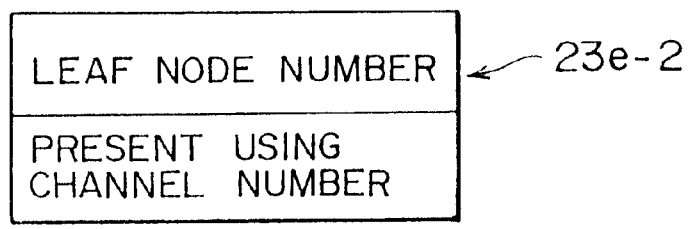

The storage section 23e registers and manages various information on the leaf node units 23-1 to 23-n, and is composed of, for example, a channel table 23e-1 shown in FIG. 12 and identifier data 23e-2 shown in FIG. 13.

More specifically, the channel table 23e-1 is for retrieving the VPI/VCI value of the channel presently permitting the service using the respective leaf node units 23-1 to 23-n, and records the VPI/VCI value of the object service channel 24 in corresponding relation to the channel number.

On the other hand, the identifier data 23e-2 shown in FIG. 13 is peculiar to each of the leaf node units 23-1 to 23-n, and comprises information for identifying its own leaf node unit and information for showing the number of the channel being currently in use.

Furthermore, the identifier setting processing section 23f refers to the aforesaid identifier data 23e-2 according to an ATM cell transmission notice from the ATM control section 23b in each of the leaf node units 23-1 to 23-n to set as terminal identifying information the leaf node numbers peculiar to the leaf node units 23-1 to 23-n in a leaf node identifier area of an ATM cell.

For example, the leaf node numbers set in the identifier setting processing section 23f is, as shown in FIG. 15, located in a header section of the ATM cell 202 to be transmitted to the service offering unit 21, i.e., the leaf node identifier area 202B between the header area 202A and the data area 202C.

Thus, the identifier setting processing section 23f and the storage section 23e perform a function as an identifying information inserting section to inserting the information for identifying the leaf node units 23-1 to 23-n being the senders as terminal identifying information into the data to be transmitted to the service offering unit 21.

When the leaf node numbers are set in this identifier setting processing section 23f, a transmission demand for the ATM cell 202 is issued toward the ATM control section 23b, and hence, it is mapped into a transmission signal in the transmission line control section 23a and then transmitted.

That is, the ATM control section 23b and the transmission line control section 23a performs a function as a transmitting section to transmit the data (ATM cell), into which the leaf node numbers are inserted in the identifier setting processing section 23f, through the use of the VPI/VCI of the service offering channel 24.

Incidentally, although being composed of 1-byte information, it is also possible that the leaf node identifier area 202B of the ATM cell 202 shown in FIG. 15 is arranged as variable bit data. That is, the information quantity of the leaf node identifier serving as the terminal identifying information is variable.

Figure 16:
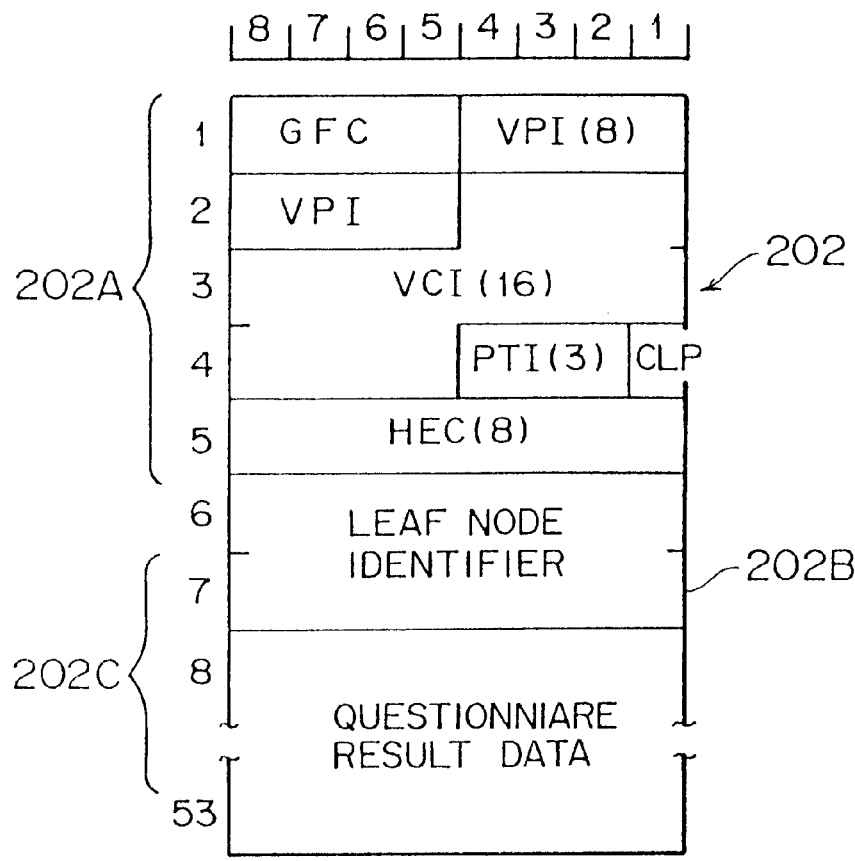

For example, as shown in FIG. 16, the leaf node identifier area 202B between the header area 202A and the data area 202C (46 bytes) can be one-or-more-byte, i.e., plural-byte information (for instance, 2 bytes). Whereupon, it is possible to insure a leaf node identifier area size suitable for the number of leaf node units. In other words, it is possible to cope with the increase in the number of leaf node units 23-1 to 23-n under control of the service offering unit 21.

Figure 17:
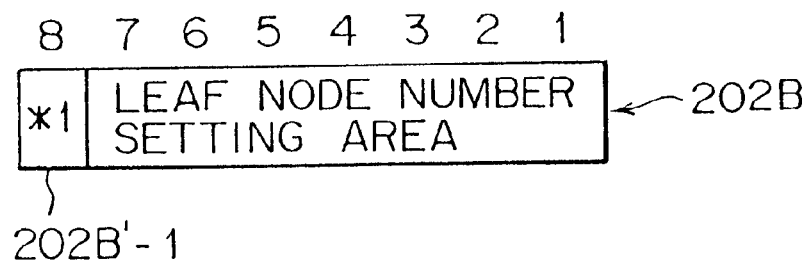

In this case, for example, as shown in FIG. 17, information indicative of whether or not that byte position is the end position organizing the leaf node identifier area 202B is added to the final bit (bit at the left-end position) 202B'-1 of each byte in the aforesaid plural-byte leaf node identifier area 202B.

More specifically, bit information "1" indicative of that fact is given to the left-end bit 202B'-1 of the final byte constituting the leaf node identifier area 202B, whereas bit information "0" is put in the left-end bit of each of bytes other than the final byte.

Figure 18:
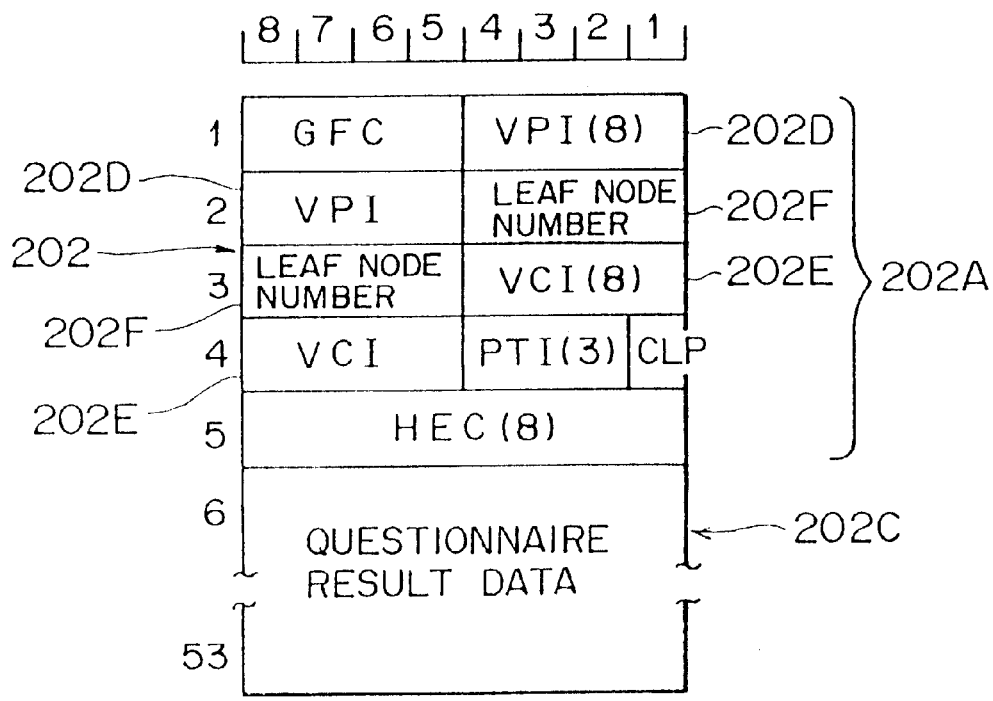

Furthermore, in terms of the ATM cell 202 to be transmitted from the leaf node units 23-1 to 23-n, for example, as shown in FIG. 18, the leaf node number can also be inserted as the terminal identifying information into a non-used area of the header section of a fixed-length cell constituting the aforesaid data.

In more detail, in the identifier setting processing section 23f, the VPI is set in an area (1 byte) designated at reference mark 202D in FIG. 18, while the VCI is set in an area (1 byte) denoted at reference mark 202E in the same illustration, and a 1-byte area 202F between the area 202D and the area 202E is used for the leaf node identifier and the leaf node number is put therein, and hence, the leaf node units 23-1 to 23-n can transmit additional information without affecting the pay load portion of a transmission cell.

Accordingly, if employing the cell format shown in FIG. 18, even if the useful data exist in all the pay load portions, the service offering unit 21 side can identify each of the leaf node units 23-1 to 23-n being the sender of the received ATM cell.

Particularly, in the case of transmitting data with a broad band from the leaf node units 23-1 to 23-n, it is possible to use a non-used area of a header section of the ATM cell as the leaf node identifier area in a state where all the areas of the pay load section of the ATM cell are effective, which allows the identification of the leaf node units 23-1 to 23-n in the service offering unit 21 side without affecting the offering service.

In the information offering system 20 according to the first embodiment of this invention, with the above-mentioned arrangement, as will be described below, the respective leaf node units 23-1 to 23-n can receive the multimedia service they require from the service offering unit 21, and further they can transmit additional information to the service offering unit 21.

More specifically, in cases where each of the leaf node units 23-1 to 23-n receives the offer of multimedia service from the service offering unit 21, a demand for the multimedia service the user of each of the leaf node units 23-1 to 23-n sets through the service instruction section 23d is transmitted through the ATM control section 23b and the transmission line control section 23a to the network unit 22 using an ATM cell converted as control information including channel information.

On receiving the demand from the leaf node units 23-1 to 23-n, the ATM network unit 22 conducts the multicast connection processing between the service offering unit 21 and the leaf node units 23-1 to 23-n so that the plurality of leaf node units 23-1 to 23-n can concurrently get the same information offered from the service offering unit 21.

Figure 19:
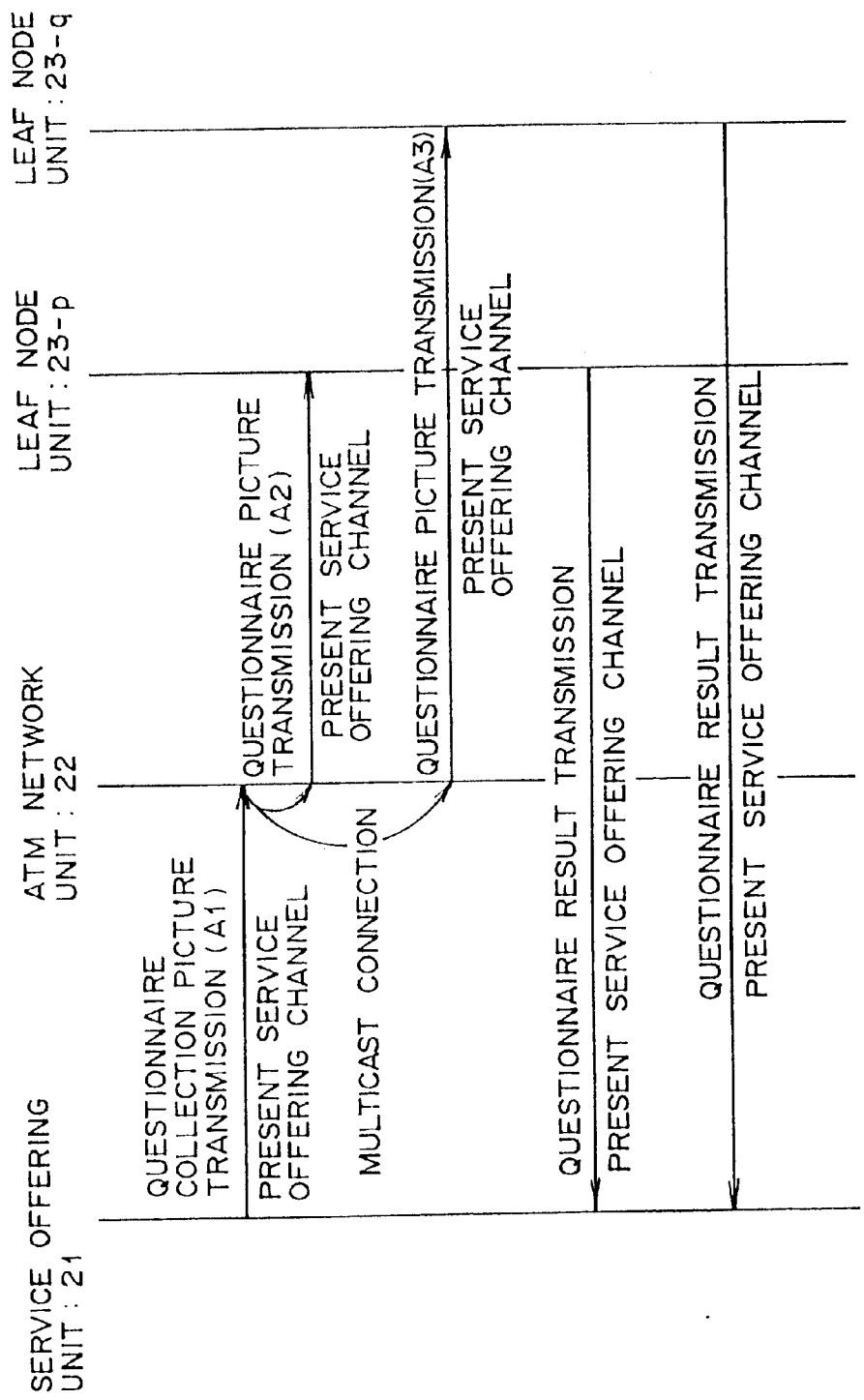
FIG. 19 is a signal sequence illustration useful for describing an operation of the first embodiment of this invention.

For instance, as shown in FIG. 19, in the case of a questionnaire collection picture (A1) on the same channel, if a plurality of (for example, 2) leaf node units 23-p, 23-q (p, q=an integer from 1 to n, p≠q) make a demand for the offer of information, the multicast connection is established between the ATM network unit 22 and the aforesaid leaf node units 23-p, 23-q.

Whereupon, the leaf node units 23-p, 23-q can simultaneously receive the questionnaire collection picture (A1) from the service offering unit 21 through the same channel (VPI/VCI, the present service offering channel) due to the relay by the ATM network unit 22 (A2, A3).

In addition, the leaf node units 23-p, 23-q can transmit additional information to the service offering unit 21 concurrently with receiving information from the service offering unit 21. In other words, in the information offering system 20, the interactive communication can be done while identifying the sender of the signal transmitted and received between the service offering unit 21 and a plurality of leaf node units 23-1 to 23-n.

For instance, when receiving an ATM cell for a questionnaire collection picture, the leaf node units 23-p, 23-q output the questionnaire collection picture ATM cell 201 (see FIG. 14) through the transmission line control section 23a and the ATM control section 23b to the service control section 23c. Thereafter, desired multimedia information constituting the aforesaid questionnaire collection picture is reproduced on a display (not shown) or the like under control of the service control section 23c.

After studying the questionnaire contents reproduced through the service control section 23c, the user sets the answer to this questionnaire and then gives an instruction for transmission of the answer result to the questionnaire. Therefore, the service instruction section 23d converts the demand for the transmission of the questionnaire answer result as control information into an ATM cell producing demand and outputs it to the ATM control section 23b.

Figure 20:
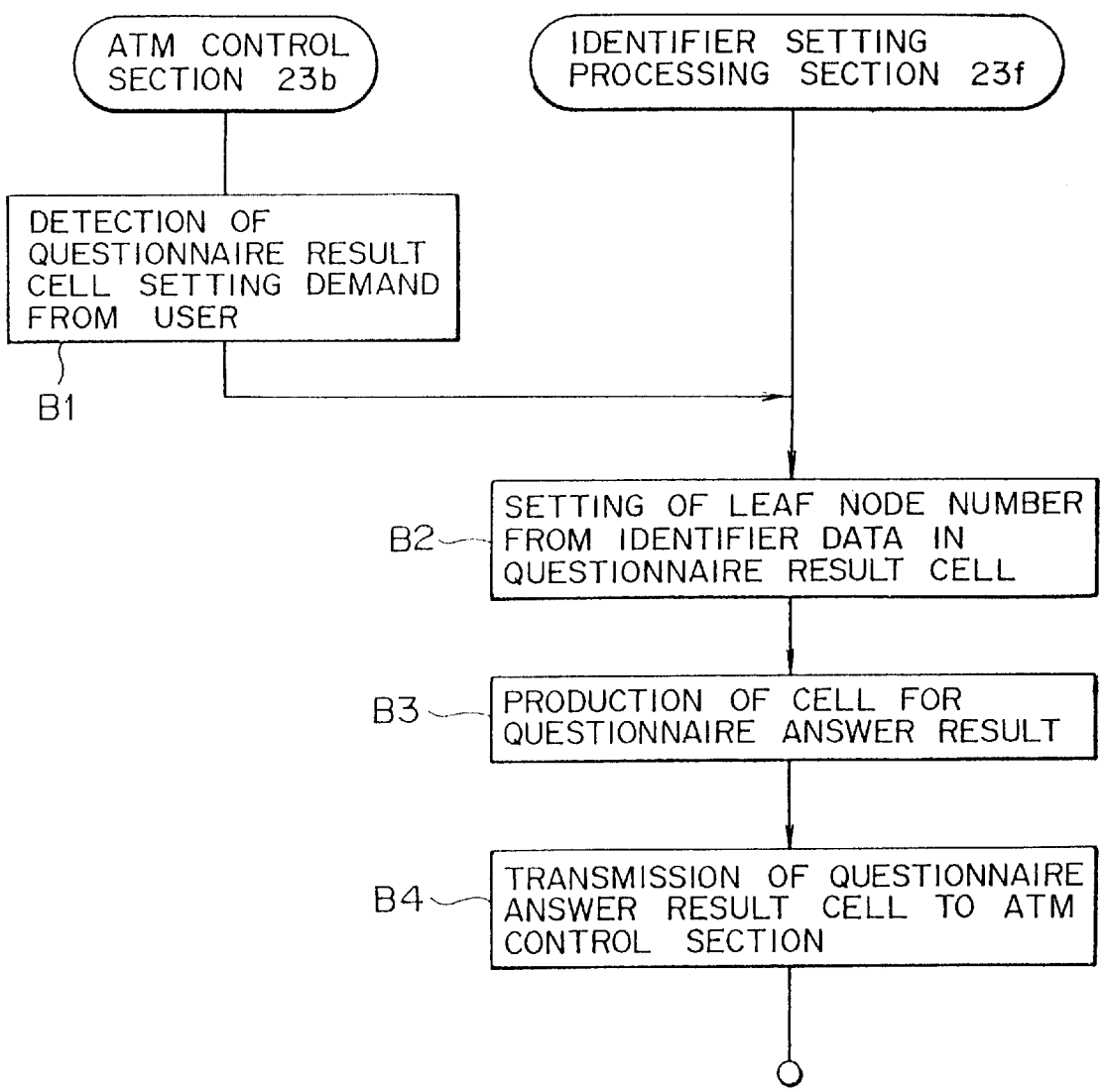
FIGS. 20 and 21 are flow charts for explaining an operation of the first embodiment of this invention.

As shown in FIG. 20, in response to the demand for the transmission of the questionnaire answer result from the service instruction section 23d (step B1), the ATM control section 23b creates an ATM cell. At this time, it informs the identifier setting processing section 23f of the reception of the demand for the transmission of the questionnaire answer result.

Subsequently, the identifier setting processing section 23f refers to the identifier data 23e-2 to extract the leaf node number predetermined for each of the leaf node units 23-1 to 23-n from the currently using channel, with this leaf node number being inserted into the aforesaid ATM cell (steps B2 and B3).

After being outputted from the ATM control section 23b, the ATM cell (see reference mark 202 in FIG. 15, 16 or 18) including the leaf node number is transmitted from the transmission line control section 23a to the service offering unit 21 side (step B4, see reference marks A4, A5 in FIG. 19).

Figure 21:
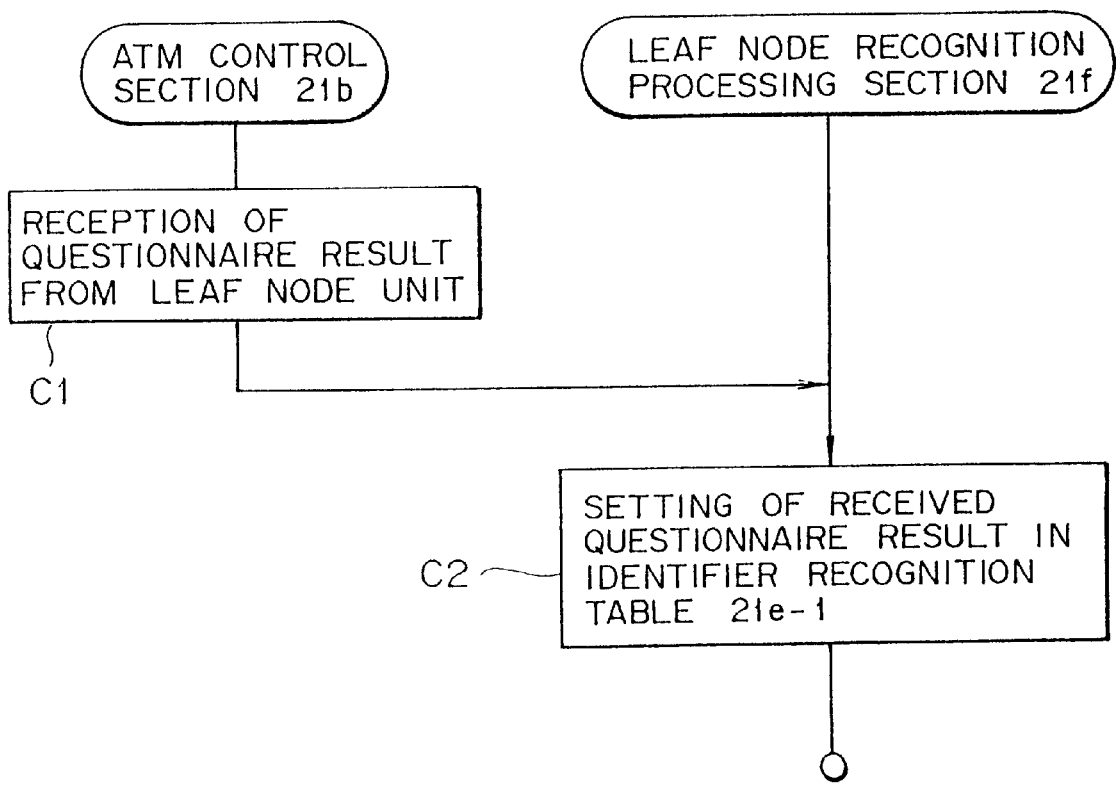

Furthermore, as shown in FIG. 21, the ATM control section 21b of the service offering unit 21 receives a cell for the questionnaire answer result from the leaf node units 23-p, 23-q through the transmission line control section 21c (step C1).

Following this, the leaf node recognition processing section 21f writes as address information in the identifier recognition table 21e-1 an IP address and others together with the answer result organizing the foregoing questionnaire answer result cell (step C2).

Thereafter, the service offering unit 21 reads out the questionnaire collection result written in the identifier recognition table 21e-1 by using the leaf node number for identifying each of the leaf node units 23-1 to 23-n as the address information, and makes out a necessary tabulation or totalization of the questionnaire answer results from the plurality of leaf node units 23-1 to 23-n.

Incidentally, the ATM network unit 22 can also identify the ATM cell transmitted from the leaf node units 23-p, 23-q. That is, the leaf node control processing section 22e refers to the leaf node table 22f on the basis of the port number of the line connection port for the inputted ATM cell, thereby identifying the leaf node units 23-p, 23-q which are the senders.

As described above, according to the first embodiment of this invention, since the leaf node number is inserted into the data to be transmitted through the use of the identifier setting processing section 23f and storage section 23e of each of the leaf node units 23-1 to 23-n serving as the communication terminals, and transmitted through the ATM control section 23b and transmission line control section 23a thereof, the service offering unit 21 becomes capable of identifying the leaf node units 23-1 to 23-n, and therefore, even in the case of the leaf node units 23-1 to 23-n being the destination of the multicast connection, it is possible to individually offer additional services, for example, the questionnaire answer result transmission to the questionnaire execution information, to the user on each of the leaf node units 23-1 to 23-n sides, with the result that more useful multimedia service is obtainable.

Furthermore, since, without using the connection of an ATM virtual channel different from the ATM virtual channel being in the multicast connection in the service offering unit 21, the interactive communication is establishable through the use of the same ATM virtual channel as the ATM virtual channel being in the multicast connection between the service offering unit 21 and the leaf node units 23-1 to 23-n on the basis of the recognition of the leaf node units 23-1 to 23-n by the service offering unit 21, even in the case of the increase in the number of subscribed leaf node units 23-1 to 23-n, the individual offer of additional information to the users is practicable in a state of controlling the load on the ATM network.

Still further, through the use of the identifier setting processing section 23f and the storage section 23e, the leaf node number can be inserted into the non-used area 202F of the header section 202A of the ATM cell 202 constituting the data to be transmitted. Whereupon, even if the useful data is put in all the pay load portions of the ATM cell 202, the service offering unit 21 side can identify the leaf node units 23-1 to 23-n being the senders of the received ATM cells.

This means that, irrespective of the enlargement of the band of the data to be transmitted from the leaf node unit 23-1 to 23-n sides, the production of the ATM cell is possible in a state where all the pay load portions of the ATM cell are effective data. Accordingly, simultaneously with the enhancement of the cell-producing efficiency of the transmission data, the identification of the leaf node units 23-1 to 23-n becomes feasible on the service offering unit 21 side without having influence on the offering services, which allows the enlargement of additional services and the generalization of the services to which the information offering system 20 according to this invention is applicable.

Moreover, in a manner of providing to the leaf node units 23-1 to 23-n serving as the communication terminals a function for the insertion of the leaf node number into the transmission data, it is possible to eliminate the need for the addition of a special function to the ATM network.

Although in the above-described first embodiment the leaf node identifier acting as the terminal identifying information is treated as the information set peculiarly to each of the leaf node units 23-1 to 23-n, this invention is not limited to this, and it is also appropriate to use the information set peculiarly at every leaf node unit group comprising a plurality of leaf node units 23-1 to 23-n.

In addition, according to this invention, it is also appropriate that the identifier setting processing section 23f and the storage section 23e are arranged such that the terminal identifying information is put in an OAM (Operation And Maintenance) cell for the system maintenance and operation. In this case, even in the case of the virtual channel being in the multicast connection, the information offering unit can confirm the channel connection with the respective communication terminals, which permits the maintenance and operation management such as the confirmation of the communication condition.

(c) Description of a Second Embodiment

Figure 22:
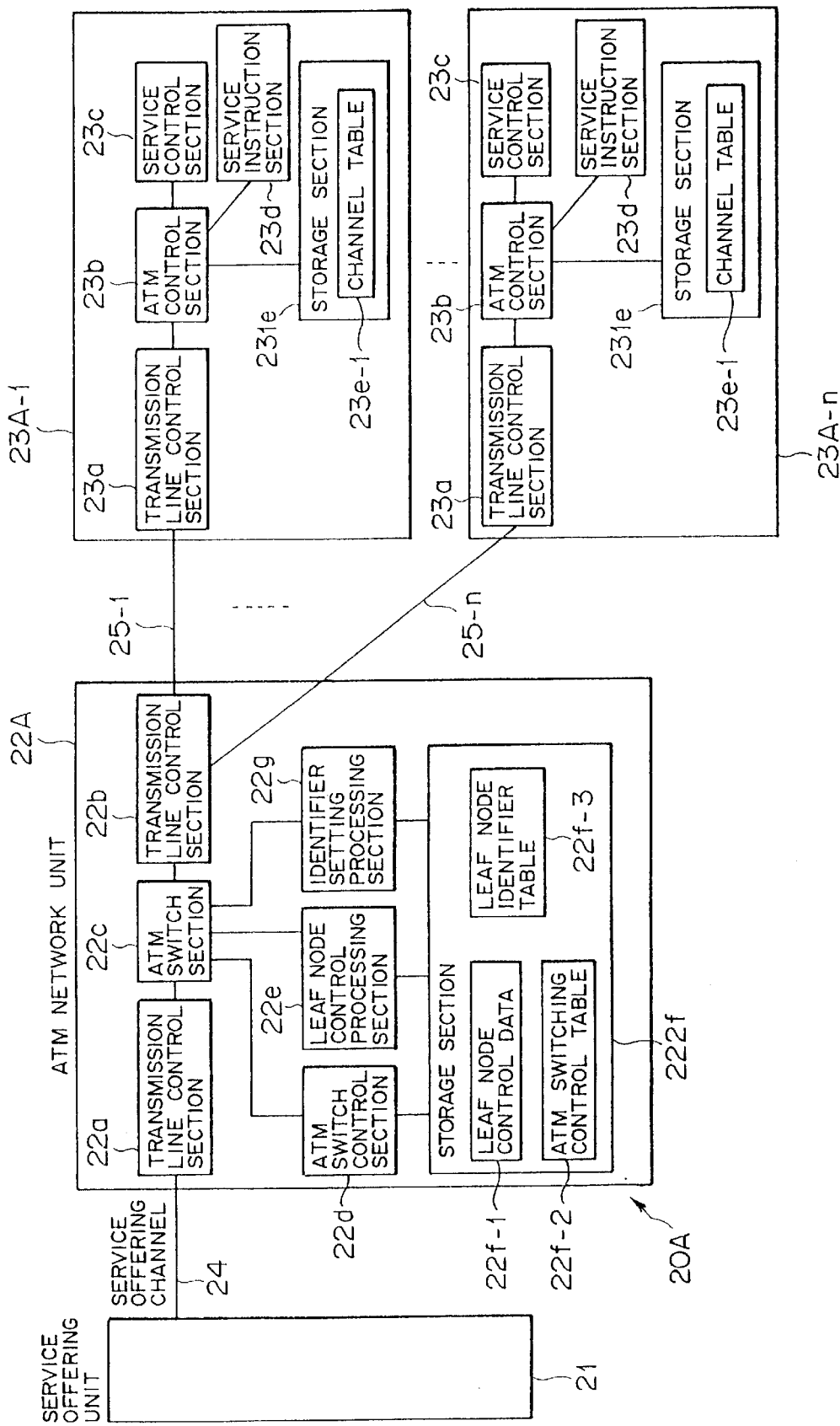
FIG. 22 is a block diagram showing an information offering system according to a second embodiment of the present invention.

FIG. 22 is a block diagram showing an information offering system according to a second embodiment of the present invention. In FIG. 22, the information offering system according to the second embodiment, generally denoted at numeral 20A, differs from the above-described system according to the first embodiment in that the insertion of a leaf node identifier as terminal identifying information into an ATM cell to be transmitted from leaf node units 23A-1 to 23A-n to a service offering unit 21 is done in an ATM network unit 22A, but the other arrangements are substantially similar to those in the first embodiment. In FIG. 22, parts substantially corresponding to those in FIG. 7 are marked with the same reference numerals.

More specifically, although, in the information offering system 20 according to the first embodiment, each of the leaf node units 23A-1 to 23A-n is equipped with the identifier setting processing section 23f and the identifier data 23e-2 for the purpose of the insertion of a leaf node number into the service offering unit 21, in the second embodiment, an ATM network unit 22A has these functional sections (22g, 22f-3) in place of the leaf node units 23A-1 to 23A-n.

That is, the ATM network unit 22A in the second embodiment has an identifier setting processing section 22g in addition to the functional sections similar to those in the first embodiment, and a storage section 222f is provided with leaf node control data 22f-1, an ATM switching control table 22f-2, and a leaf node identifier table 22f-3.

On the other hand, each of the leaf node units 23A-1 to 23A-n has a storage section 231e which does not include the above-mentioned identifier data 23e-2 but including a channel table 23e-1 similar to that in the first embodiment.

In addition, a transmission line control section 22b of the ATM network unit 22A in the second embodiment is also equipped with line connection ports similar to those in the first embodiment.

The identifier setting processing section 22g identifies, in accordance with the in-use/out-of-use conditions of the line connection ports of the transmission line control section 22b, any one of the leaf node units 23A-1 to 23A-n which is the sender of an ATM cell to be transmitted, and further inserts a leaf node number as the terminal identifying information for the sender into the ATM cell.

As in the case of the first embodiment (see FIG. 10), the leaf node control data 22f-1 of the storage section 222f is the data to be used for the channel connection control for the leaf node units 23A-1 to 23A-n in the ATM network unit 22A, and is for recording the service channel VPI/VCI and the control channel VPI/VCI at every port number corresponding to a line in the leaf node units 23A-1 to 23A-n which are currently on the reception of the service offer, and further functions as a port state storage section to store information about the in-use/out-of-use conditions of the line connection ports.

Figure 23:
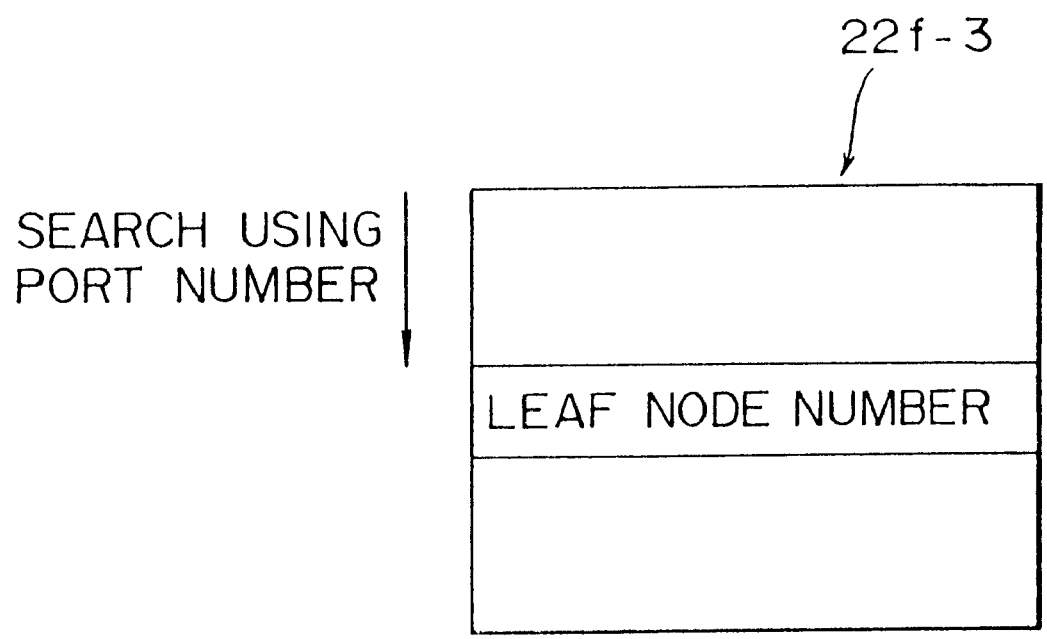
FIG. 23 shows an arrangement of a principal portion of an ATM network unit in the second embodiment of this invention.

Furthermore, the leaf node identifier table 22f-3 of the storage section 222f is for recording, as terminal identifying information, leaf node identifiers (numbers) peculiar to the leaf node units and pre-allocated thereto corresponding to the port numbers of the aforesaid line connection ports, and functions as an identifying information table. In mode detail, for instance, the leaf node identifier table 22f-3 can assume an arrangement shown in FIG. 23.

That is, the identifier setting processing section 22g refers to the leaf node identifier table 22f-3 to search the leaf node number peculiar to that leaf node unit on the basis of the port number of the line connection port for an ATM cell inputted through the transmission line control section 22b and the ATM switch section 22c.

Whereupon, in the identifier setting processing section 22g, the extracted leaf node number peculiar to the leaf node unit is put in the ATM cell inputted from the ATM switch section 22c and further transmitted through the ATM switch section 22c and the transmission line control section 22a to the service offering unit 21 side.

To put it in another way, the identifier setting processing section 22g not only functions as a port number extracting section to extract a port number of a line connection port, to which the aforesaid data is inputted from the leaf node control data 22f-1, when an ATM cell directed to the service offering unit 21 is inputted to the line connection port being in use, but also functions as an identifying information extracting section to extract the aforesaid terminal identifying information corresponding to the port number extracted referring to the leaf node identifier table 22f-3, and even functions as an inserting section to insert the extracted terminal identifying information into the ATM cell.

Accordingly, the identifier setting processing section 22g and the storage section 222f functions as an identifying information inserting section.

In addition, the ATM switch section 22c and the transmission line control section 22b serves as a transmitting section to transmit the ATM cell, to which the leaf node number is added as the terminal identifying information by the identifier setting processing section 22g, through the same VPI/VCI as the VPI/VCI for the multimedia service to be offered.

The leaf node identifier to be inserted in the identifier setting processing section 22g can be inserted into the ATM to be transmitted from the ATM switch section 22c to the service offering unit 21 side, as well as the case shown in FIG. 15, 16 or 18.

More specifically, the identifier setting processing section 22g can be arranged such that the leaf node identifier is inserted as the terminal identifying information into a data section (pay load section) of an ATM constituting data, or the leaf node identifier can be put as the terminal identifying information in a non-used area of a header section of an ATM organizing data, or the leaf node identifier serving as the terminal identifying information can be variable-length bit data.

In the information offering system 20A according to the second embodiment of this invention, with the above-described arrangement, as will be described hereinbelow, each of the leaf node units 23A-1 to 23A-n receives a multimedia service it requires from the service offering unit 21, whereas each of the leaf node units 23A-1 to 23A-n can transmit additional information to the service offering unit 21.

In more detail, when the user of each of the leaf node units 23A-1 to 23A-n receives the offer of the multimedia service from the service offering unit 21, using the ATM cell converted as control information including channel information, a demand for the multimedia service the user sets through the service instruction section 23d is transmitted through the ATM control section 23b and the transmission line control section 23a to the network unit 22A.

The ATM network unit 22A receiving the demand from the leaf node units 23A-1 to 23A-n establishes the multicast connection between the service offering unit 21 and the leaf node units 23A-1 to 23A-n, so that a plurality of leaf node units 23A-1 to 23A-n can concurrently receive the same information offered from the service offering unit 21.

Figure 24:
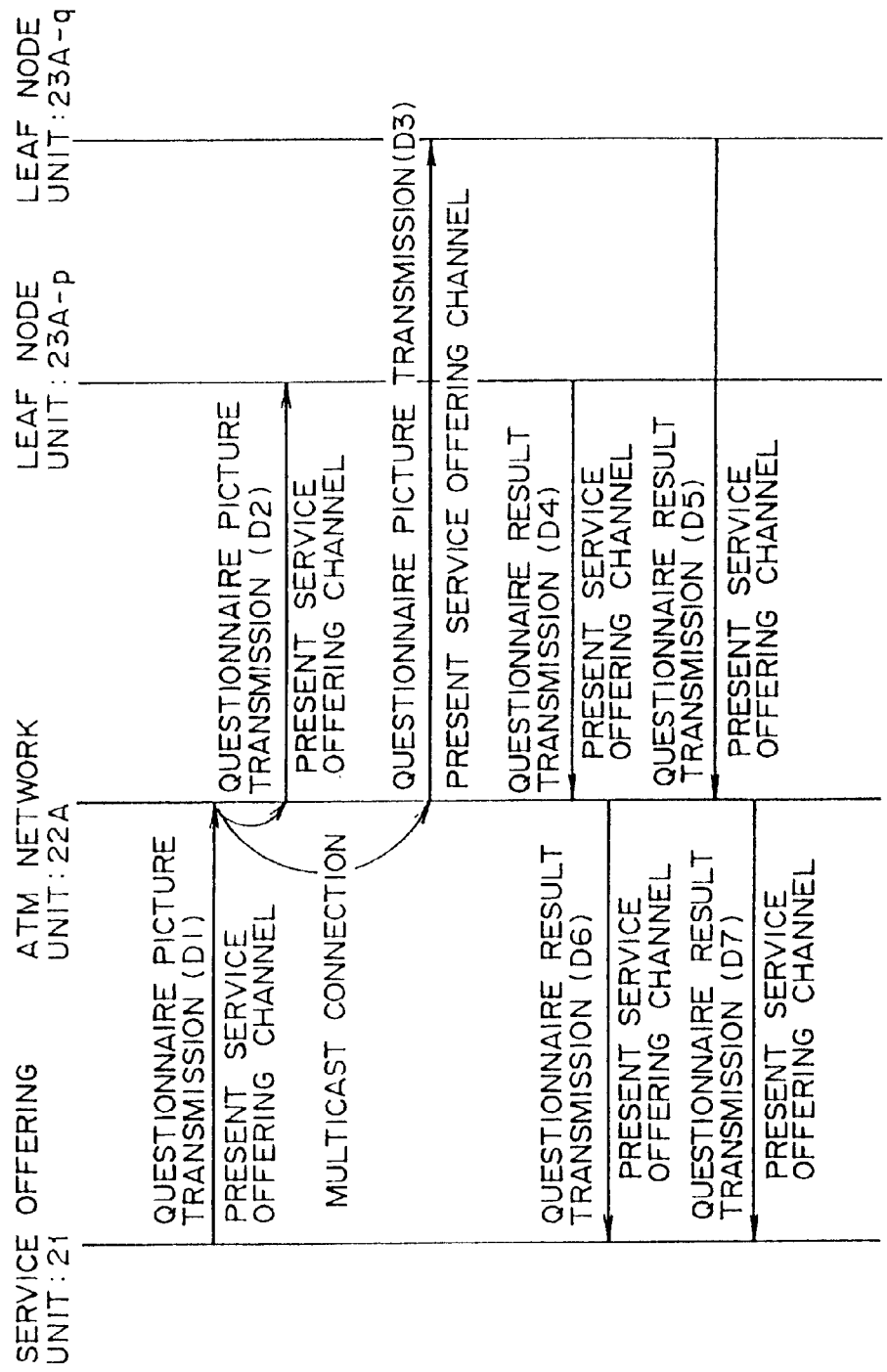
FIG. 24 is a signal sequence illustration for explaining an operation of the second embodiment of this invention.

For example, as shown in FIG. 24, in cases where a plurality of (for example, 2) leaf node units 23A-p, 23A-q (p, q=an integer from 1 to n, p≠q) made a requirement for the offer of information about a questionnaire collection picture (D1) on the same channel, the multicast connection is made between the ATM network unit 22A and the leaf node units 23A-p, 23A-q.

Thus, the leaf node units 23A-p, 23A-q can simultaneously receive the questionnaire collection picture (D1) from the service offering unit 21 through the same channel (VPI/VCI, the present service offering channel) owing to the relay by the ATM network unit 22A (D2, D3).

In addition, the leaf node units 23A-p, 23A-q can concurrently transmit additional information to the service offering unit 21 while receiving the information from the service offering unit 21. Put it in another way, in the information offering system 20A, the interactive communication is feasible while identifying the sender of the information transmitted and received between the service offering unit 21 and a plurality of leaf node units 23A-1 to 23A-n.

Figure 25:
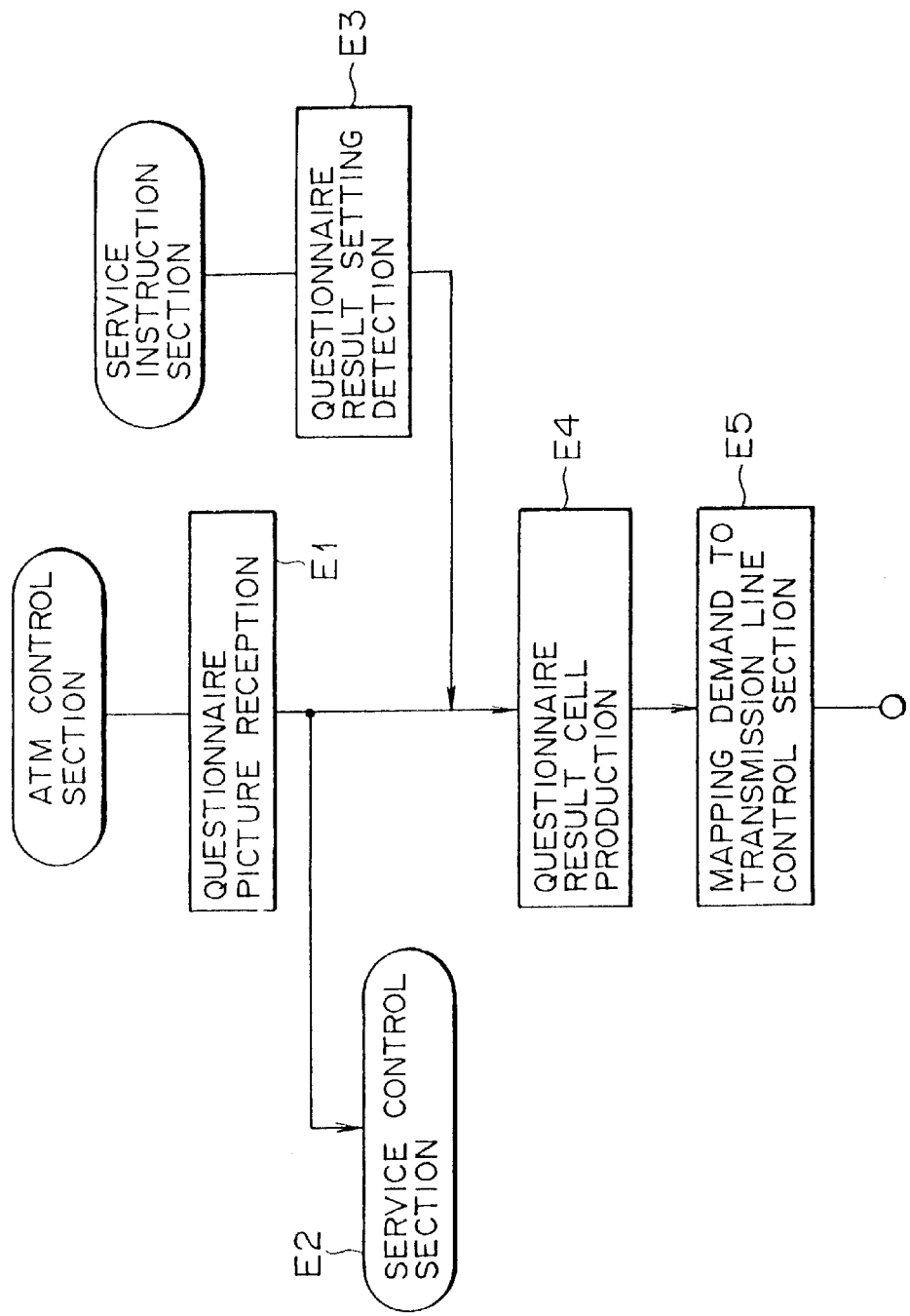
FIGS. 25 and 26 are flow charts for describing an operation of the second embodiment of this invention.

For instance, as shown in FIG. 25, when receiving the ATM cell for the questionnaire collection picture (step E1), the leaf node units 23A-p, 23A-q outputs the questionnaire collection picture ATM cell 201 (see FIG. 14) through the transmission line control section 23a and the ATM control section 23b to the service control section 23c (step E2). Thereafter, under control of the service control section 23c, desired multimedia information being the aforesaid questionnaire collection picture is reproduced on a display (not shown) or the like.

The user checks the questionnaire contents reproduced through the service control section 23c, and then sets an answer to this questionnaire and issues an instruction for the transmission of the questionnaire answer result through the service instruction section 23d (step E3).

Accordingly, the service instruction section 23d outputs the questionnaire answer result transmitting demand as control information to the ATM control section 23b, while the ATM control section 23b and the transmission line control section 23a convert the questionnaire answer result from the service instruction section 23d into an ATM cell (step E4), and after being mapped into a transmission signal in the transmission line control section 23a (step E5), the ATM cell is sent to the ATM network unit 22A (see D4, D5 in FIG. 24).

Figure 26:
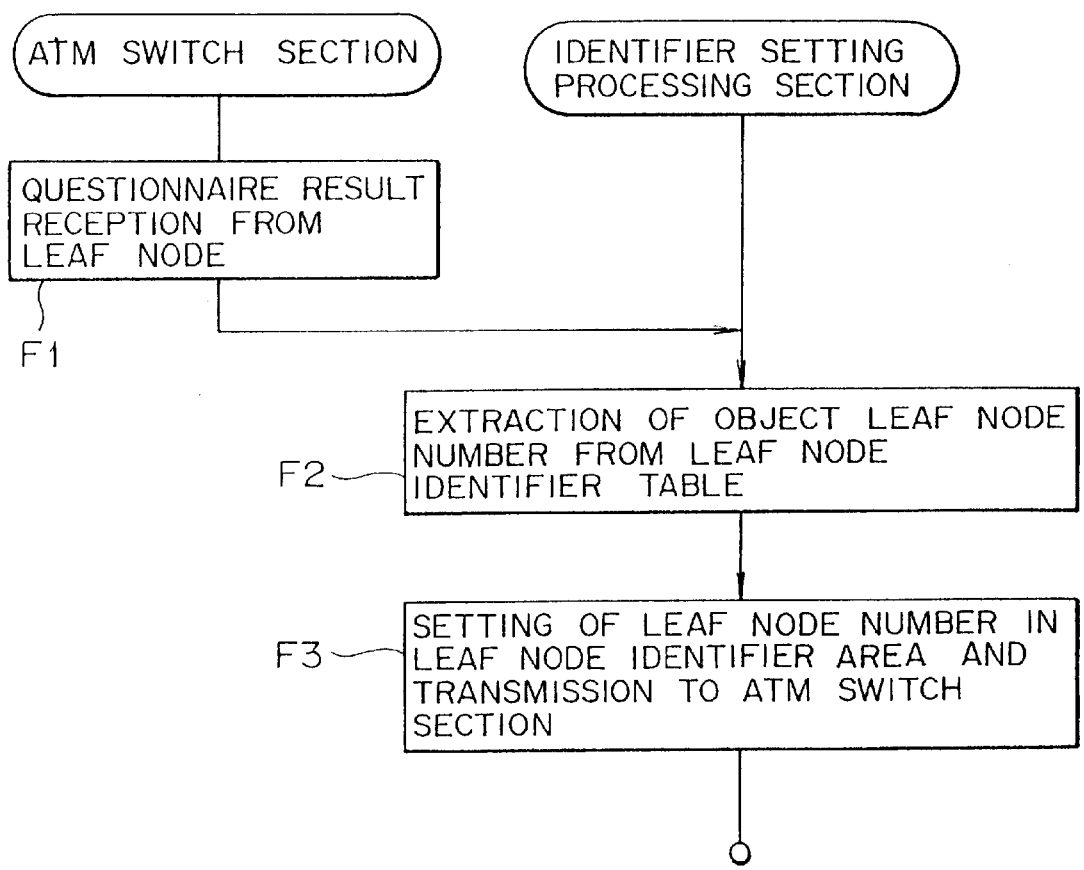

As shown in FIG. 26, in the ATM network unit 22A, when receiving the questionnaire answer results from the leaf node units 23A-p, 23A-q (step F1), the identifier setting processing section 22g refers to the leaf node identifier table 22f-3 to extract the leaf node number on the basis of the port number of the line connection port in the transmission line control section 22b (step F2).

Subsequently, after the extracted leaf node number is inserted into the aforesaid ATM cell inputted through the transmission line control section 22a and the ATM switch section 22c, the ATM cell is handed over to the ATM switch section 22c (step F3) and transmitted through the transmission line control section 22a to the service offering unit 21 side (see D6, D7 in FIG. 24).

Thereafter, when receiving the ATM cell with the leaf node number, in the service offering unit 21, as well as the case in the first embodiment, the leaf node recognition processing section 21f writes an IP address and others together with the answer result constituting the above-mentioned questionnaire answer result cell in the identifier recognition table 21e-1 in a state where the leaf node number is treated as address information.

Thus, in the service offering unit 21, the questionnaire collection result written in the identifier recognition table 21e-1 are read out on the basis of the leaf node number for identifying each of the leaf node units 23A-1 to 23A-n which is handled as address information, thus conducting a necessary tabulation about the questionnaire answer results from a plurality of leaf node units 23A-1 to 23A-n.

As described above, according to the second embodiment of this invention, since the leaf node number is put in the data to be transmitted through the identifier setting processing section 22g and storage section 222f of the ATM network unit 22A and the transmission thereof is made through the ATM switch section 22c and transmission line control section 22a, it becomes possible to identify the leaf node units 23A-1 to 23A-n in the service offering unit 21, and as well as the first embodiment, even in the case of the leaf node units 23A-1 to 23A-n being the destination of the multicast connection, it is possible to individually offer additional services, for example, the questionnaire answer result transmission to the questionnaire execution information, to the user on each of the leaf node units 23A-1 to 23A-n sides, with the result the enlargement of the additional service and the improvement of the multimedia service become possible.

Furthermore, since the interactive communication is establishable through the use of the same ATM virtual channel as the ATM virtual channel being in the multicast connection between the service offering unit 21 and the leaf node units 23A-1 to 23A-n, even in the case of the increase in the number of subscribed leaf node units 23A-1 to 23A-n, the individual offer of additional information to the users is practicable in a state of controlling the load on the ATM network.

Still further, through the use of the identifier setting processing section 22g and the storage section 222f, the leaf node number can be inserted into the non-used area 202F of the header section 202A of the ATM cell 202 constituting the data to be transmitted. Whereupon, even if the useful data exists in all the pay load portions of the ATM cell 202, the service offering unit 21 side can identify the leaf node units 23A-1 to 23A-n being the senders of the received ATM cells.

This signifies that, irrespective of the enlargement of the band of the data to be transmitted from the leaf node unit 23A-1 to 23A-n sides, the production of the ATM cell is possible in a state where all the pay load portions of the ATM cell are effective data. Accordingly, simultaneously with the enhancement of the cell-producing efficiency of the transmission data, the identification of the leaf node units 23A-1 to 23A-n becomes feasible on the service offering unit 21 side without having influence on the offering services, which allows the generalization of the services to which the information offering system 20A according to this invention is applicable.

Moreover, in a manner of providing to the ATM network unit 22A a functional section for the insertion of the leaf node number into the transmission data, it is possible to eliminate the need for the addition of a special function to the leaf node units 23A-1 to 23A-n serving as the communication terminals.

(d) Description of a Third Embodiment

Figure 27:
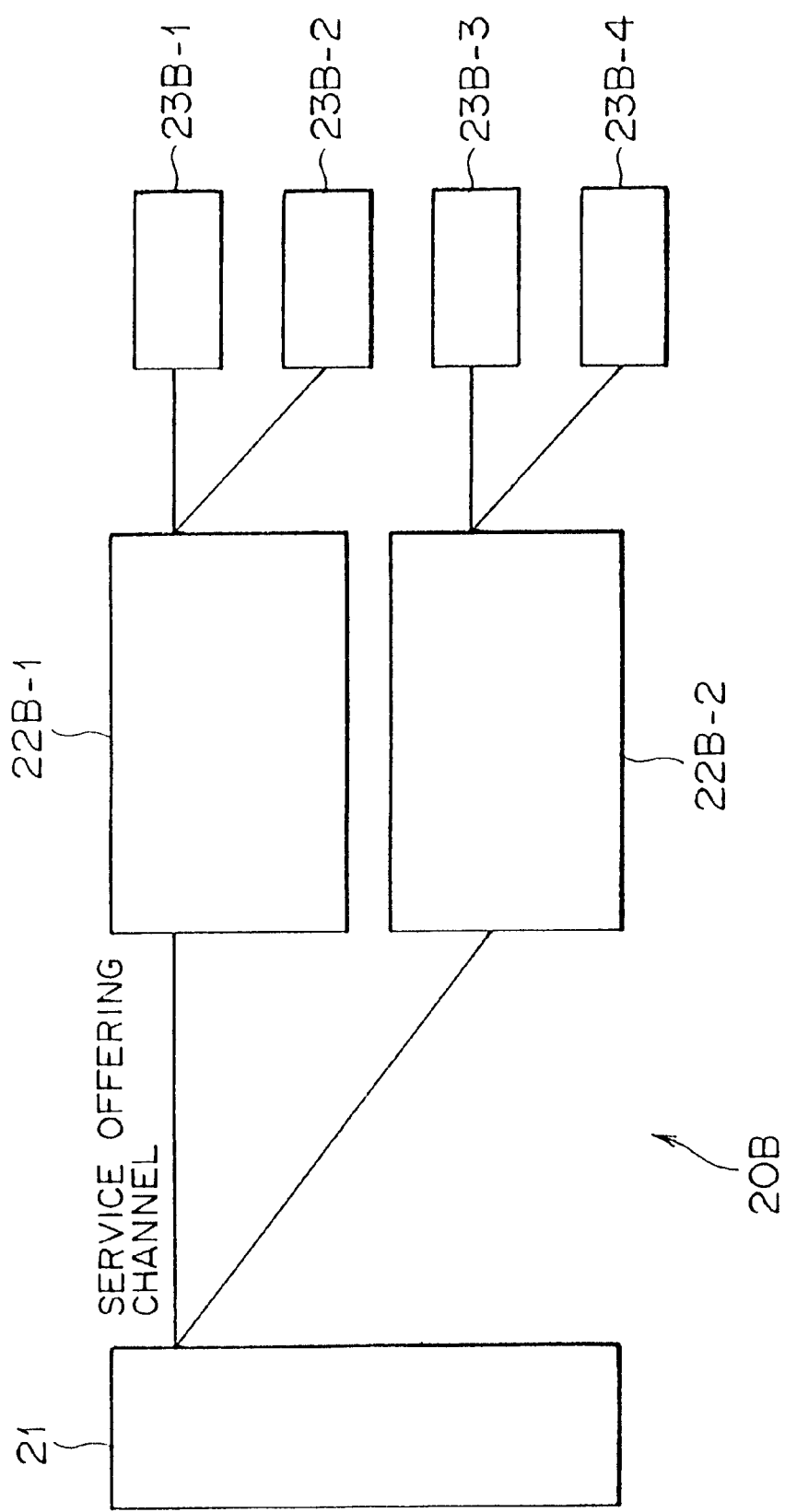
FIG. 27 is a block diagram showing an information offering system according to a third embodiment of the present invention.

FIG. 27 is a block diagram showing an information offering system according to a third embodiment of the present invention. The information offering system, generally denoted at numeral 20B in FIG. 27, differs from the above-mentioned system according to the second embodiment in that, without allocating a leaf node identifier being individual terminal identifying information to each of leaf node units stored in a plurality of (for example, 2) ATM network units 22B-1, 22B-2, the leaf node units stored in each of the ATM network units 22B-1, 22B-2 is grouped (producing a group including leaf node units 23B-1, 23B-2 and a group including leaf node units 23B-3, 23B-4), and a leaf node identifier is allocated to each of the groups.

In other words, in the third embodiment, the terminal identifying information is treated as the information representative of its own leaf node units 23B-1, 23B-2 (or 23B-3, 23B-4).

Accordingly, the difference of the information offering system 20B according to the third embodiment from the system according to the second embodiment is that a service offering unit 21 stores a plurality of ATM network units 22B-1, 22B-2, and a storage section 223f of ATM network units 22B-1, 22B-2 has an arrangement different therefrom, but the other arrangements are substantially the same as those in the second embodiment.

In FIG. 27, omitted from the illustration are the principal arrangements (refer to numerals 21a to 21f, 22a to 22g, 23a to 231e) other than a service offering unit 21, ATM network units 22B-1, 22B-2, and storage sections 223f of leaf node units 23B-1, 23B-2, 23B-3, 23B-4 which constitute the information offering system 20B.

Figure 28:
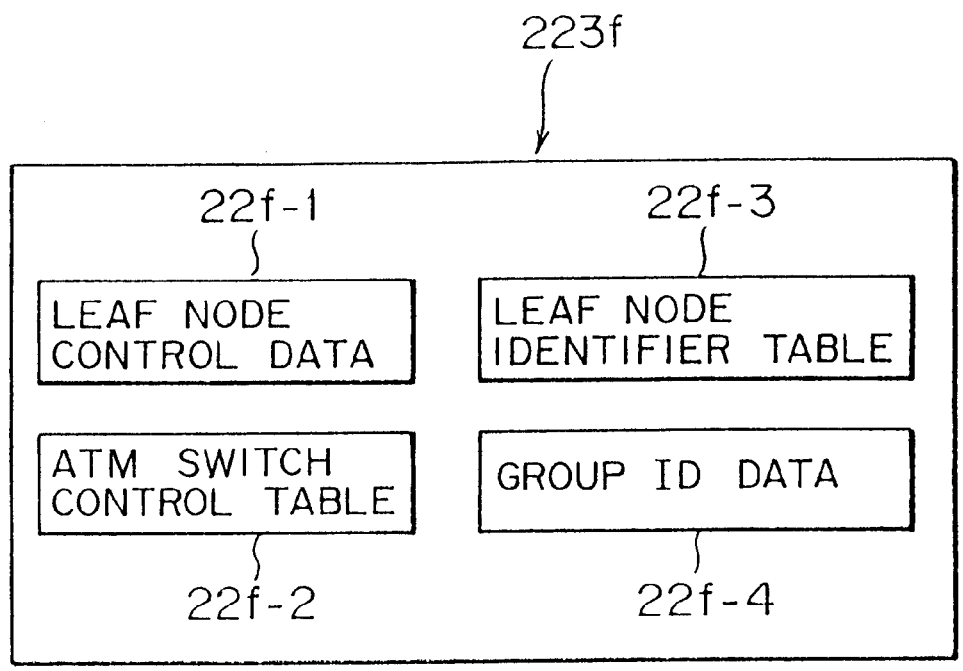
FIGS. 28 and 29 are illustrations of arrangements of principal portions of an ATM network unit in the third embodiment of this invention.

In this case, as shown in FIG. 28, the storage section 223f of each of the ATM network units 22B-1, 22B-2 is provided with leaf node control data 22f-1, an ATM switch control table 22f-2 and a leaf node identifier table 22f-3 as well as the above-mentioned storage section (refer to numeral 222f) in the second embodiment, and further equipped with group ID data 22f-4.

Figure 29:
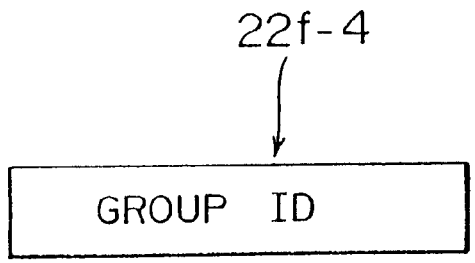

As shown in FIG. 29, the group ID data 22f-4 is for storing information about a group ID pre-allocated to each of the ATM network units 22B-1, 22B-2.

That is, in each of the ATM network units 22B-1, 22B-2 respectively storing the leaf node units 23B-1, 23B-2 and the leaf node units 23B-3, 23B-4, when transmitting an ATM cell to the service offering unit 21, as well as the case in the second embodiment, the identifier setting processing section 22g extracts the leaf node number peculiar to that leaf node unit and further extracts the group ID from the group ID data 22f-4.

Thus, the identifier setting processing section 22g can insert the extracted leaf node number peculiar to the leaf node unit and the extracted group ID into the ATM cell to be transmitted to the service offering unit 21.

Figure 30:
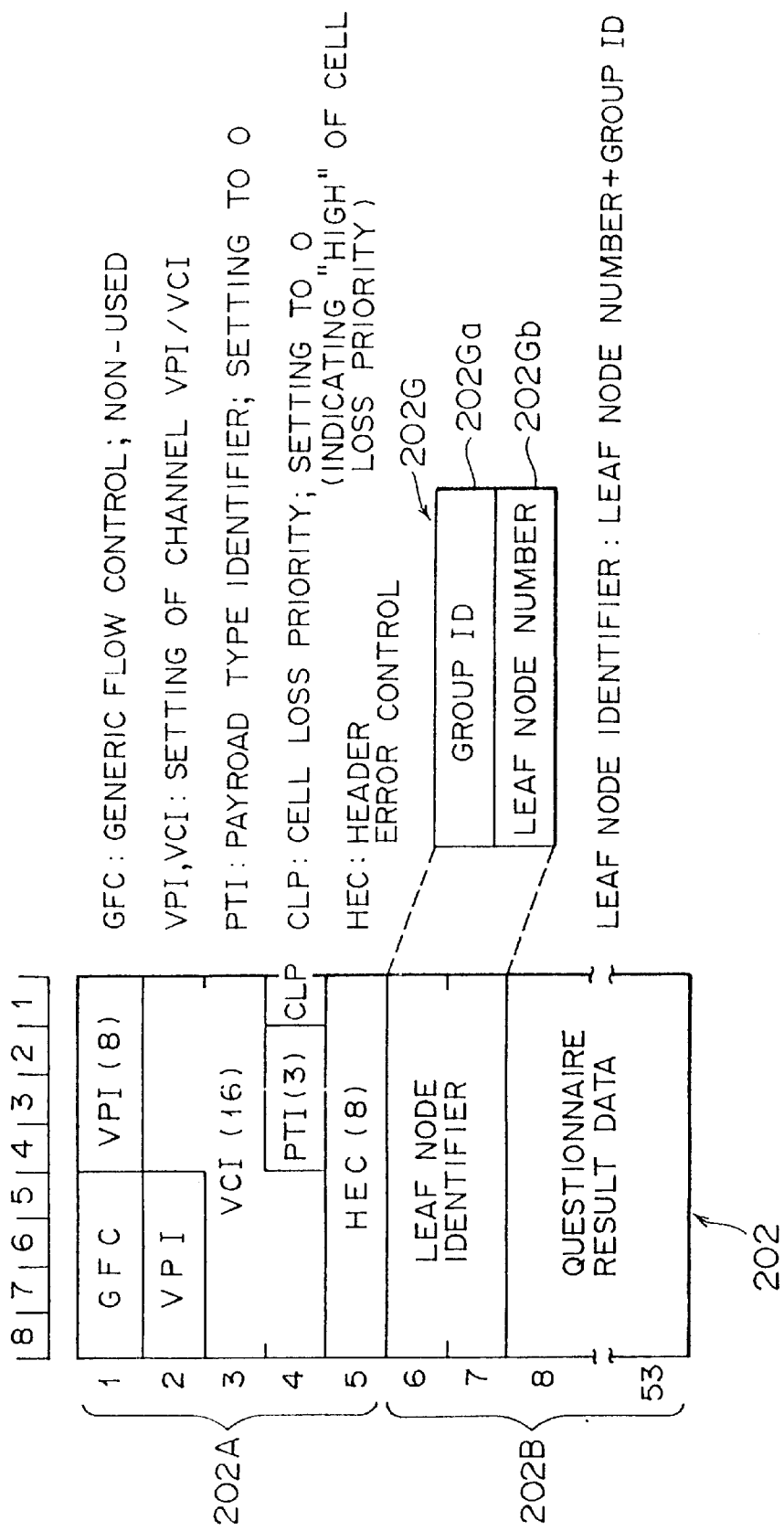
FIG. 30 is an illustration of a cell format of an ATM cell transmitted and received in the third embodiment of this invention.

Concretely, as shown in FIG. 30, the extracted leaf node number and group ID are put in the leading 2-byte area (2-byte area subsequent to a 5-byte header area 202A) 202G of a data area 202B of the ATM cell 202 to be transmitted to the service offering unit 21, and in this state, the ATM cell 202 is transmitted through the ATM switch section 22c and the transmission line control section 22a to the service offering unit 21.

In this case, the first 1-byte 202Ga of the 2-byte area 202G is used as an area for the group ID, whereas the last 1-byte 202Gb of the 2-byte area 202G is used for the leaf node number serving as the identifying information peculiar to the leaf node unit.

As in the case of the above-described first and second embodiments, also in the information offering system 20B according to the third embodiment of this invention, the respective leaf node units 23B-1, 23B-2, 23B-3, 23B-4 get the multimedia service they want from the service offering unit 21, while the leaf node units 23B-1, 23B-2, 23B-3, 23B-4 can give additional information to the service offering unit 21.

Although the following description will particularly be made paying attention to the transmission and reception of information between the leaf node units 23B-1, 23B-2 stored in the ATM network unit 22B-1 and the service offering unit 21, the transmitting and receiving mode of a signal between the leaf node units 23B-3, 23B-4 stored in the ATM network unit 22B-2 and the service offering unit 21 is basically the same as that described above.

First, in the case of the offer of a multimedia service from the service offering unit 21 being received by the leaf node units 23B-1 to 23B-2, the user of each of the leaf node units 23B-1, 23B-2 sets a demand for the multimedia service through a service instruction section 23d.

That is, the service instruction section 23d converts the demand from the user as control information including channel information into an ATM cell and subsequently transmits it through an ATM control section 23b and a transmission line control section 23a to a network unit 22B-1.

When receiving the demands from the leaf node units 23B-1 to 23B-2, the ATM network unit 22B-1 conducts the multicast connection processing between the service offering unit 21 and the leaf node units 23B-1 to 23B-2, so that a plurality of leaf node units 23B-1 to 23B-2, can concurrently receive the same information from the service offering unit 21.

Figure 31:
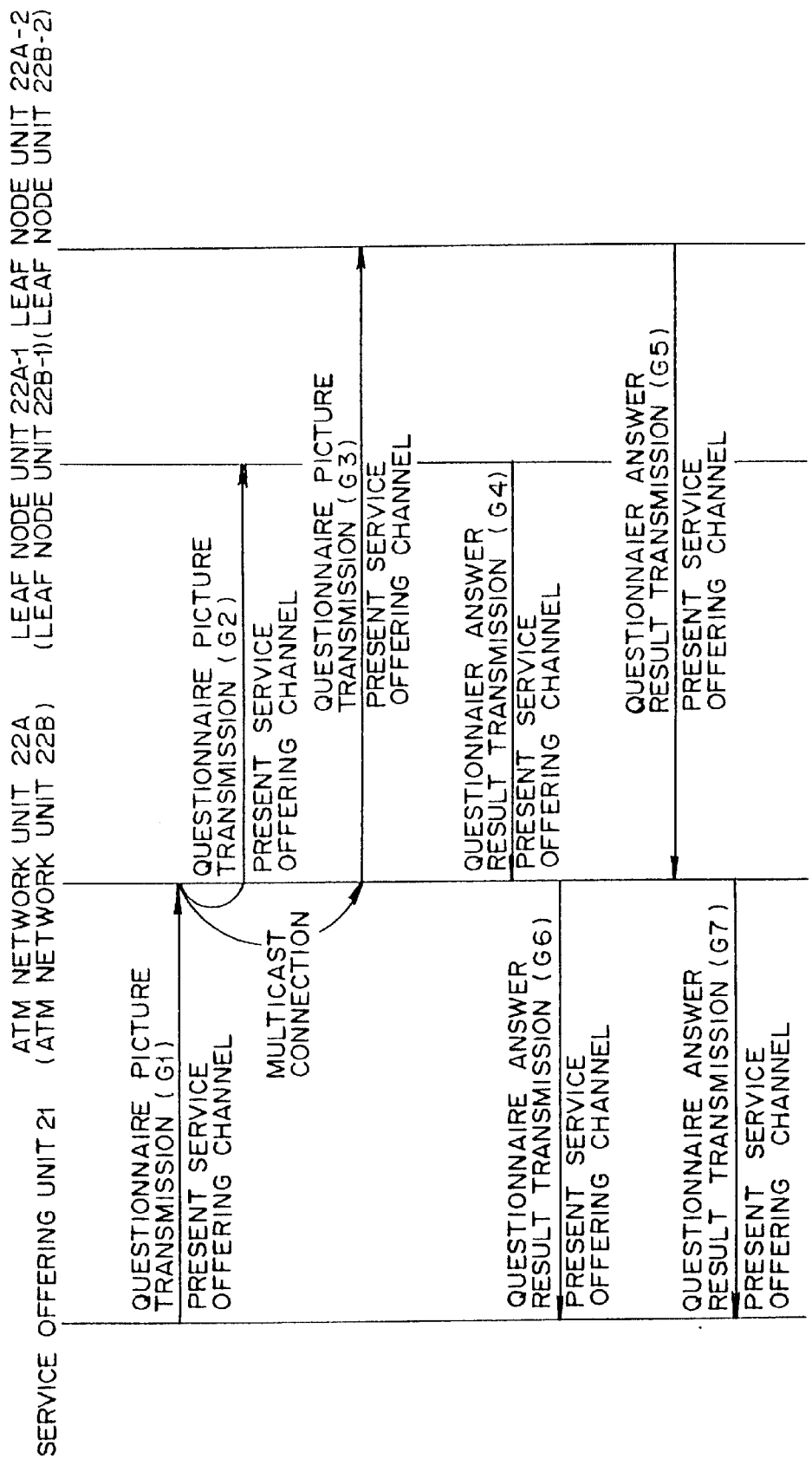
FIG. 31 is a signal sequence illustration for describing an operation of the third embodiment of this invention.

For instance, as shown in FIG. 31, in cases where two leaf node units 23B-1, 23B-2 give a demand for the information offer in terms of a questionnaire collection picture (G1) on the same channel, the multicast connection is made between the ATM network unit 22B-1 and the leaf node units 23B-1, 23B-2, which allows the two leaf node units 23B-1, 23B-2 to simultaneously receive the questionnaire collection picture (G1) from the service offering unit 21 through the same channel (VPI/VCI, the present service offering channel) due to the relay by the ATM network unit 22B-1 (G2, G3).

Furthermore, the leaf node units 23B-1, 23B-2 can transmit additional information to the service offering unit 21 while receiving information from the service offering unit 21. In other words, in the information offering system 20B, the interactive communication is achievable while identifying the sender of a signal transmitted and received between the service offering unit 21 and a plurality of leaf node units 23B-1 to 23B-2.

That is, when the leaf node units 23B-1, 23B-2 receives the questionnaire collection picture ATM cell, as in the case of the second embodiment, the users examine the questionnaire contents reproduced through a service control section 23c and set an answer to this questionnaire.

On the basis of a transmission instruction from a service instruction section 23d, the information about the set answer result to the questionnaire is converted into an ATM cell in the ATM control section 23b and transmitted through the transmission line control section 23a to the ATM network unit 22B-1 (G4, G5).

Figure 32:
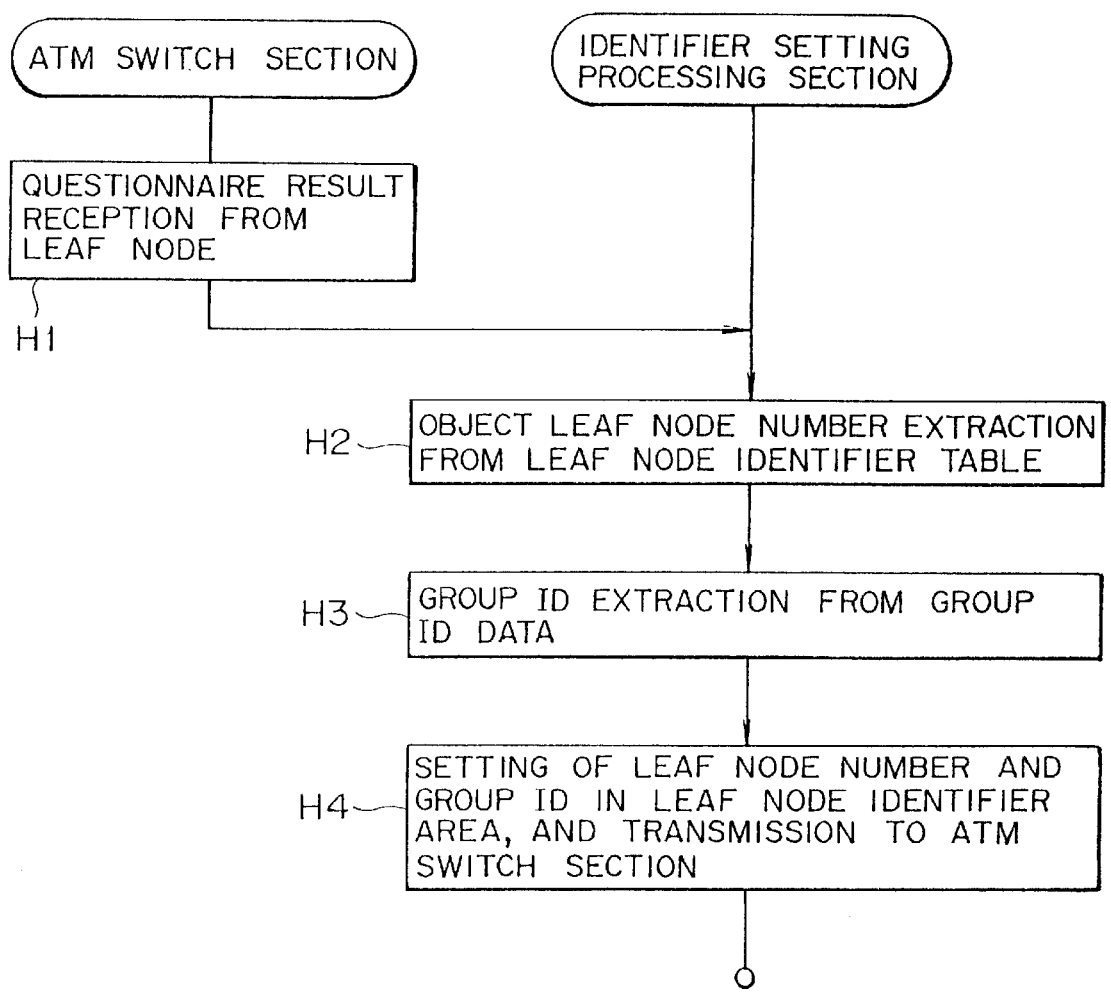
FIG. 32 is a flow chart for explaining an operation of the third embodiment of this invention.

In the ATM network unit 22B-1, as shown in FIG. 32, when receiving the questionnaire answer results from the leaf node units 23B-1, 23B-2 (step H1), the identifier setting processing section 22g refers to the leaf node identifier table 22f-3 to extract the leaf node number on the basis of the port number of the line connection port in the transmission line control section 22b (step H2), and further extracts from the group ID data 22f-4 the group ID data set peculiarly to the ATM network unit 22B-1 (step H3).

Following this, the extracted group ID data and leaf node number are inserted into the aforesaid ATM cell inputted through the transmission line control section 22a and the ATM switch section 22c, and the ATM cell undergoing the insertion is then forwarded to the ATM switch section 22c (step H4). Whereupon, the ATM cell after the insertion of the group ID data and the leaf node number is mapped into the transmission signal in the transmission line control section 22a and transmitted to the service offering unit 21 side (see G6, G7 in FIG. 31).

Thereafter, in the service offering unit 21, as in the case of the above-described first and second embodiments, when receiving the ATM cell with the group ID data and the leaf node number, the leaf node recognition processing section 21f writes an IP address and others together with the answer result organizing the aforesaid questionnaire answer result cell in the identifier recognition table 21e-1 in a state where the leaf node number is treated as the address information.

Thus, in the service offering unit 21, the questionnaire collection result written in the identifier recognition table 21e-1 is read out in a manner of using as the address information the leaf node number for identifying each of the leaf node units 23B-1, 23B-2, 23B-3, 23B-4, and a necessary tabulation is made in terms of the questionnaire answer results from the plurality of leaf node units 23B-1 to 23B-4. It is also possible to tabulate or totalize the questionnaire results in units of the grouped leaf node units 23B-1, 23B-2 (or the leaf node units 23B-3, 23B-4).

According to the third embodiment of this invention, since the information indicative of its own leaf node units 23B-1 to 23B-4 is usable as the terminal identifying information, in addition to the advantages substantially equal to those of the above-mentioned second embodiment, the management and control of the respective leaf node units 23B-1 to 23B-4 can be facilitated by lessening the management and control data for the service offering unit 21 and the leaf node units 23B-1 to 23B-4 in the ATM network units 22B-1, 22B-2.

Figure 33:
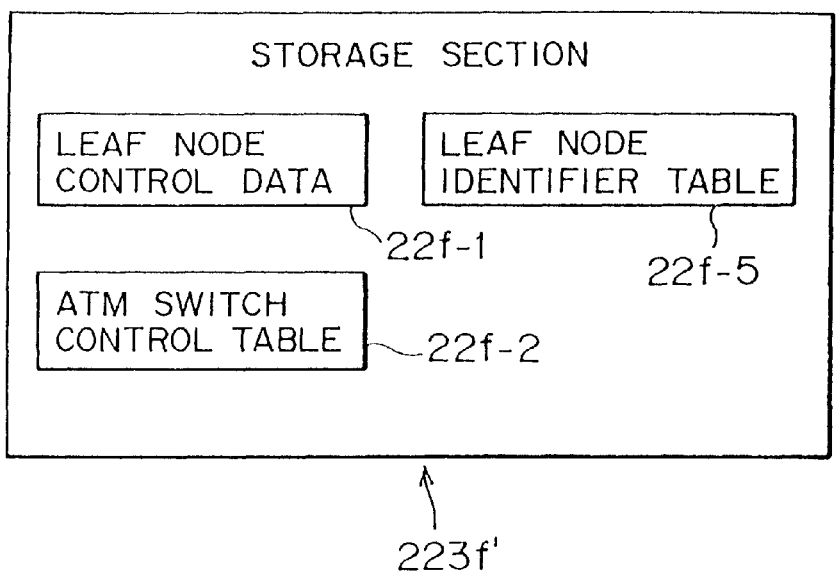
FIGS. 33 and 34 are illustrations of modification of the third embodiment of this invention.

Although, in the ATM network units 22B-1, 22B-2 of the information offering system 20B according to the third embodiment, the leaf node numbers peculiar to the leaf node units and the group IDs are extracted from different storage sections (refer to numerals 22f-3, 22f-4), this invention is not limited to this. For instance, it is also appropriate that, as shown in FIG. 33, a storage section 223f' is provided with a leaf node identifier table 22f-5. In this case, it is possible to simultaneously extract the leaf node number and the group ID.

Figure 34:
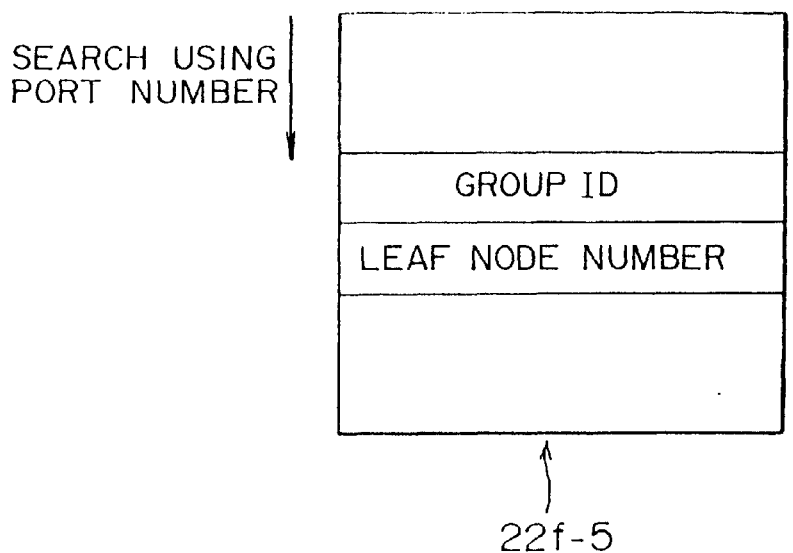

More specifically, for example, as shown in FIG. 34, in the leaf node identifier table 22f-5, the leaf node number and the group ID are registered with the same area in a state where the line connection port to be connected is handled as the address information. With this arrangement, without having a storage section dedicated to the group IDs, it is possible to concurrently extract the leaf node number and the group ID from the port information.

In addition, it is also possible that the group ID is not the information representative of its own communication terminals, but is the information set peculiarly at every communication terminal group comprising arbitrary communication terminals.

Furthermore, the storage section 223f' shown in FIG. 33 is provided with a leaf node control data 22f-1 and an ATM switch control table 22f-2 as well as the foregoing storage section (refer to numeral 223f) shown in FIG. 28.

Figure 35:
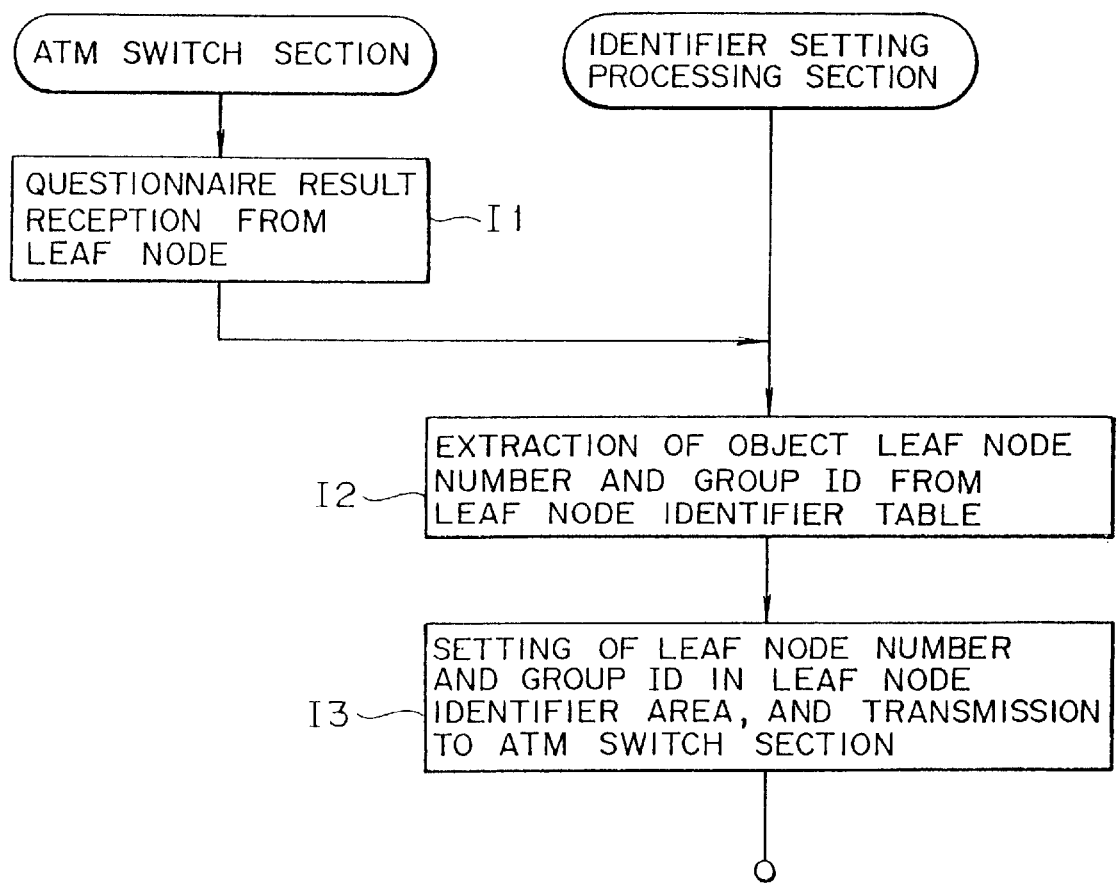
FIG. 35 is a flow chart for explaining an operation of the information offering system in the modification of the third embodiment of this invention.

Thus, in the information offering system 20B shown in FIG. 27, if employing the ATM network units 22B-1, 22B-2 having the storage section 223f' shown in FIG. 33, for example, in the ATM network unit 22B-1, the operation is conducted as shown in FIG. 35 (also in the case of the ATM network unit 22B-2, the operation is the same).

That is, when receiving the questionnaire answer results from the leaf node units 23B-1, 23B-2 (step I1), the identifier setting processing section 22g refers to the leaf node identifier table 22f-5 to simultaneously extract the leaf node number and the group ID on the basis of the port number of the line connection port in the transmission line control section 22b (step I2).

After this, the group ID and the leaf node number simultaneously extracted by the identifier setting processing section 22g are inserted into the aforesaid ATM cell inputted through the transmission line control section 22b and the ATM switch section 22c, and then transmitted to the ATM switch section 22c (step I3). Whereupon, the ATM cell after the insertion of the group ID and the leaf node number is mapped into a transmission signal in the transmission line control section 22a and transmitted to the service offering unit 21 side.

Thus, the leaf node identifier table 22f-5 permits the registration of the group IDs and the leaf node numbers.

Accordingly, with this arrangement, the terminal identifying information can be made using the information set peculiarly at every communication terminal group comprising arbitrary leaf node units 23B-1 to 23B-4, and therefore, without being restricted by ATM networks to be stored, it is possible to arbitrarily group the leaf node units 23B-1 to 23B-4 stored in a plurality of ATM network units 22B-1, 22B-2, which allows arbitrary setting of the managing and controlling modes for the leaf node units 23B-1 to 23B-4, thus enlarging the degree of freedom of the system design.

Although, in the above-described third embodiment, the leaf node identifiers are inserted in the ATM network units 22B-1, 22B-2, according to this invention, for example, even in the case that, like the first embodiment, the information offering system takes an arrangement in which the leaf node identifiers are inserted in the leaf node units 23B-1 to 23B-4, substantially same application is possible.

(e) Description of a Fourth Embodiment

Figure 36:
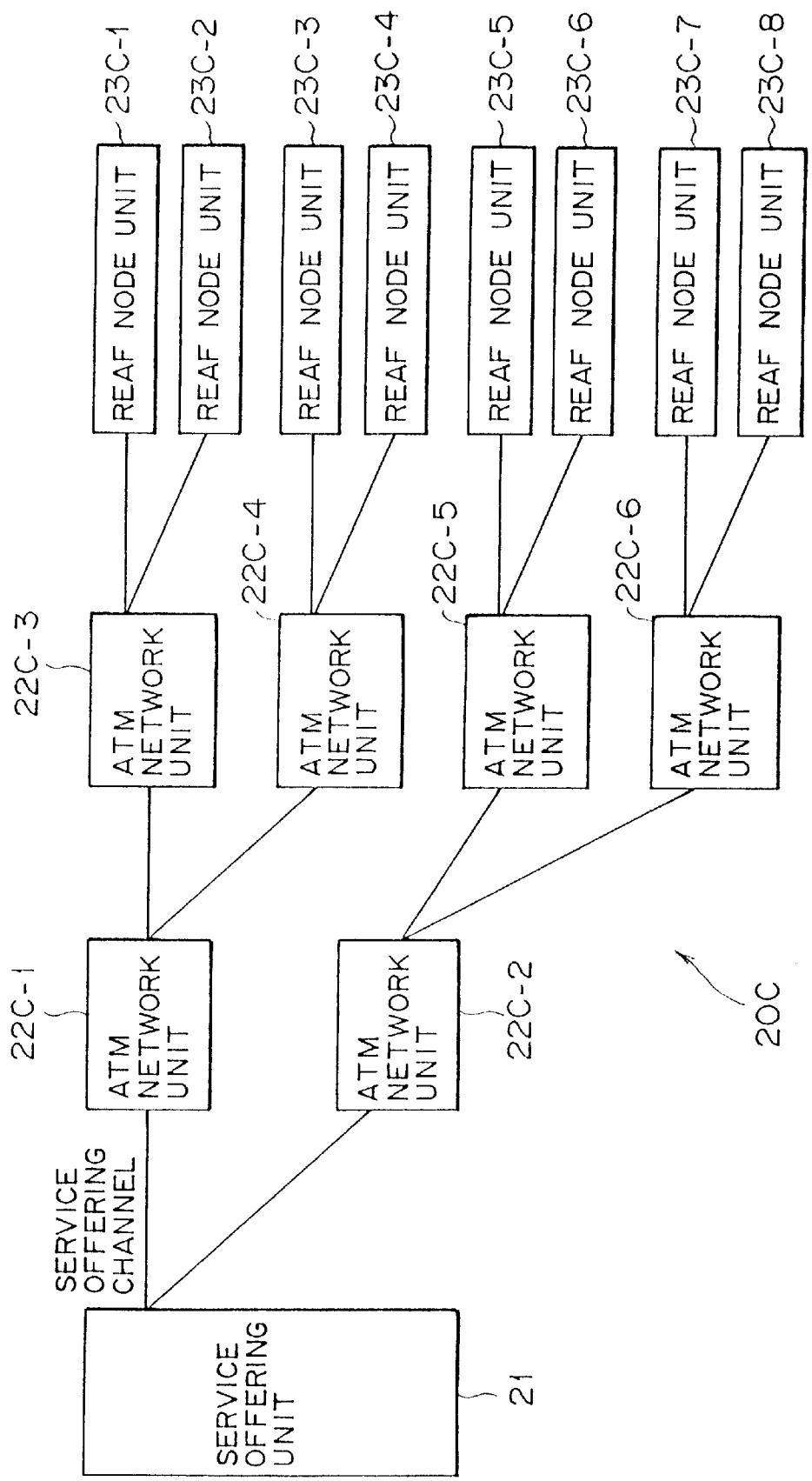
FIG. 36 is a block diagram showing an information offering system according to a fourth embodiment of the present invention.

FIG. 36 is a block diagram showing an information offering system according to a fourth embodiment of the present invention. The information offering system, generally designated at numeral 20C in FIG. 36, differs from the above-described second embodiment in that ATM network units 22C-1 to 22C-6 situated between a service offering unit 21 and leaf node units 23C-1 to 23C-8 assume a hierarchical structure, whereas the arrangements of the service offering unit 21 and the leaf node units 23C-1 to 23C-8 are basically the same.

Incidentally, in FIG. 36, omitted from the illustration are the detailed arrangements (see numerals 21a to 21e, 23a to 231e) of the service offering unit 21 and the leaf node units 23C-1 to 23C-8.

The ATM network unit 22C-1 functions as a high-rank unit (host network unit) storing the ATM network units 22C-3, 22C-4, while the ATM network unit 22C-2 also functions as a high-rank unit accommodating the ATM network units 22C-5, 22C-6.

Furthermore, the ATM network unit 22C-3 functions as a low-rank (guest) unit accommodating the leaf node units 23C-1, 23C-2, whereas the ATM network unit 22C-4 functions as a low-rank (guest) unit incorporating the leaf node units 23C-3, 23C-4.

Similarly, the ATM network unit 22C-5 functions as a low-rank unit storing the leaf node units 23C-5, 23C-6, while the ATM network unit 22C-6 functions as a low-rank unit storing the leaf node unit 23C-7, 23C-8.

In the case that each of the ATM network units 22C-3 to 22C-6 serving as a low-rank unit stores two leaf node units, it becomes similar to the ATM network unit 22A in the second embodiment, and, for this reason, the omission will be made in terms of its detailed description thereof and the detailed illustration of the arrangements 22a to 22g in FIG. 36.

Furthermore, the difference of the ATM network units 22C-1, 22C-2 serving as high-rank units from the ATM network units 22C-3 to 22C-6 operated as low-rank units is only the arrangement of a storage section 224f, and the other arrangements 22a to 22e, 22g are the same as those in the second embodiment.

More specifically, the ATM network unit 22C-1 (or 22C-2) is connected through a transmission line control section (not shown) to the ATM network units 22C-3, 22C-4 (or 22C-5, 22C-6), with line connection ports with port numbers being provided corresponding to lines to be coupled to the respective ATM network units 22C-3, 22C-4 (or 22C-5, 22C-6).

Figure 37:
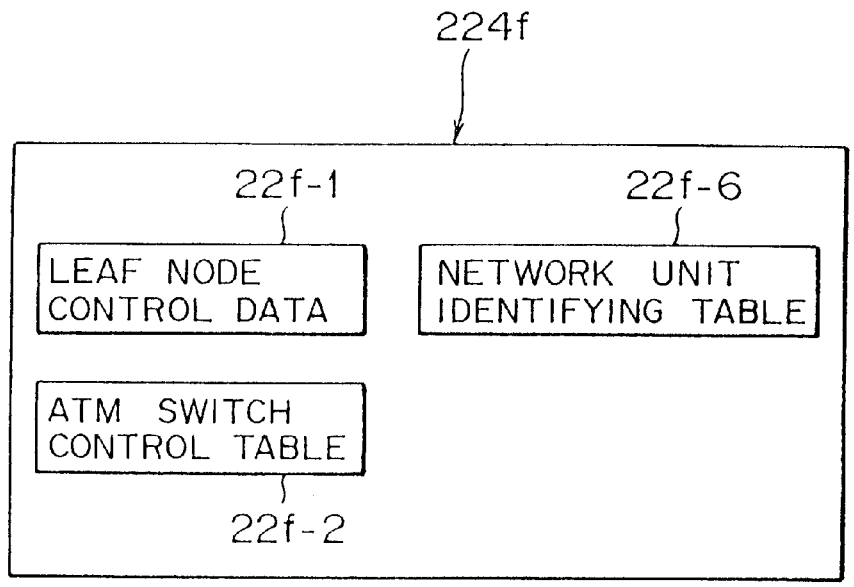
FIGS. 37 and 38 are illustrations of principal portions of an ATM network unit in the fourth embodiment of this invention.

The storage section 224f of the ATM network unit 22C-1 (or 22C-2) is, as shown in FIG. 37, equipped with leaf node control data 22f-1 and an ATM switch control table 22f-2 which are similar to those (see numeral 222f) in the second embodiment, and further provided with a network unit identifying table 22f-6.

Figure 38:
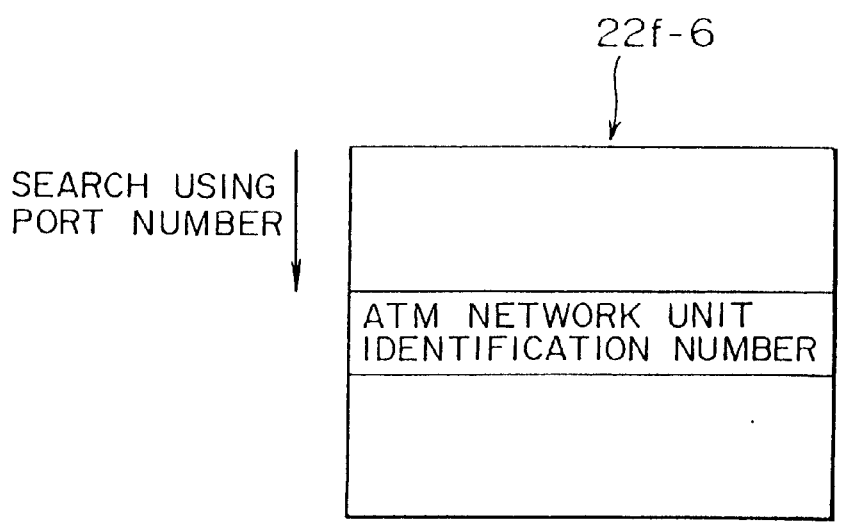

For instance, as shown in FIG. 38, the network unit identifying table 22f-6 is for retaining ATM network unit identification numbers allocated to the ATM network units 22C-3, 22C-4 (or 22C-5, 22C-6) acting as low-rank units which are stored in their ATM network unit 22C-1 (or 22C-2).

That is, in the high-rank ATM network unit 22C-1 (or 22C-2), in cases where an ATM cell for the service offering unit 21 is inputted from the low-rank ATM network units 22C-3, 22C-4 (or 22C-5, 22C-6), the high-rank ATM network unit 22C-1 (or 22C-2) resets the leaf node number, set in a leaf node identifier area (see numeral 202B in FIGS. 15, 16 and 18), to an ATM network unit identifying number as will be mentioned later, and forwards it to the service offering unit 21.

Thus, the high-rank ATM network units 22C-1, 22C-2 capable of accommodating the plurality of network units 22C-3 to 22C-6 are provided as hosts of the ATM network units 22C-3 to 22C-6, and the transmission cell data from each of the leaf node units 23C-1 to 23C-8 to the service offering unit 21 is transmitted through the ATM network units 22C-3 to 22C-6 and the high-rank ATM network units 22C-1, 22C-2.

Furthermore, the high-rank ATM network units 22C-1, 22C-2 convert the terminal identifying information included in the transmission cell data from the ATM network units 22C-3 to 22C-6 into identifying information the high-rank ATM network units 22C-1, 22C-2 manage, and transmit it.

Still further, the ATM network units 22C-1 to 22C-6 peculiarly set the terminal identifying information at every communication terminal group comprising arbitrary leaf node units 23C-1 to 23C-8.

The identifier setting processing section 22g refers to the network unit identifying table 22f-6 to extract an ATM network unit identification number on the basis of the port number of the line connection port for the ATM cell inputted through the transmission line control section 22b and the ATM switch section 22c.

Accordingly, the identifier setting processing section 22g inserts the ATM network unit identification number extracted from the network unit identifying table 22f-6 into the ATM cell inputted from the ATM switch section 22c, with the ATM cell undergoing the insertion of the ATM network unit identification number being transmitted through the ATM switch section 22c and the transmission line control section 22a to the service offering unit 21 side.

In other words, when the ATM cell for the service offering unit 21 is inputted to the line connection port being in a used condition, the identifier setting processing section 22g of each of the ATM network units 22C-1, 22C-2 functions as a port number extracting section to extract the port number of the line connection port, to which the aforesaid data is inputted, from the leaf node control data 22f-1 .

Moreover, the identifier setting processing section 22g functions as an identifying information extracting section referring to the network unit identifier table 22f-6 to extract an ATM network unit identification number serving as the terminal identifying information corresponding to the extracted port number, and further functions as an inserting section to insert the extracted terminal identifying information into the aforesaid ATM cell.

The information offering system 20C according to the fourth embodiment can carry out, for example, an audience research as an additional service in each of the leaf node units 23C-1 to 23C-8. That is, on the service offering unit 21 side, it is possible to tabulate the data about the service using status in the leaf node units 23C-1 to 23C-8.

Figure 39:
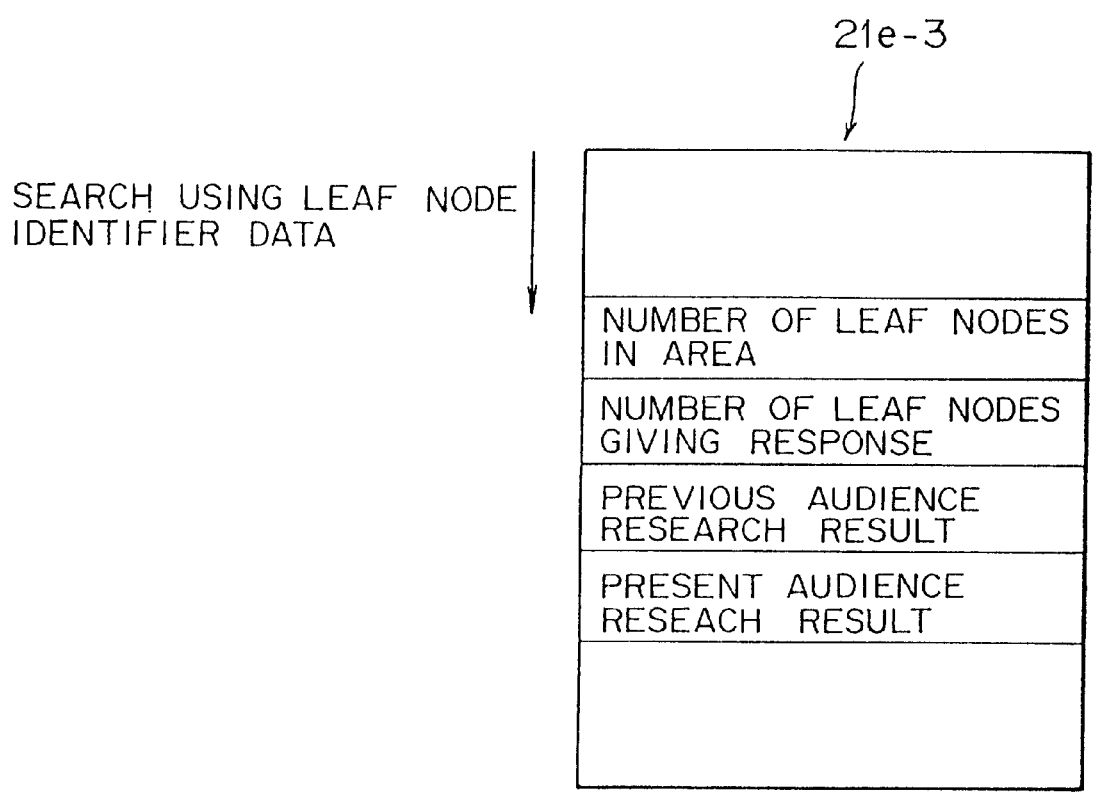
FIG. 39 is an illustration of an arrangement of a principal portion of a service offering unit in the fourth embodiment of this invention.

For this reason, the identifier recognition table 21e-3 of the service offering unit 21 in the fourth embodiment has, for instance, an arrangement shown in FIG. 39.

That is, in accordance with instructions from a leaf node recognition processing section 21f (see FIG. 7), this identifier recognition table 21e-3 records information (the number of leaf nodes in an area, the number of leaf nodes giving a response, the previous audience research result, and the present audience research result) necessary for the audience research in a state where the value of the leaf node identifier area 202B of the ATM cell 202 (see FIG. 15, 16 or 18) inputted from the high-rank ATM network units 22C-1 to 22C-2 is handled as the address information.

Whereupon, the service offering unit 21 refers to the identifier recognition table 21e-3 to obtain the information for carrying out desired audience research on the basis of the network unit identification number being the information set by grouping the identifying information for the leaf node units 23C-1 to 23C-8, and therefore, the tabulation of the research results is also possible in units of the grouped leaf node units 23C-1 to 23C-8.

Accordingly, the leaf node recognition processing section 21f and the identifier recognition table 21e-3 function as a transmission terminal identifying section for identifying the communication terminal being the sender on the basis of the terminal identifying information inserted into the received ATM cell.

Incidentally, in the fourth embodiment, the tabulation of the research results is made on the basis of the network unit identification numbers being the group numbers, and the group arrangement among the leaf node units 23C-1 to 23C-8 for performing the audience research is made with the set of leaf node units stored in each of the low-rank ATM network units 22C-3 to 22C-6.

Figure 40:
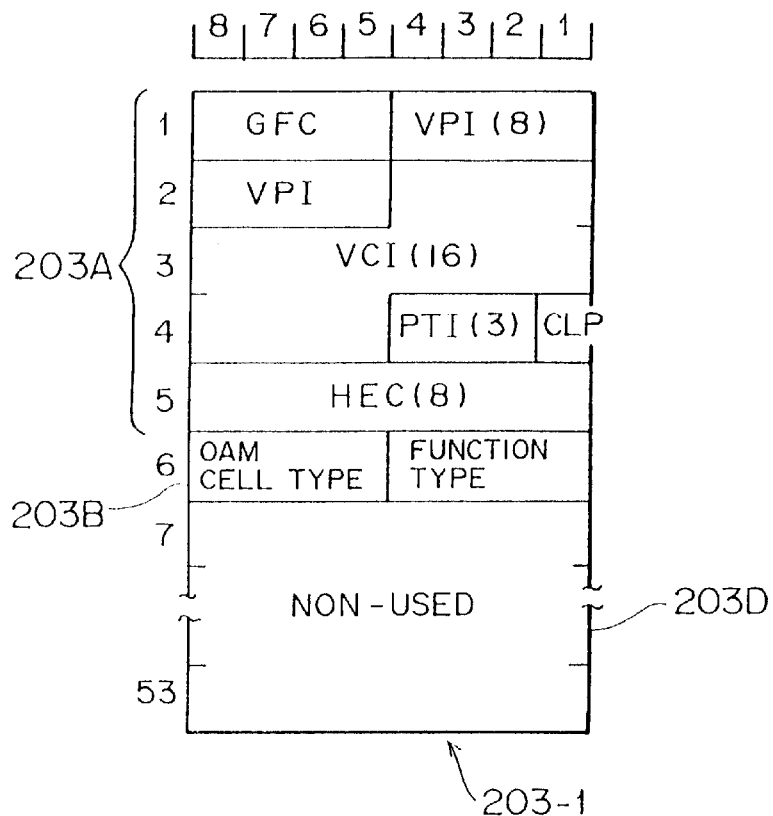
FIGS. 40 and 41 are illustrations of cell formats of an ATM cell transmitted and received in the information offering system according to the fourth embodiment of this invention.

In this case, the service offering unit 21 transmits, for example, an OAM cell 203-1 with a format shown in FIG. 40 to the leaf node units 23C-1 to 23C-8 which are in connection with lines, thereby informing the users of the fact of carrying out the audience research.

In the OAM cell 203-1 shown in FIG. 40, in addition to an OAM cell type (for instance, "1011") indicative of an additional service cell in the information offering system 20C, a function type representative of an audience research demand cell (for example, "0010") is set in the sixth-byte area 203B following a header area 203A. Incidentally, numeral 203D represents a non-used area.

Figure 41:
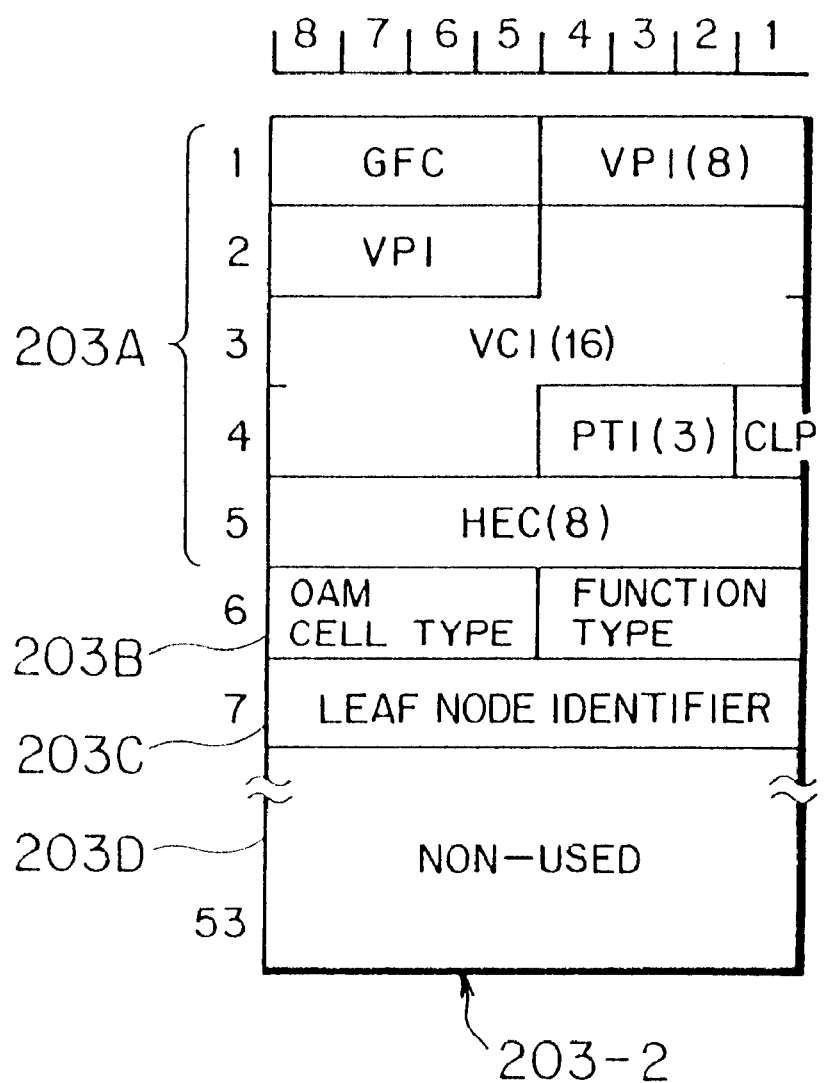

Furthermore, the user side leaf node units 23C-1 to 23C-8, which receive the notice indicative of the execution of the aforesaid audience research, arbitrarily transmit, in accordance with an instruction given from the service instruction section 23d through the user, an OAM cell 203-2 with a format exemplified by FIG. 41 as a return cell for the audience research to the service offering unit 21.

Accordingly, the identifier setting processing section 22g of each of the ATM network units 22C-1 to 22C-6 can insert the leaf node number serving as the terminal identifying information into the ATM cell (OAM cell) for the system maintenance and operation.

In the OAM cell 203-2 shown in FIG. 41, in addition to an OAM cell type (for instance, "1011") indicative of an additional service cell in the information offering system 20C, a function type representative of an audience research response cell (for example, "0011") is set in the sixth-byte area 203B subsequent to the header area 203A.

The next seventh-byte area 203C is the area for the insertion of the leaf node number (or the network unit identification number) serving as the leaf node identifier in the ATM network units 22C-1 to 22C-6. Further, numeral 203D depicts a non-used area.

Moreover, as well as the above-mentioned case, the identifier setting processing section 22g of each of the ATM network units 22C-1 to 22C-6 can also insert the leaf node number into a common OAM cell such as a loop back and a performance monitor. Whereupon, even in the ATM virtual channel being in the multicast connection, it is possible to confirm the channel connection between the respective leaf node units 23C-1 to 23C-8 and the service offering unit 21, which accomplishes the maintenance and operation management such as the confirmation of the communication conditions.

In the information offering system 20C according to the fourth embodiment of this invention, with the above-described arrangement, the respective leaf node units 23C-1 to 23C-8 receive the multimedia service, they require, from the service offering unit 21.

More specifically, when receiving, at each of the leaf node units 23C-1 to 23C-8, the offer of the multimedia service from the service offering unit 21, a demand for the multimedia service the user of each of the leaf node units 23C-1 to 23C-8 sets through the service instruction section 23d is forwarded as an ATM cell converted as control information including channel information.

The low-rank ATM network units 22C-3 to 22C-6 receiving the ATM including the demand for the multimedia service establish the multicast connection between the service offering unit 21 and the leaf node units 23C-1 to 23C-8, so that a plurality of leaf node units 23C-1 to 23C-8 can concurrently receive the same information from the service offering unit 21.

In the case that, in the low-rank ATM network units 22C-3 to 22C-6, the VPI/VCI for the multimedia service required is not set yet, the VPI/VCI can be set through the multicast connection between the high-rank ATM network units 22C-1, 22C-2 covering themselves.

For example, in the case of, in the service offering unit 21, carrying out as an additional service an audience research to be made at every group comprising the leaf node units 23C-1 to 23C-8, the OAM cell 203-1 indicative of carrying out the audience research is sent through the ATM network units 22C-1 to 22C-6 using the present service offering channel (the channel presently offering a multimedia service).

Figure 42:
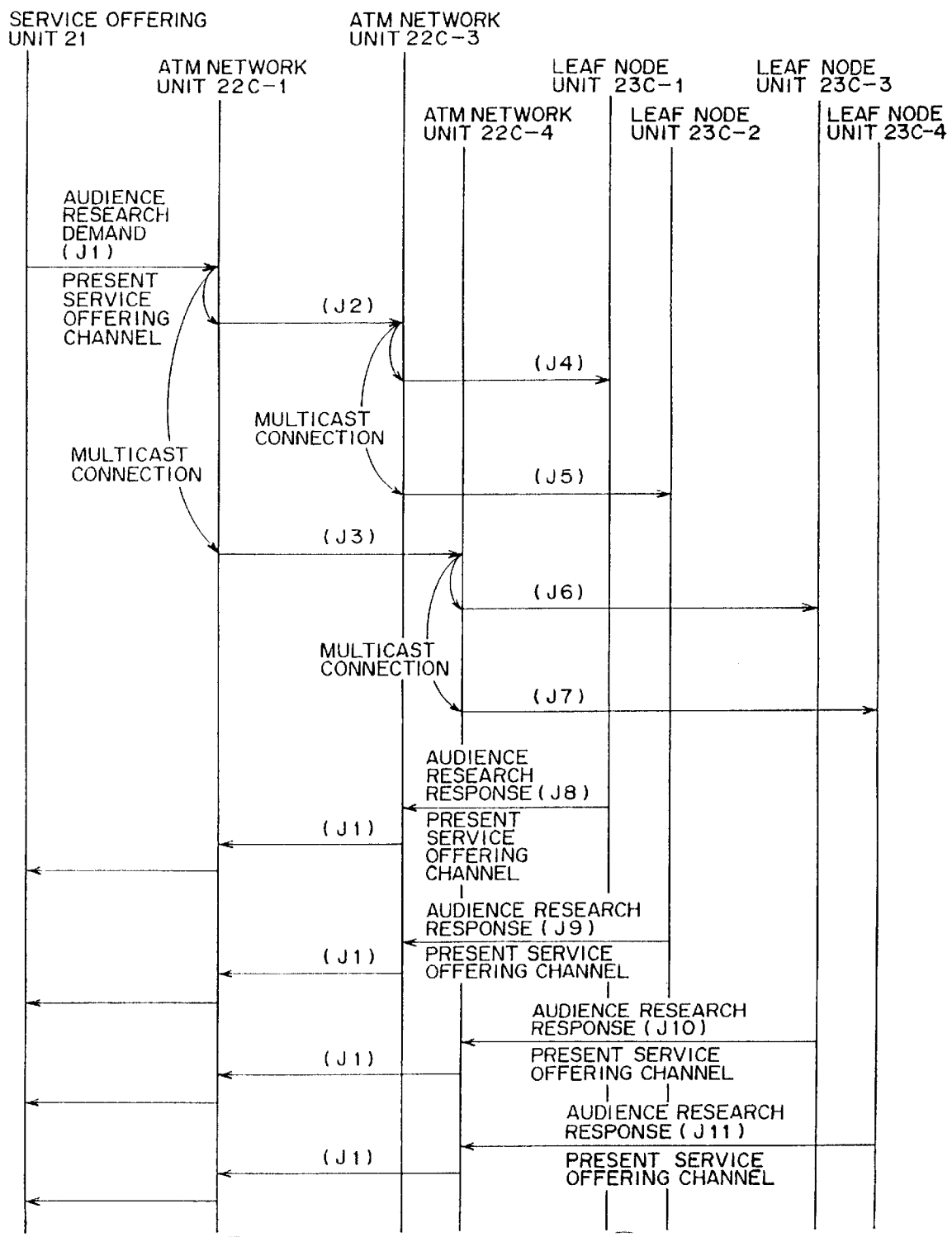
FIG. 42 is a signal sequence illustration for describing an operation of the information offering system according to the fourth embodiment of this invention.

For instance, in the case that the service offering unit 21 carries out the audience research with respect to the leaf node units 23C-1 to 23C-4 stored (indirectly) in the ATM network unit 22C-1, the transmission and reception of the audience research demand cell 203-1 and the audience research response cell 203-2 are done, for example, as shown in FIG. 42.

Even in the case of carrying out the audience research with respect to the leaf node units 23C-5 to 23C-8 stored (indirectly) in the ATM network unit 22C-2, the transmission and reception of the audience research demand cell 203-1 and the audience research response cell 203-2 are done in a similar way.

First, the audience research demand cell 203-1 inputted into the ATM network unit 22C-1 through the present service offering channel (J1) is simultaneously transferred to the low-rank ATM network units 22C-3, 22C-4 which are in the multicast connection (J2, J3).

The ATM network units 22C-3, 22C-4 transfer the audience research demand cell 203-1 from the high-rank ATM network unit 22C-1 to the leaf node units 23C-1, 23C-2 and 23C-3, 23C-4 they store, respectively (J4 to J7).

Whereupon, the leaf node units 23C-1, 23C-2, 23C-3, 23C-4 can receive the audience research demand cell 203-1 from the service offering unit 21 through the same channel (VPI/VCI, the present service offering channel) after the relay by the ATM network units 22C-1, 22C-3, 22C-4.

Furthermore, in the user side leaf node units 23C-1 to 23C-4 receiving the notice of the practice of the aforesaid audience research through the service control section 23c and others, in accordance with the instruction from the service instruction section 23d through the user, the audience research response cell 203-2 for the audience research is returned to the service offering unit 21 (J8 to J11).

Still further, in the ATM network units 22C-3, 22C-4 receiving the audience research response cell 203-2 from the leaf node units 23C-1 to 23C-4, the identifier setting processing section 22g inserts the leaf node number extracted on the basis of the port number into a leaf node identifier area 203C of that audience research response cell 203-2, with the resultant audience research response cell 203-2 being transferred to the high-rank ATM network unit 22C-1 (J12 to J15).

Figure 43:
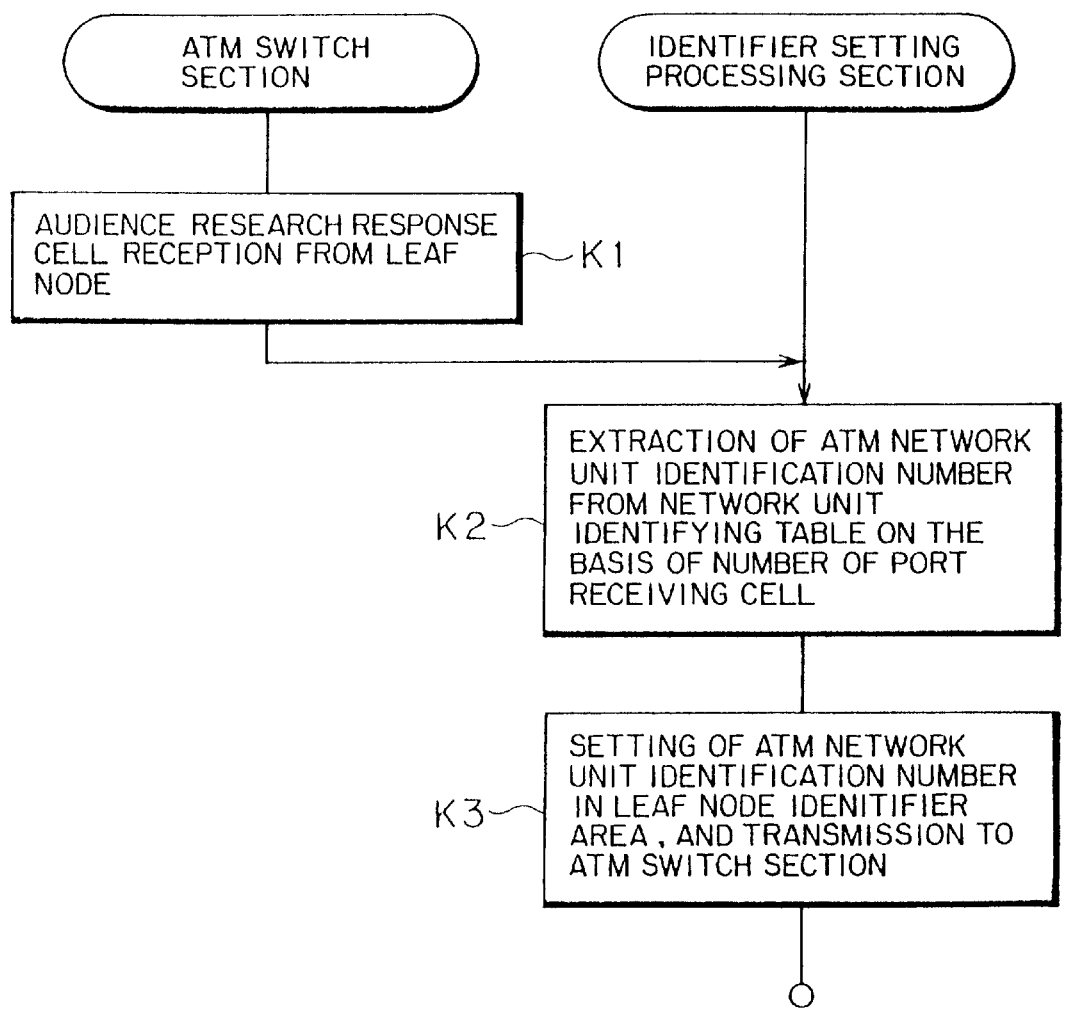
FIG. 43 is a flow chart for describing an operation of the information offering system according to the fourth embodiment of this invention.

Moreover, as shown in FIG. 43, in the ATM network unit 22C-1 receiving the audience research response cell 203-2 from the ATM network units 22C-3, 22C-4 (step K1), the identifier setting processing section 22g extracts the network unit identification number on the basis of the port number (step K2). Following this, in the aforesaid audience research response cell 203-2, the leaf node identifier area 203C is re-set to the network unit identification number extracted and the resultant audience research response cell 203-2 is transferred to the service offering unit 21 (step K3, see J16 to J19 in FIG. 42).

Thereafter, when the service offering unit 21 receives the audience research response cell 203-2 from the ATM network unit 22C-1, the identifier recognition table 21e-3 records information (the number of leaf nodes in an area, the number of leaf nodes giving a response, the previous audience research result, and the present audience research result) necessary for the audience research in a state where the data set in the leaf node identifier area 203C is treated as the address information.

Thus, in the service offering unit 21, the audience research data written in the identifier recognition table 21e-3 is read out in a manner that the network unit identification number serving as the group identifying information is used as the address information, then performing a necessary tabulation.

As described above, according to the fourth embodiment of this invention, at least one high-rank ATM network unit 22C-1 (22C-2) capable of accommodating a plurality of ATM network units 22C-3, 22C-4 (22C-5, 22C-6) is provided as a host of the ATM network units 22C-3 to 22C-6, and the data from the leaf node units 23C-1 to 23C-8 is transmitted through the ATM network units 22C-1 to 22C-6 to the service offering unit 21. Therefore, in addition to the advantages the above-described second embodiment can provide, the system expansion is further possible.

Furthermore, the high-rank ATM network unit 22C-1 (22C-2) converts the leaf node identifier included in the data from the ATM network units 22C-3 to 22C-6 into identifying information managed in the high-rank network unit and then transmits it, and the management of the leaf node units 23C-1 to 23C-8 can be conducted in a manner that the network units 22C-3 to 22C-6 respectively including the leaf node units are handled as identification units, and hence, it is possible to facilitate the management or control of the respective leaf node units 23C-1 to 23C-8.

Still further, since the identifier setting processing section 22g of the ATM network units 22C-1 to 22C-6 can perform the insertion of the leaf node identifier being the terminal identifying information into the OAM cell for the system maintenance and operation, even in the ATM virtual channel being in the multicast-connected condition, the service offering unit 21 can confirm the channel connection with the respective leaf node units 23C-1 to 23C-8, thus allowing the maintenance and operation management such as the confirmation of the communication condition.

Figure 44:
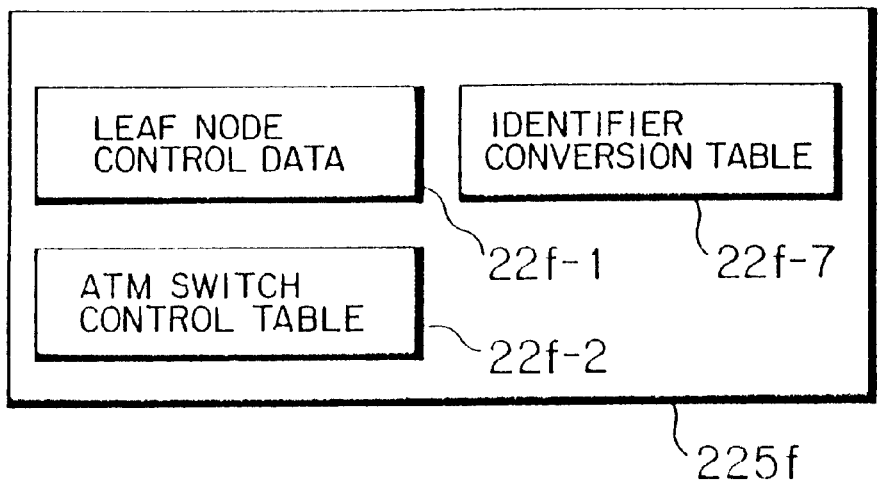
FIGS. 44 and 45 are modifications of the fourth embodiment of this invention.

Although, in the above-described fourth embodiment, the set of leaf node units stored in each of the low-rank ATM network units 22C-3 to 22C-6 are treated as data tabulation units for the audience research in the service offering unit 21, this invention is not limited to this, but it is also appropriate that, for example, as shown in FIG. 44, a storage section 225f is equipped with an identifier conversion table 22f-7 so that a set of arbitrary leaf node units is used as the data tabulation units for the aforesaid audience research.

In this case, the storage section 225f shown in FIG. 44 includes leaf node control data 22f-1 and an ATM switch control table 22f-2 which are similar to those (see numeral 222f) in the second embodiment, and further includes the identifier conversion table 22f-7.

Figure 45:
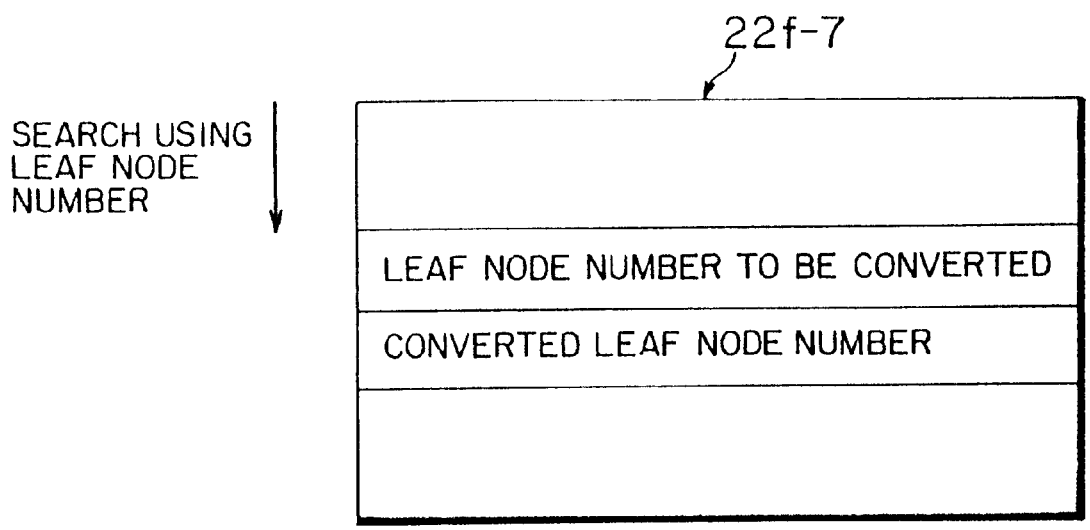

Furthermore, for example, as shown in FIG. 45, the identifier conversion table 22f-7 is for allocating and recording the converted leaf node numbers in a state where the leaf node numbers inserted in the audience research response cells 203-2 in the low-rank ATM network units 22C-3 to 22C-6 are used as the address information.

The converted leaf node number is arbitrarily set, thus providing an arbitrary group arrangement which are not restricted by the leaf node units to be stored.

Figure 46:
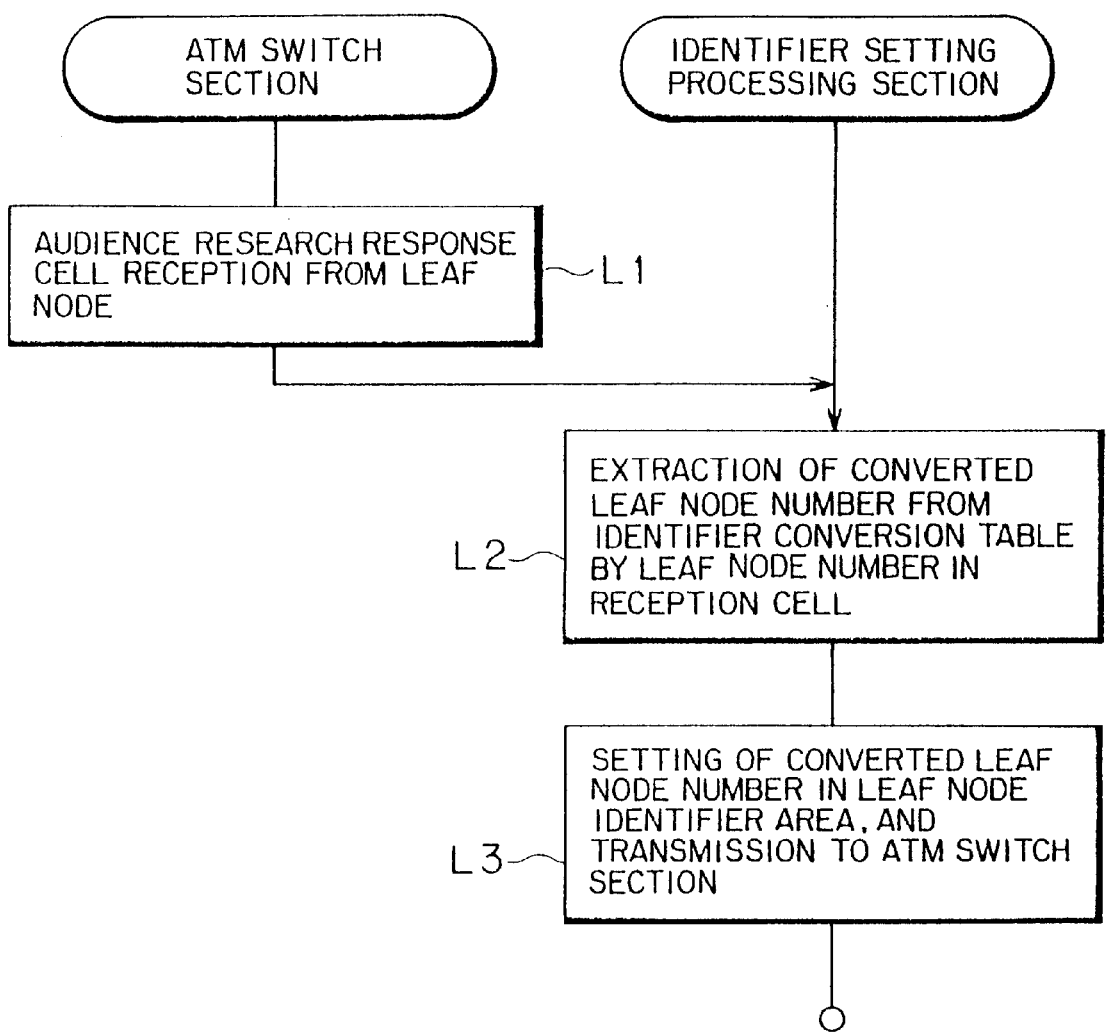
FIG. 46 is a flow chart for explaining an operation of an information offering system according to the modification of the fourth embodiment of this invention.

That is, as shown in FIG. 46, when the identifier setting processing section 22g of the high-rank ATM network units 22C-1, 22C-2 receives the audience research response cell 203-2 for the service offering unit 21 (step L1), the search is done in a state where the leaf node number being converted (the leaf node number inserted in the audience research response cell 203-2 in the low-rank ATM network units 22C-3 to 22C-6) set in the leaf node identifier area 203C of the audience research response cell 203-2 is used as the address information, thereby extracting the converted leaf node number (step L2).

Still further, on extracting the converted leaf node number, the identifier setting processing section 22g re-sets the leaf node number to be converted set in the leaf node identifier area 203C to the extracted converted leaf node number, and then transmits it to the service offering unit 21 (step L3).

In the service offering unit 21, when receiving the audience research response cell 203-2 from the ATM network unit 22C-1, the identifier recognition table 21e-3 records information (the number of leaf nodes in an area, the number of leaf nodes giving a response, the previous audience research result, and the present audience research result) necessary for the audience research in a state where the data set in the leaf node identifier area 203C is used as the address information.

As a result, it is possible to extract the data necessary for the audience research from the identifier recognition table 21e-3 at set of leaf node units arbitrarily grouped, and further to achieve the data tabulation.

Thus, with this arrangement, the terminal identifying information can be made with the information set peculiarly at every communication terminal group comprising arbitrarily leaf node units of the leaf node units 23C-1 to 23C-8, and hence, without being restricted by the ATM network units to be stored, arbitrary grouping can be conducted among the leaf node units 23C-1 to 23C-8 stored in a plurality of ATM network units 22C-1, 22C-2, so that it is possible to arbitrarily set the managing and controlling mode for the leaf node units 23C-1 to 23C-8, thereby enlarging the degree of freedom in the system design.

(f) Description of a Fifth Embodiment

Figure 47:
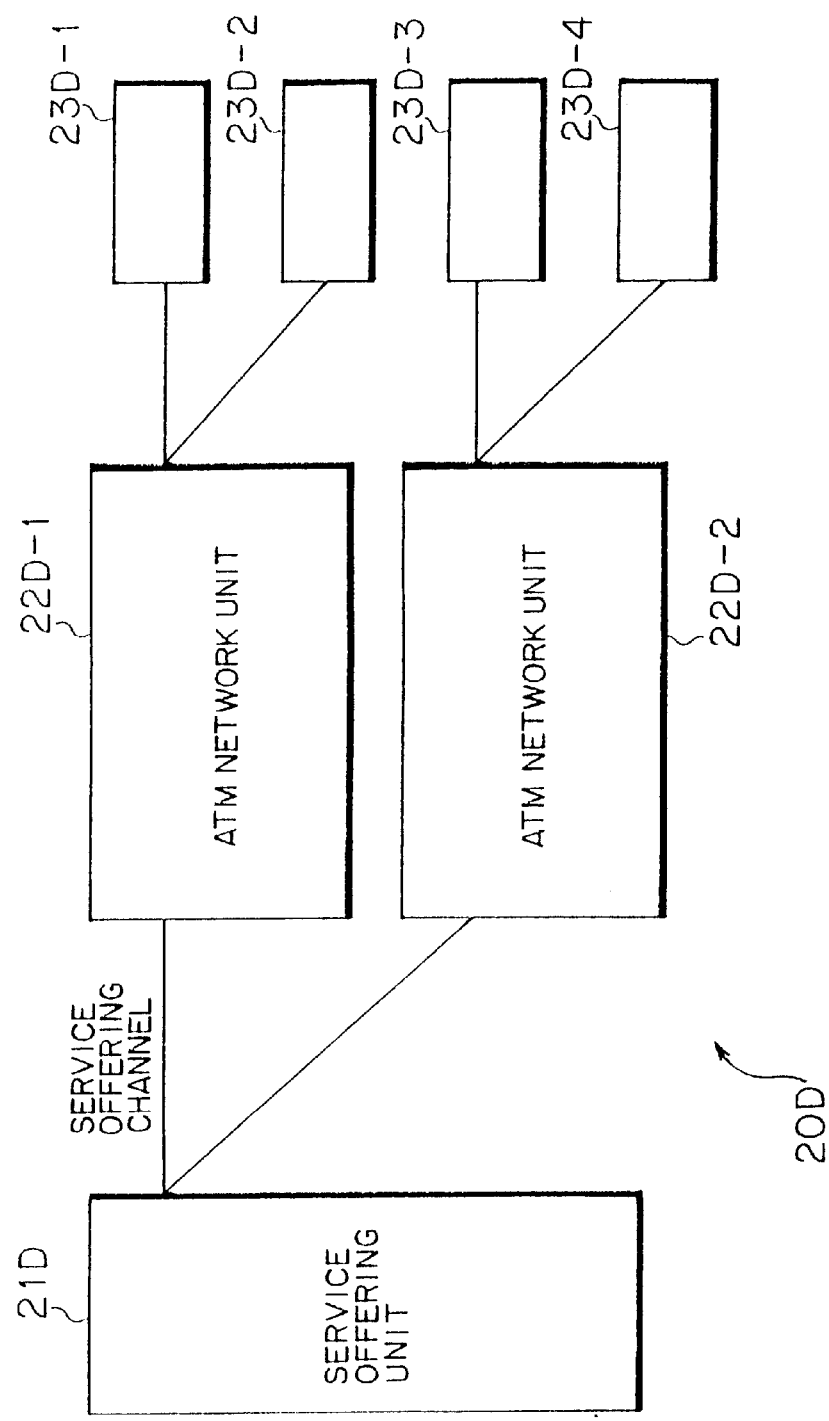
FIG. 47 is a block diagram showing an information offering system according to a fifth embodiment of the present invention.

FIG. 47 is a block diagram showing an information offering system according to a fifth embodiment of the present invention. In the information offering system generally designated at numeral 20D in FIG. 47, as well as the above-described system (20B) according to the third embodiment, a service offering unit 21D and a plurality of (for example, 2) ATM network units 22D-1, 22D-2 are connected to each other through service offering channels 24 while the ATM network unit 22D-1 stores 2 leaf node units 23D-1, 23D-2 and the ATM network unit 22D-2 stores two leaf node units 23D-3, 23D-4.

As in the case of the above-described second embodiment, the ATM network units 22D-1, 22D-2 of the information offering system 20D according to the fifth embodiment insert the leaf node numbers into the ATM cells to be transmitted from the leaf node units 23D-1 to 23D-4 to the service offering unit 21D, but it differs from the above-described respective embodiments in that, in accordance with an instruction from the service offering unit 21D, the inserting mode (for example, the inserted position or area size of an ATM cell) into an ATM cell of the terminal identifying information is variable.

Concretely, in the service offering unit 21, a segment communication is made using an OAM (Operation And Maintenance) cell, so that the position of a leaf node identifier area 202B or an area size can arbitrarily be set for the insertion into the ATM cell to be transmitted from the leaf node units 23D-1 to 23D-4 to the service offering unit 21D side.

Figure 48:
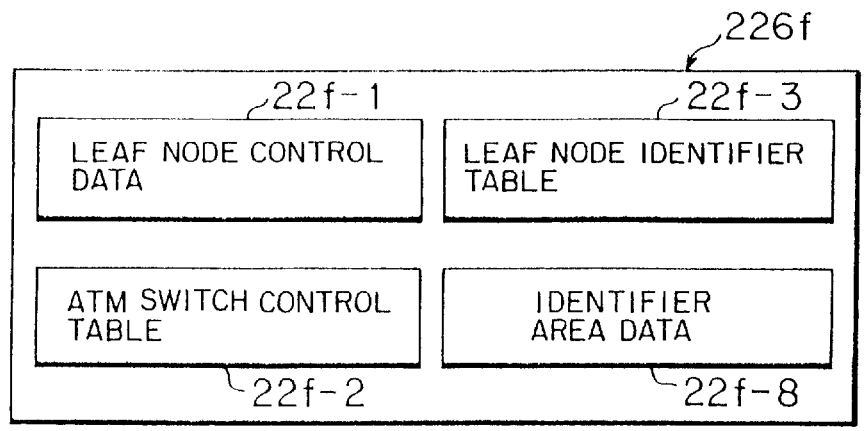
FIG. 48 is a block diagram showing an arrangement of a principal portion of an ATM network unit in the fifth embodiment of this invention.
Figure 49:
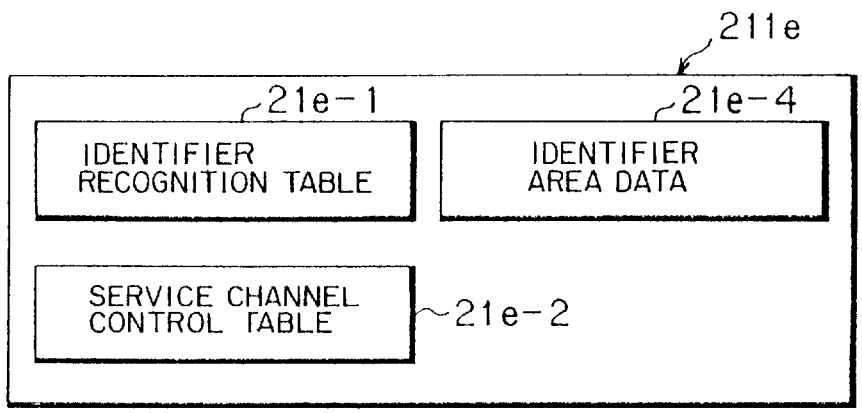
FIG. 49 is a block diagram showing an arrangement of a principal portion of a service offering unit in the fifth embodiment of this invention.

For this reason, in the information offering system 20D according to this invention, the service offering unit 21D is provided with a storage section 211e, for example shown in FIG. 49, while the ATM network units 22D-1, 22D-2 are equipped with a storage section 226f, for instance, shown in FIG. 48.

The service offering unit 21D and the ATM network units 22D-1, 22D-2 basically have the same arrangements as those (see reference numerals 21a to 21d, 21f, 22a to 22e, and 22g) in the above-described second embodiment, except the arrangements of the storage sections 226f, 211e, and hence the description and illustration thereof will be omitted for brevity.

In addition, as shown in FIG. 48, the storage section 226f of each of the ATM network units 22D-1, 22D-2 is provided with leaf node control data 22f-1 , an ATM switch control table 22f-2 and a leaf node identifier table 22f-3 as well as that (see reference numeral 222f) in the above-described second embodiment, and further equipped with identifier area data 22f-8.

On the other hand, for example, as shown in FIG. 49, the storage section 211e of the service offering unit 21D is provided with an identifier recognition table 21e-1 and a service channel control table 21e-2 which are similar to those in the second embodiment, and further equipped with identifier area data 21e-4.

Figure 50:
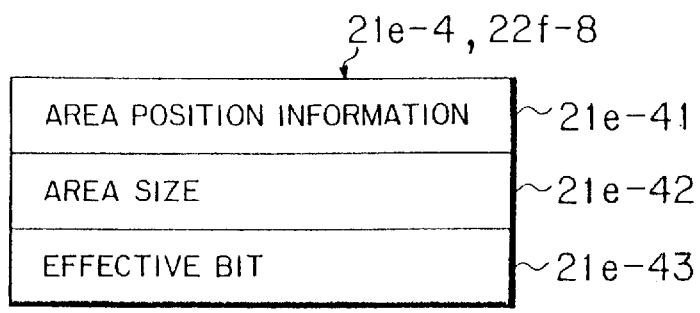
FIG. 50 is an illustration of an arrangement of a principal portion of the service offering unit and/or the ATM network unit in the fifth embodiment of this invention.

For instance, as shown in FIG. 50, each of the identifier area data 22f-8 of the storage section 226f and the identifier area data 21e-4 of the service offering unit 21D comprises area position information 21e-41, an area size 21e-42 and an effective bit 21e-43.

The area position information 21e-41 is for identifying how many bytes from the pay load head position subsequent to the header section it is, while the area size 21e-42 is representative of the actual number of bytes in the leaf node identifier area, and even the effective bit 21e-43 serves to designate which of bits in the identifier object area for identifying the leaf node units 23D-1 to 23D-4 is effective or ineffective as the identification number, for example, the bit whose information is "0" is ineffective as the identifying information, whereas the bit of "1" is effective as the identifying information.

In the ATM cell 202 to be transmitted from the leaf node units 23D-1 to 23D-4 to the service offering unit 21D, there is provided a leaf node identifier area 202B in which a leaf node number is set to identify the leaf node unit being the sender, and the position or size of the leaf node identifier area 202B can be set in the service offering unit 21D.

That is, in the service offering unit 21D, in a manner that an OAM cell 204 for changing the position and size of the leaf node identifier area 202B as shown in FIG. 51 is transmitted to the ATM network units 22D-1, 22D-2, the setting of the area 202B for the leaf node number to be inserted into the ATM cell 202B to the service offering unit 21D is changeable.

In this case, as the information of a pay load section subsequent to a header area 204A of the OAM cell 204 shown in FIG. 51, in the first 1-byte area 204B, there are set information (for example, "1111") indicative of a system information cell serving as an OAM cell type and information (for example, "0001") representative of a cell for changing the leaf node position acting as the function type.

Furthermore, in a 1-byte area 204C subsequent to the area 204B, there is set information ("0" to "47" in the decimal system) for setting how many bytes from the head of the pay load section the leaf node identifier area 202B is set, while in a 1-byte area 204D following the area 204C, there is set a value indicative of the size of the leaf node identifier area 202B in units of bytes ("1" to "48" in the decimal system).

Still further, area 204E subsequent to the area 204D is representative of the number of effective bits in the leaf node identifier area, and FIG. 51 shows the case that the leaf node identifier area 202B assumes 2 bytes.

In the information offering system 20D according to the fifth embodiment of this invention, with the above-described arrangements, basically as in the case of the above-described second embodiment, the leaf node units 23D-1 to 23D-4 can receive the multimedia services, they require, from the service offering unit 21D through the ATM network units 22D-1, 22D-2.

The ATM cell 202 to be transmitted from the leaf node units 23D-1 to 23D-4 to the service offering unit 21D is provided with a leaf node identifier area 202B for setting the leaf node number for identifying the leaf node unit being the sender, with the position and size of the leaf node identifier area 202B being set in the service offering unit 21D.

Figure 52:
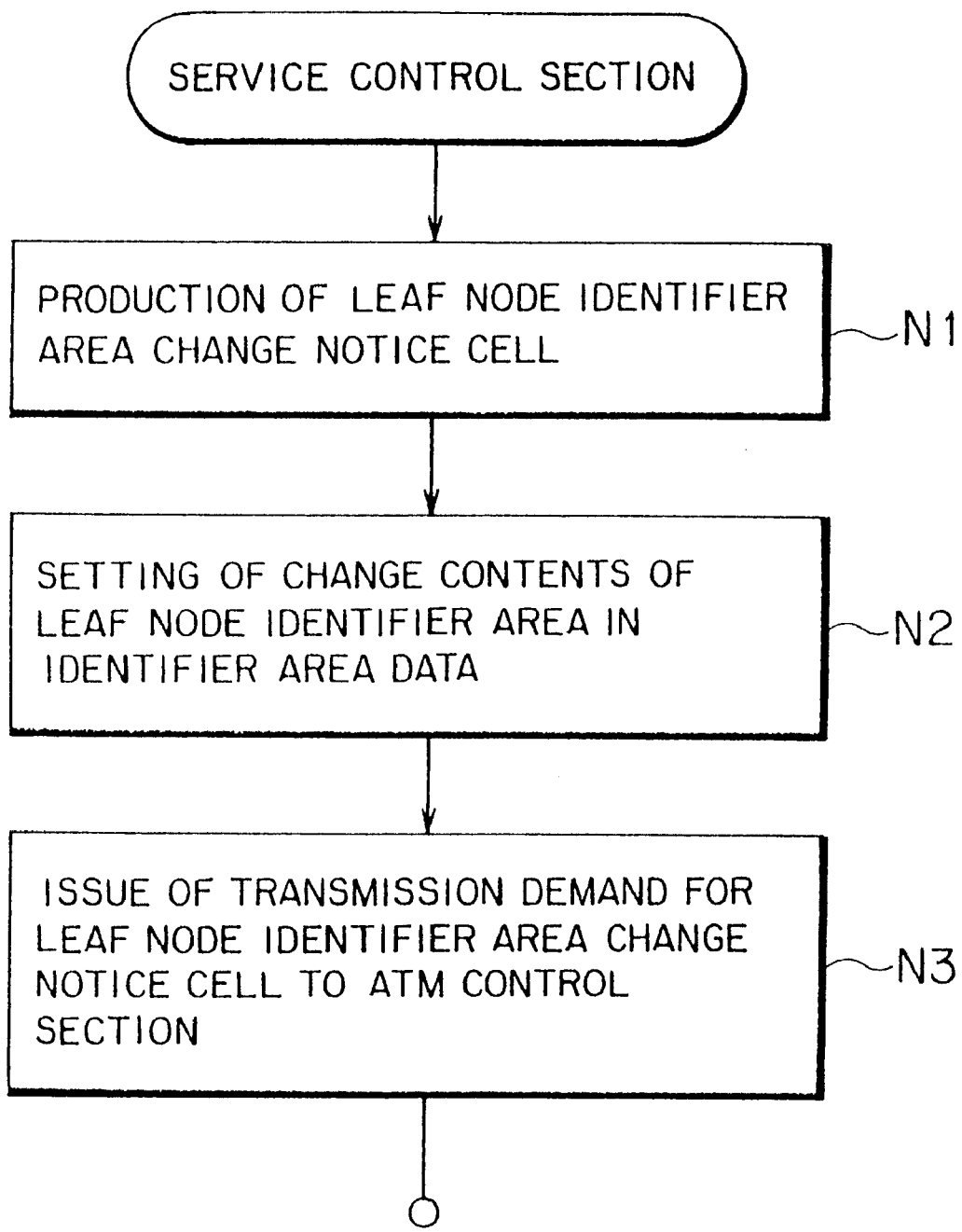
FIG. 52 is a flow chart for describing an operation of the fifth embodiment of this invention.

More specifically, as shown in FIG. 52, a service control section 21d of the service offering unit 21D creates a leaf node identifier area change notice cell 204 (step N1), and after the setting of the position and size of the leaf node identifier area 202B corresponding to the changed contents in the identifier area data 21e-4 (step N2), informs an ATM control section 21b of a demand for the transmission of the created leaf node identifier area change notice cell 204 (N3).

Figure 53:
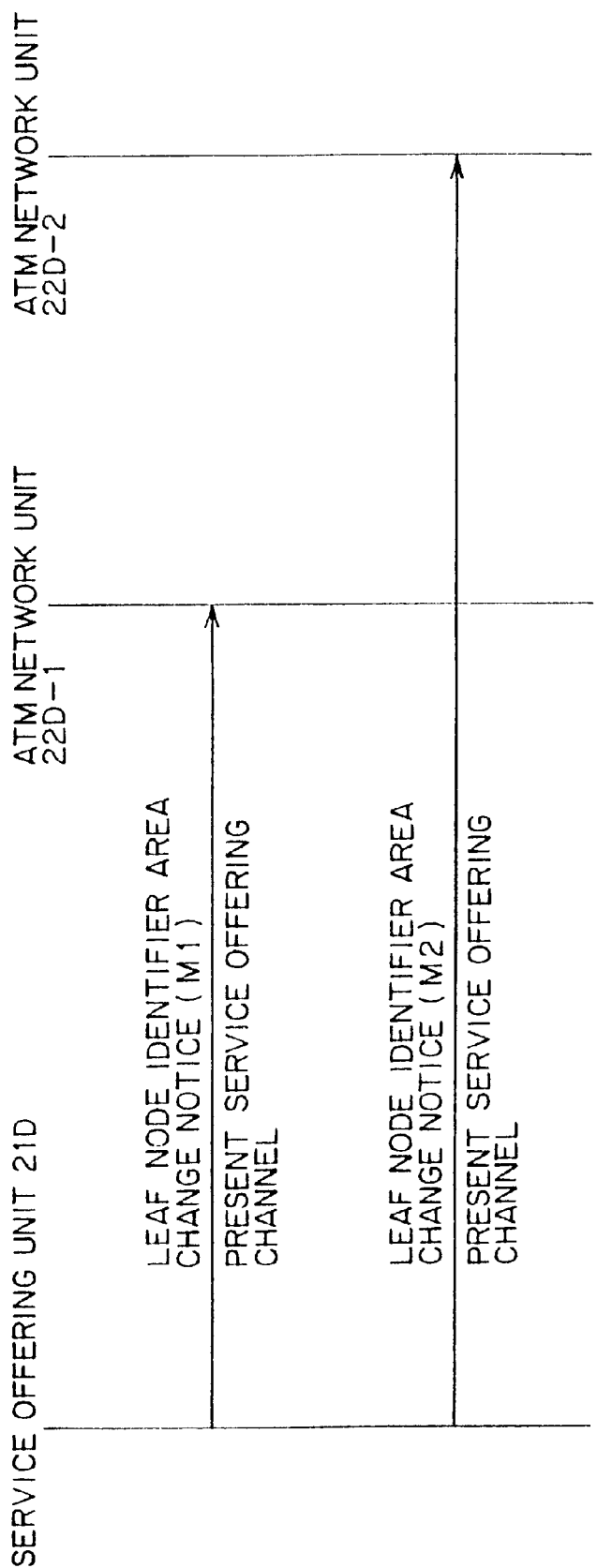
FIG. 53 is a signal sequence illustration for explaining an operation of the fifth embodiment of this invention.
Figure 54:
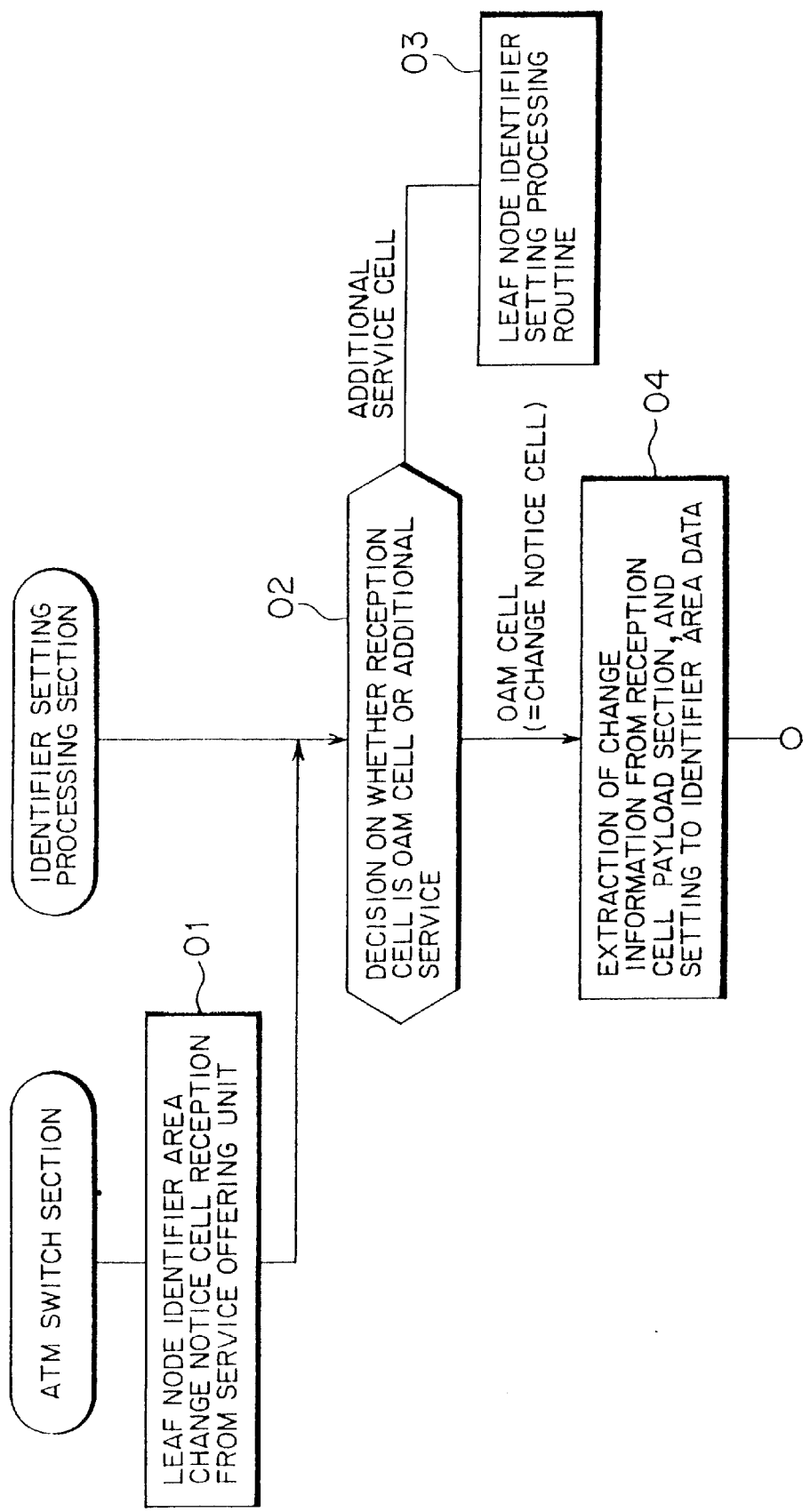
FIG. 54 is a flow chart for explaining an operation of the fifth embodiment of this invention.

Thus, as shown in FIG. 53, the service offering unit 21D transmits the leaf node identifier area change notice cell 204 (M1, M2) through the present service offering channel 24 to the ATM network units 22D-1, 22D-2. The ATM network units 22D-1, 22D-2 can change the position and size of the leaf node identifier area 202B to be inserted in the ATM cell 202 on the basis of the change of setting.

When an ATM switch section 22c of each of the ATM network units 22D-1, 22D-2 receives the leaf node identifier area change notice cell 204 from the service offering unit 21D (step O1, "change notice cell" route from step O2), an identifier setting processing section 22g extracts the change information (the information written in the areas 204C to 204E) from the pay load section of the received cell and sets it in the identifier area data 22f-8 (step O4).

Whereupon, the identifier setting processing section 22g of each of the ATM network units 22D-1, 22D-2 can insert the leaf node number extracted on the basis of the port number in the leaf node identifier area 202B undergoing the change in the position and size in the ATM cell 202 to be inputted for the service offering unit 21D.

In cases where the ATM cell to be inputted to each of the ATM network units 22D-1, 22D-2 is the ATM cell (ATM cell to be transmitted to the service offering unit 21D) including additional information from the leaf node units 23D-1 to 23D-4, in the setting registered with the present identifier area data 22f-8, the leaf node number is inserted as well as the above-described second embodiment (step O3).

As described above, according to the fifth embodiment of this invention, since the inserting mode of the leaf node number into the transmission ATM cell is variable in accordance with an instruction from the service offering unit 21D, particularly there is a need to increase the quantity of information serving as the lead node identifiers because of the increase in the number of subscribers, the change of setting is easily possible, so that it is possible to improve the system expansion in addition to providing advantages similar to those of the above-described second embodiment.

Although, in the above-described fifth embodiment, the leaf node identifiers are inserted in the ATM network units 22D-1, 22D-2, in a substantially similar way this invention is also applicable to an information offering system in which the leaf node numbers are inserted in the leaf node units 23D-1 to 23D-4.

(g) Description of a Sixth Embodiment

Figure 55:
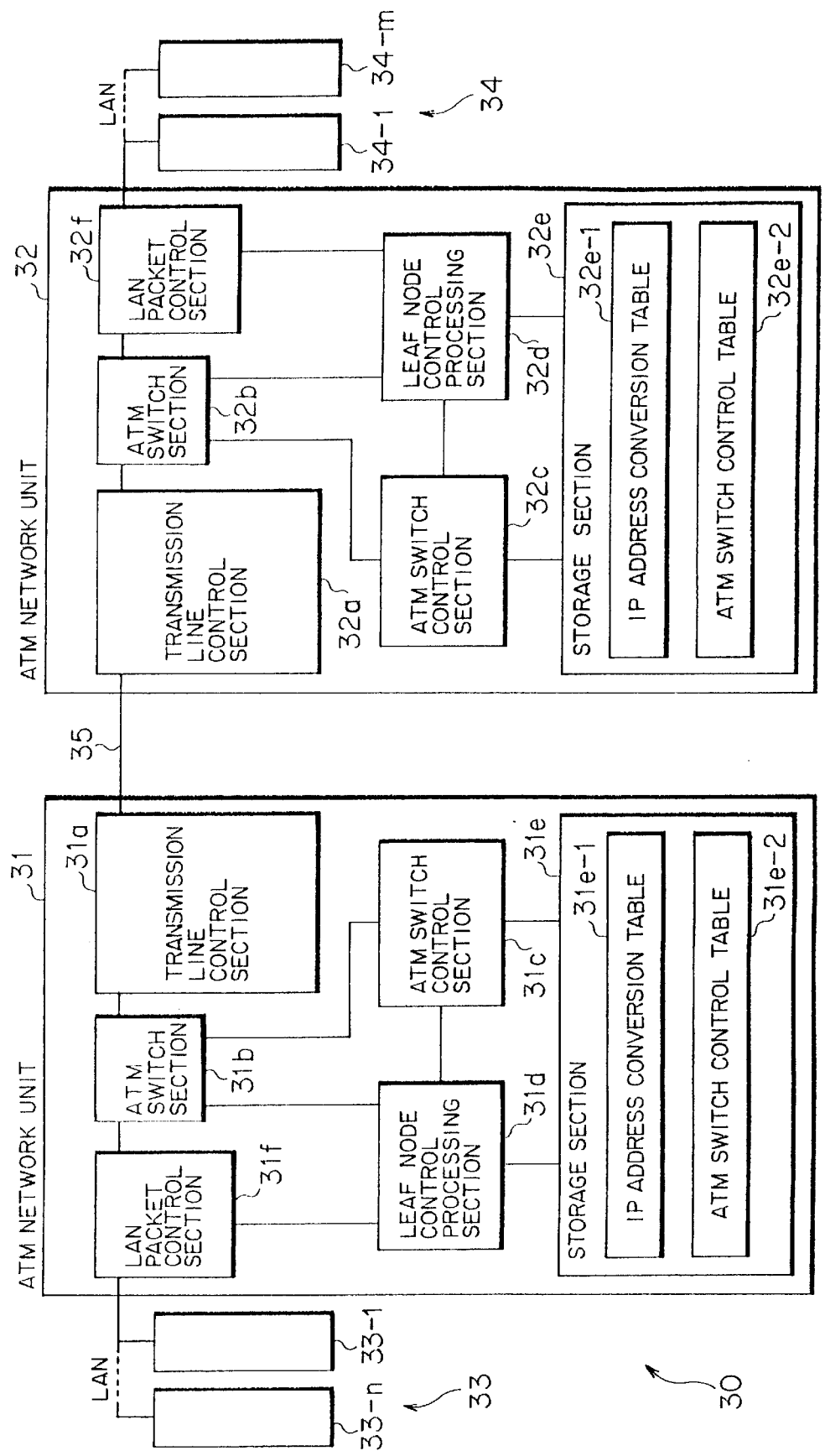
FIG. 55 is a block diagram showing an information communication system according to a sixth embodiment of the present invention.

FIG. 55 is a block diagram showing an information communication system according to a sixth embodiment of the present invention. In FIG. 55, in the information communication system generally denoted at numeral 30, ATM network units 31, 32 serving as two opposed fixed-length cell transmitting and receiving units are connected to each other through a line 35 acting as a fixed-length cell network to establish the connection between LANs 33, 34.

The ATM network unit 31 stores communication terminals 33-1 to 33-n (n: a natural number being 2 or more) serving as a plurality of leaf nodes constituting the LAN (Local Area Network) 33 having a communication protocol different from an ATM communication protocol, and the ATM network unit 32 stores communication terminals 34-1 to 34-m (m: a natural number being 2 or more) acting as a plurality of leaf nodes organizing the LAN 34 with a communication protocol different from the ATM communication protcol.

That is, among the respective communication terminals 33-1 to 33-n and 34-1 to 34-m, it is possible to construct LANs which do not depend upon the ATM network units 31, 32 accommodating them.

Furthermore, in the information communication system 30 according to the sixth embodiment, a network according to an ATM protocol serving as an inter-LAN communication channel is put in between the LANs 33, 34 having the communication protocols other than that of the ATM, so that the reception side ATM network unit 32 can recognize the communication terminal being the sender (for example, the ATM network unit 31 side communication terminals 33-1 to 33-n) which mutually performing the information communications.

The foregoing network conforming with the ATM protocol is composed of the two ATM network units 31, 32 and a line or circuit 35 for the connection between these ATM network units 31, 32.

Furthermore, as describe above, the LAN 33 is equipped with, for example, n communication terminals 33-1 to 33-n allowing the mutual communication therebetween through an LAN packet, and, for example, an IP (Internet Protocol) address being unique terminal identifying information is given to each of the communication terminals 33-1 to 33-n.

In a similar way, the LAN 34 is provided with, for example, m communication terminals 34-1 to 34-m allowing the mutual communications through an LAN packet, and, for example, an IP address serving as unique terminal identifying information is assigned to each of the communication terminals 34-1 to 34-m.

Furthermore, for example, a single VPI/VCI is set to the line 35 between the ATM network units 31, 32.

The ATM network unit 31 is composed of a transmission line control section 31a, an ATM switch section 31b, an ATM switch control aection 31c, a leaf node control porcessing section 31d, a storage section 31e, and a LAN packet control section 31f, and similarly, the ATM network unit 32 is made up of a transmission line control section 32a, an ATM switch section 32b, an ATM switch control section 32c, a leaf node control processing seciton 32d, a storage seciton 32e, and a LAN packet control section 32f.

The arrangements of the ATM network units 31, 32 are basically the same, and the components (numberals 31a to 31f) of the ATM network unit 31 correspond to the components (numerals 32a to 32f) of the ATM network unit 32, respectively.

The following description will be made of the components (numerals 31a to 31f) of the ATM network unit 31.

The transmission line control section 31a of the ATM network unit 31 conducts the interface processing between the line 35 and the internal circuits of that ATM network unit. In more detail, the transmission line control section 31a extracts an ATM cell from a transmission signal coming through the line 35 and further maps an AtM cell from the ATM switch section 31b into a transmission signal and then forwards it through the line 35.

The LAN packet control section 31f divides a packet signal from the communication terminals 33-1 to 33-n conforming with the communication protocol of the LAN 33 into ATM cells and outputs them to the ATM switch section 31b, and further couples the ATM cell from the ATM switch section 31b to the packet signal conforming with the communication protocol of the LAN 33 and forwards it to the LAN 33.

Thus, the LAN packet control section 31f functions as a first terminal identifying information outputting section to receive the information to be transmitted from the communication terminal 33 and to output an IP address acting as first terminal identifying information.

Furthermore, the ATM switch section 31b conducts a switching operation for the inputted ATM cell, while the ATM switch control section 31c controls and manages the connection of the VPI/VCI in accordance with an instruction from the leaf node control processing section 31d.

In addition, the ATM switch control section 31c operates the ATM switch section 31b in accordance with the instruction from leaf node control processing section 31d (which will be described later) to control the connection and disconnection of channels for various services from the service offering unit 21 and further updates the contents of an ATM switch control table 31e-2.

The leaf node control processing section 31d manages the communication terminals 33-1 to 33-n on the basis of control information from the communication terminals 33-1 to 33-n being the leaf nodes, and further produces control information to be transmitted to the communication terminals 33-1 to 33-n.

In addition, this leaf node control processing section 31d, in the case of performing the information communication between the LANs 33, 34, refers to the contents of the storage section 31e, which will be mentioned later, to make the conversion between the leaf node identifier and the IP address.

In other words, the leaf node control processing section 31d functions as a second terminal identifying information extracting section to extract the leaf node identifier serving as second terminal identifying information conforming with the line 35 acting as an ATM network, on the basis of the IP address from the LAN packet control section 31f, and further functions as a fourth terminal identifying information extracting section to extract an IP address being fourth terminal identifying information conforming with the communication protocol of the LAN 33 on the basis of the leaf node identifier being the third terminal identifying information included in the reception ATM cell from the ATM switch section 31b.

When extracting the leaf node identifier being the second terminal identifying information, the leaf node control processing section 31d gives an instruction to the ATM switch control section 31c to produce an ATM cell using this leaf node identifier.

Thus, the aforesaid ATM switch control section 31c functions as a second terminal identifying information inserting section to insert the leaf node identifier extracted in the leaf node control processing section 31d into the ATM cell after the conversion.

Furthermore, when extracting the IP address being the fourth terminal identifying information, the aforesaid leaf node control processing section 31d issues an instruction to the LAN packet control section 31f to insert the extracted IP address into the information conforming with the communication protocol of the LAN 33 after the conversion.

Thus, the LAN packet control section 31f functions as a fourth terminal identifying information inserting section to insert the IP address extracted in the leaf node control processing section 31d into the information conforming with the communication protocol of the LAN 33 after the conversion.

The storage section 31e serves as a storage device to register and manage various information in the ATM network unit 31, and is composed of an IP address conversion table 31e-1 and an ATM switch control table 31e-2.

Figure 56:
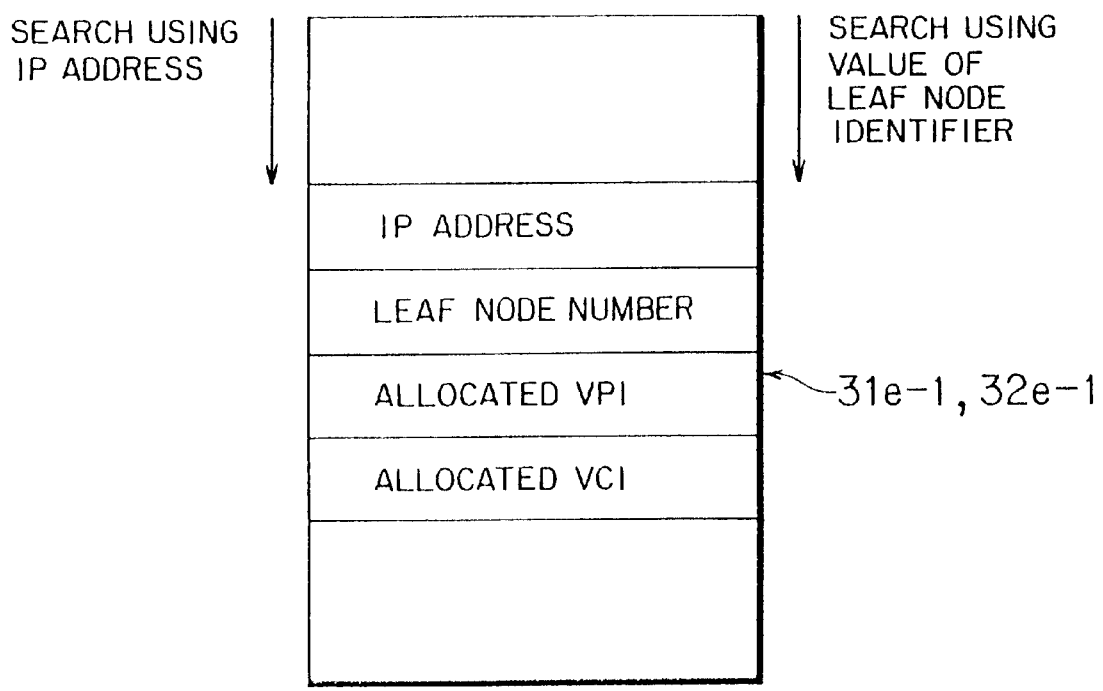
FIG. 56 is a block diagram showing an arrangement of a principal portion of an ATM network unit in the sixth embodiment of this invention.

For example, as shown in FIG. 56, the IP address conversion table 31e-1 retains the IP address, the leaf node number and the VPI/VCI allocated to each IP address or leaf node number. Whereupon, the leaf node control processing section 31d can extract the leaf node number and the allocated VPI/VCI on the basis of the IP address or can extract the IP address and the allocated VPI/VCI on the basis of the leaf node number.

In other words, the IP address conversion table 31e-1 (32e-1) functions as an identifying information table to retain the information about the corresponding relation between the IP address being the terminal identifying information to be converted and the leaf node number being the conversion result and the information about the corresponding relation between the leaf node number being the terminal identifying information to be converted and the IP address being the conversion result.

The ATM switch control table 31e-2, as well as that in the above-described second embodiment, records a switching identifying flag at every VPI/VCI, an on-switching port number and a stopper (FFh) which are information to be used for the switching control in the ATM network unit 31.

In a similar way to that shown in FIG. 15, 16 or 18, the foresaid ATM switch control section 31c can insert the leaf node identifier into the ATM cell to be transmitted from the ATM switch section 31b to the opposed ATM network unit 32 side.

That is, as well as the case shown in FIG. 15, the ATM switch control section 31c can insert the leaf node identifier into the data section of an ATM cell constituting the transmission cell data, or as shown in FIG. 16, it can insert the leaf node identifier in a non-used area of the header section of the ATM cell organizing the transmission cell data.

Moreover, as shown in FIG. 18, the leaf node identifier can be composed of variable-length bit data, or can be information set peculiarly to each of the communication terminals 33-1 to 33-n (or 34-1 to 34-m) constituting the LAN 33 (or LAN 34) or information set peculiarly at every communication terminal group comprising a plurality of communication terminals 33-1 to 33-n (or 34-1 to 34-m).

Figure 57:
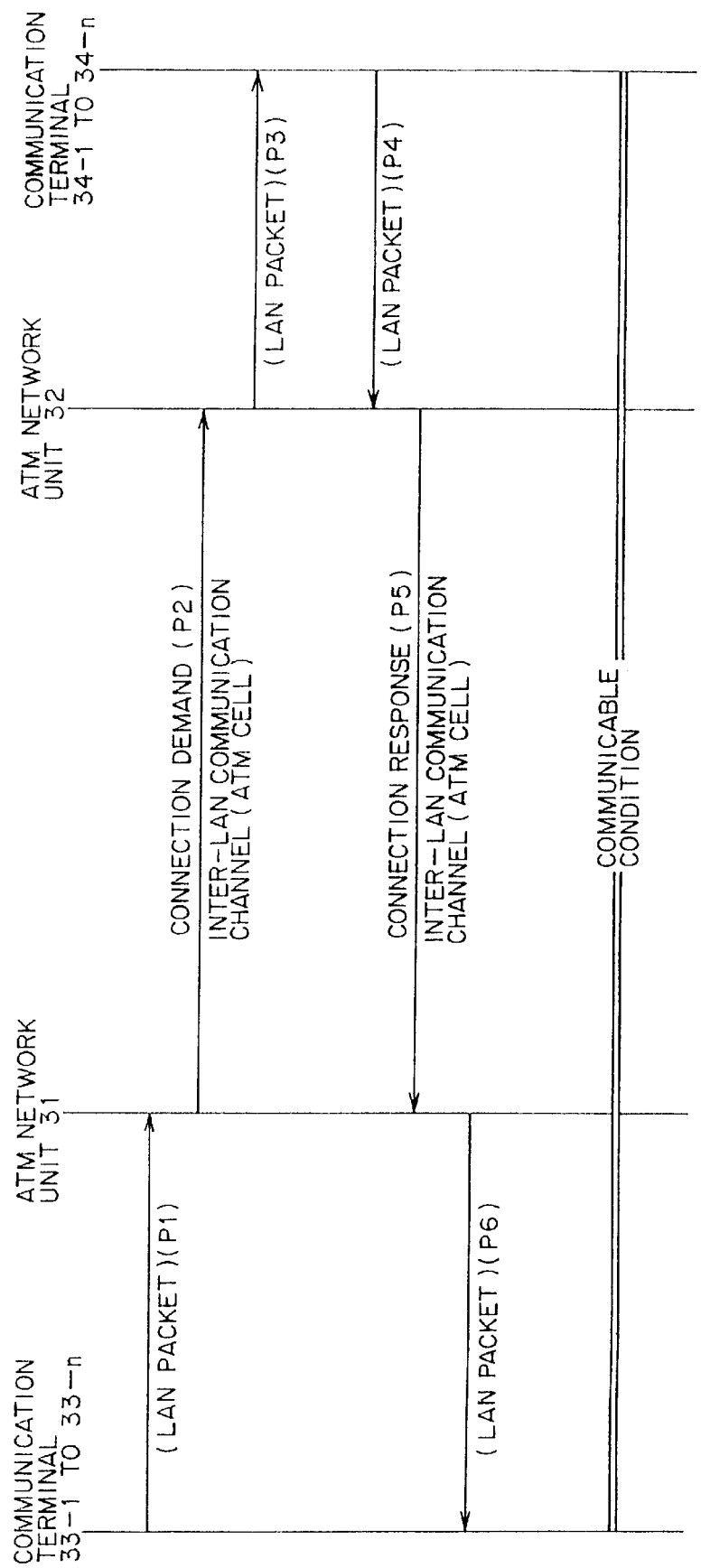
FIG. 57 is a signal sequence illustration for describing an operation of the sixth embodiment of this invention.

In the information communication system 30 according to the sixth embodiment of this invention, with the above-described arrangement, in making the inter-LAN connection between the communication terminals 33-1 to 33-n of the LAN 33 and the communication terminals 34-1 to 34-m of the LAN 34, the path setting processing can be done as shown in FIG. 57.

That is, when the ATM network unit 31 receives, from the communication terminals 33-1 to 33-n, a demand for the inter-LAN communication between any one of the communication terminals 33-1 to 33-n on the LAN 33 side and any one of the communication terminals 34-1 to 34-m on the LAN 34 side (P1), it issues a connection demand through the line 35 being the inter-LAN communication channel to the ATM network unit 32 accepting the other party LAN 34 (P2). For this connection demand, an ATM cell is used as an information transmission medium.

Figure 58:
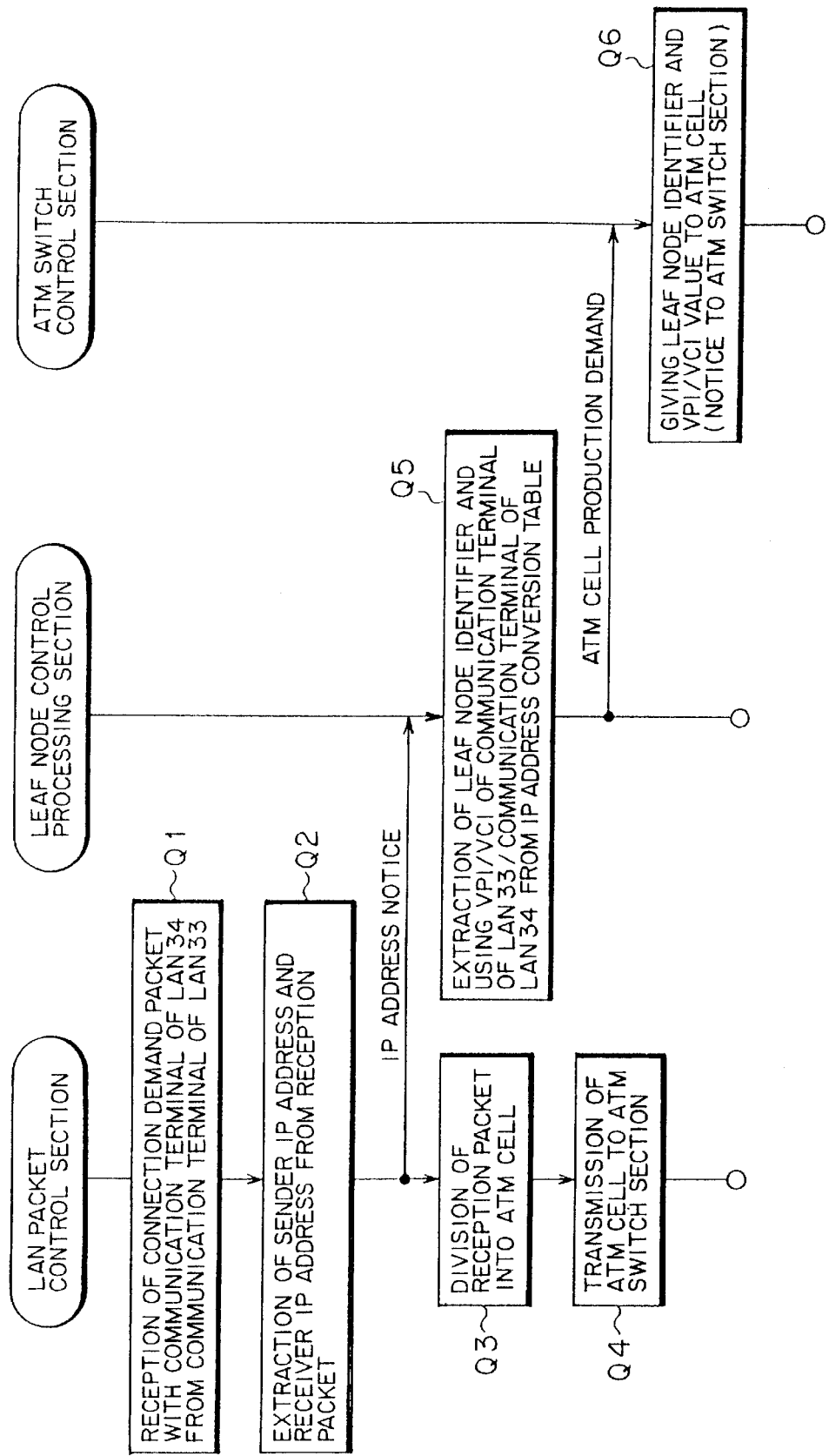
FIGS. 58 and 59 are flow charts for describing an operation of the sixth embodiment of this invention.
Figure 59:
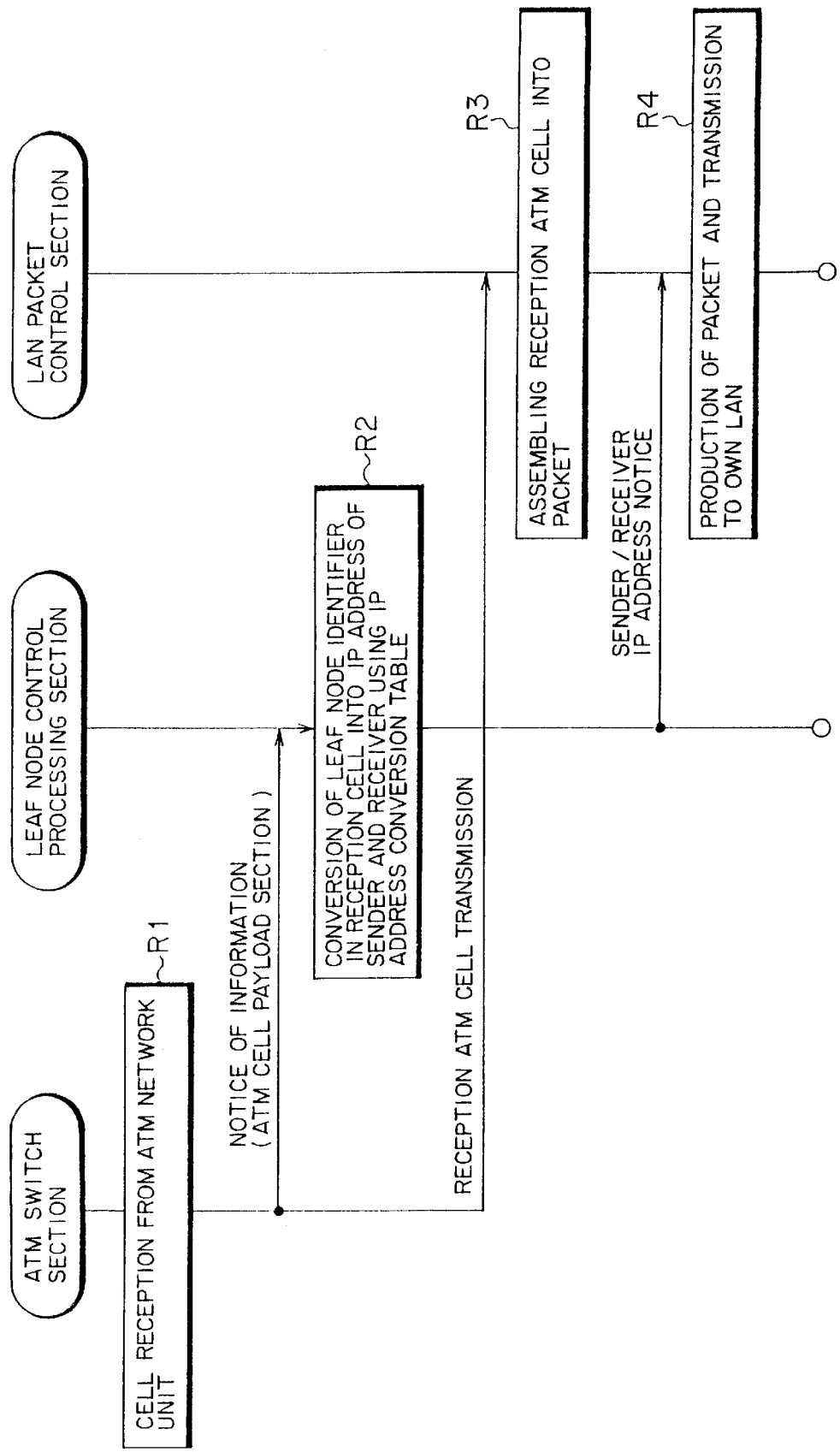

More specifically, as shown in the flow chart of FIG. 58, the LAN packet control section 31f of the ATM network unit 31 receives a LAN packet being the information to be transmitted any one of the communication terminals 33-1 to 33-n (step Q1), and derives the IP address of one of the communication terminals 33-1 to 33-n being the sender, which serves as the first terminal identifying information included in this LAN packet and further derives the IP address of one of the communication terminals 34-1 to 34-m being the receiver (destination), and then outputs both the IP addresses to the leaf node control processing section 31d (step Q2).

In addition, the LAN packet control section 31f divides the connection demand LAN packet from the communication terminals 33-1 to 33-n into ATM cells (which will be referred hereinafter to as connection demand ATM cells) (step Q3), before transmitting them to the ATM switch section 31b (step Q4).

At this time, the leaf node control processing section 31d refers to the IP address conversion table 32e-1 on the basis of the two IP addresses from the LAN packet control section 31f to extract the leaf node number of the sender serving as the second terminal identifying information (conforming with the ATM communication protocol) different from the IP address, the leaf node number of the receiver, and the allocated VPI/VCI (step Q5), and further gives an instruction to the ATM switch control section 32c to insert the leaf node numbers of the sender and the receiver into the connection demand ATM cell switched (step Q6).

The ATM switch control section 31c refers to the ATM switch control table 31e-2 to control the setting in the ATM switch section 32b to conduct given switching processing of the inputted connection demand ATM cell on the basis of the allocated VPI/VCI.

Thus, the connection demand ATM cell subjected to the insertion of the leaf node number is outputted through the transmission line control section 31a and the line 35 to the ATM network unit 32 after the desired switching operation based upon the allocated VPI/VCI in the ATM switch section 31b.

Furthermore, the ATM network unit 32, receiving the aforesaid connection demand, receives the notice of the occurrence of the demand for the foregoing inter-LAN communication to the third party communication terminals 34-1 to 34-m (P3).

That is, the transmission line control section 32a of the ATM network unit 32 receives the transmission signal from the ATM network unit 31 through the line 35, and extracts the ATM cell from the received transmission signal and outputs the extracted ATM cell to the ATM switch section 32b (step R1).

On the contents of the ATM switch control table 32e-2, the ATM switch control section 32c controls the setting in the ATM switch section 32b to conduct given switching processing of the inputted ATM cell on the basis of the VPI/VCI value.

Furthermore, the leaf node control processing section 32d is informed of the information in the pay load section of the ATM cell inputted to the ATM switch section 32b, and extracts the IP addresses of the sender and the receiver, which are the terminal identifying information conforming with the communication protocol of the LAN 34, on the basis of the leaf node numbers of the sender and the receiver, which are the terminal identifying information taken out from that pay load section (step R2).

Still further, the LAN packet control section 32f converts the ATM cell switched in the ATM switch section 32b into a Lan packet signal conforming with the communication protocol of the LAN 34 (step R3). At this time, the LAN packet organized also includes the IP address converted in the leaf node control processing seciton 32d (step R4).

Whereupon, the LAN packet constituting the aforesaid connection demand is transmitted to the third party communication terminals 34-1 to 34-m in a state of including the IP addressees of the sender and receiver, thus informing of the occurrence of the demand for the inter-LAN communication.

Thereafter, when detecting the response from the third party communication terminals 34-1 to 34-m to the ATM network unit 32 (P4), the ATM network unit 32 notifies the connection response through the line 35 being the aforesaid inter-LAN communication channel to the ATM network unit 31 (P5). Similarly, for this connection response, the ATM cell is used as the information tranmission medium.

Accordingly, with the LAN packet, the ATM network unit 31 notifies the connection response to the communication terminals 33-1 to 33-n which issued the connection demand, and subsequently, a path is set between the LANs 33, 34, thus getting into the communicable condition (P6).

Thus, the ATM network 31 converts the connection demand information transmitted from the communication terminals 33-1 to 33-n into an ATM cell and transmits it, whereas the ATM network unit 32 receives the connection demand ATM cell through the ATM network (line 35) from the communication terminals 33-1 to 33-n stored in the opposed side ATM network unit 31, and identifies one of the communication terminals 33-1 to 33-n being the sender on the basis of the leaf node number included in this ATM cell.

Needless to say, even the communication terminals of the reception side LAN 34 can recognize the communication terminal of the sender on the basis of the IP address included in the received LAN packet.

Furthermore, even in transmitting the connection demand information from any one of the communication terminals 34-1 to 34-m constituting the LAN 34 to any one of the communication terminals 33-1 to 33-n organizing the LAN 33, the information communication basically similar to the above-mentioned case is made, and the reception side ATM network unit 31 can identify one of the communication terminals 34-1 to 34-m being the sender.

As described above, according to the sixth embodiment of this invention, the ATM network unit 31 (32) is composed of the transmission line control section 31a (32a), the ATM switch section 31b (32b), the ATM switch control section 31c (32c), the leaf node control processing section 31d (32d), the storage section 31e (32e) and the LAN packet control section 31f (32f), and the network conforming with the ATM protocol which serves as the inter-LAN communication channel is put between the LANs 33, 34. Thus, the reception side ATM network unit 32 (31) can identify the sender communication terminals 33-1 to 33-n (34-1 to 34-m) in a state of performing the mutual information communication. Further, in the information communication system in which the LANs are coupled to each other through ATM network, the ATM network units 31, 32 can easily manage the respective communication terminals 33-1 to 33-n and 34-1 to 34-m.

(h) Description of a Seventh Embodiment

Figure 60:
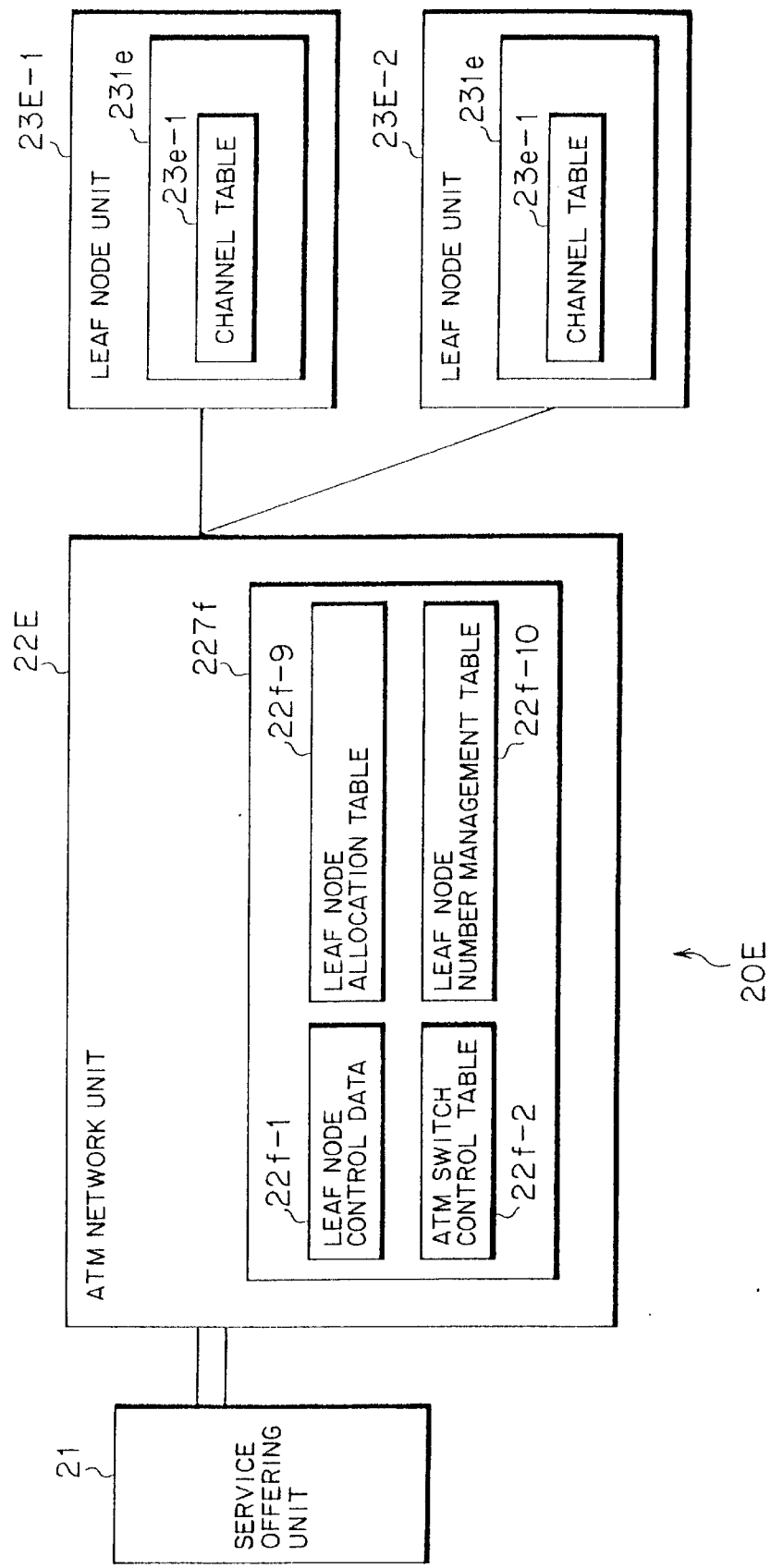
FIG. 60 is a block diagram showing an information offering system according to a seventh embodiment of the present invention.

FIG. 60 is a block diagram showing an information offering system 20E according to a seventh embodiment of the present invention. The information offering system 20E shown in FIG. 60 is made to offer an SVC (Switched Virtual Channel) function, and an ATM network unit 22E manages and controls the leaf node numbers.

The information offering system 20E according to the seventh embodiment is provided with a service offering unit 21 and leaf node units 23E-1, 23E-2 which have the same arrangements those in the above-described second embodiment, and further is equipped with an ATM network unit 22E.

That is, the service offering unit 21 functions as an information offering unit to offer various information such as multimedia information to leaf node units 23E-1, 23E-2 serving as the communication terminals.

The ATM network unit 22E stores a plurality of leaf node units 23E-1, 23E-2 and offers, of the various information from the service offering unit 21, the information required from each of the leaf node units 23E-1, 23E-2 through the VPI/VCI set peculiarly to the information to that leaf node unit 23E-1 or 23E-2.

In FIG. 60, the other detailed arrangements of the respective units 21 to 23E-1, 23E-2 are the same as those (see FIG. 22) in the above-described second embodiment, and hence the description thereof will be omitted for simplicity.

The ATM network unit 22E according to the seventh embodiment is provided with a storage section 227ƒ different from that in the second embodiment. The storage section 227ƒ is equipped with leaf node control data 22ƒ-1 and an ATM switch control table 22ƒ-2 which are similar to those in the second embodiment, and further is provided with a leaf node allocation table 22ƒ-9 and a leaf node number management table 22ƒ-10.

Figure 61:
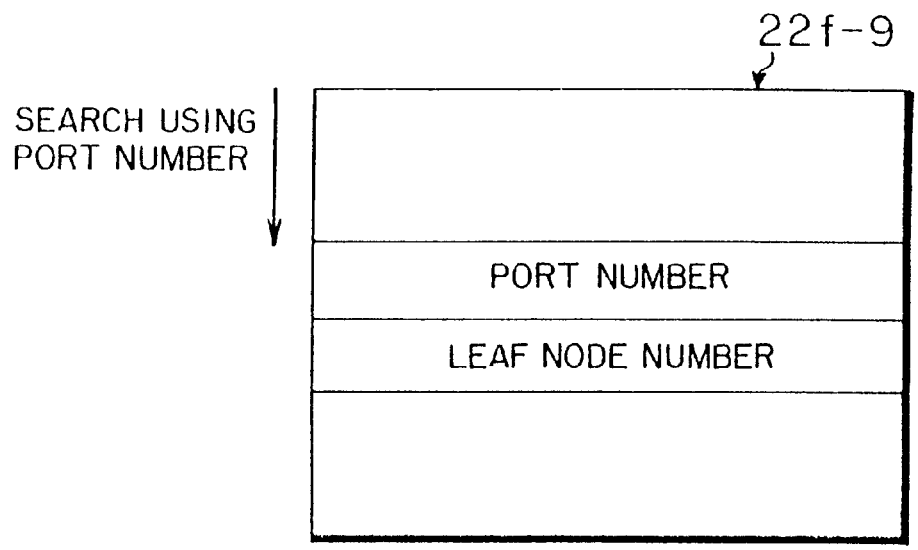
FIGS. 61 and 62 are block diagrams showing arrangements of principal portions of an ATM network unit in the seventh embodiment of this invention.

The leaf node allocation table 22ƒ-9 is for registering the leaf node numbers allocated to the respective leaf node units 23E-1, 23E-2 at every port number, and its detailed arrangement is as shown in FIG. 61.

Figure 62:
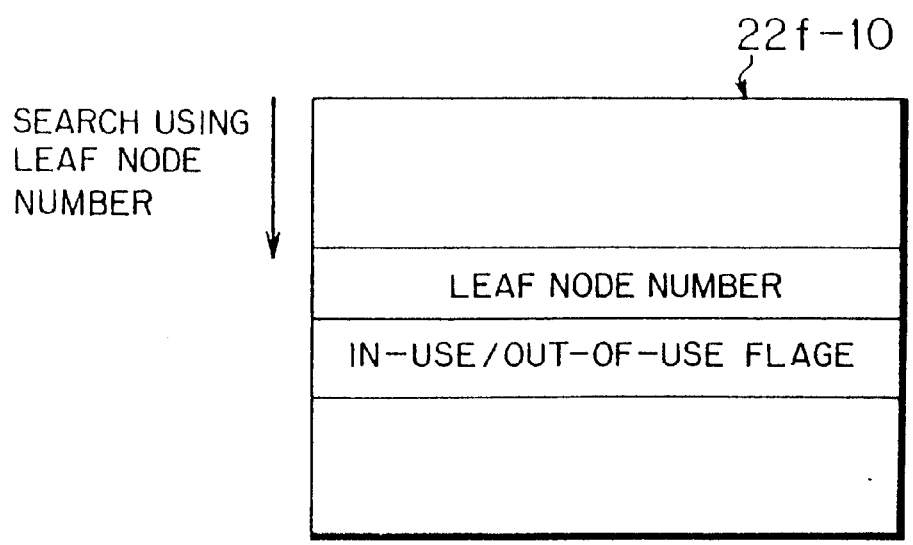

The leaf node number management table 22ƒ-10 is for registering the allocation states (in-use/out-of-use conditions) of the leaf node numbers arbitrarily set, and its detailed arrangement is, for example, as shown in FIG. 62. For instance, in the case that the leaf node number is out of use, "0" is registered with the corresponding area, while, when being in use, "1" is registered with the corresponding area.

Thus, in the information offering system 20E according to the seventh embodiment, an ATM switch control section 22d refers to the leaf node number management table 22ƒ-10 to set the arbitrary non-used leaf node numbers as the leaf node numbers of the leaf node units 23E-1, 23E-2 being the set-up demanders.

The set leaf node numbers are registered with the leaf node allocation table 22ƒ-9 in a state where the port numbers of the line connection ports (not shown) in which the leaf node units 23E-1, 23E-2 are set are used as the address information.

Figure 63:
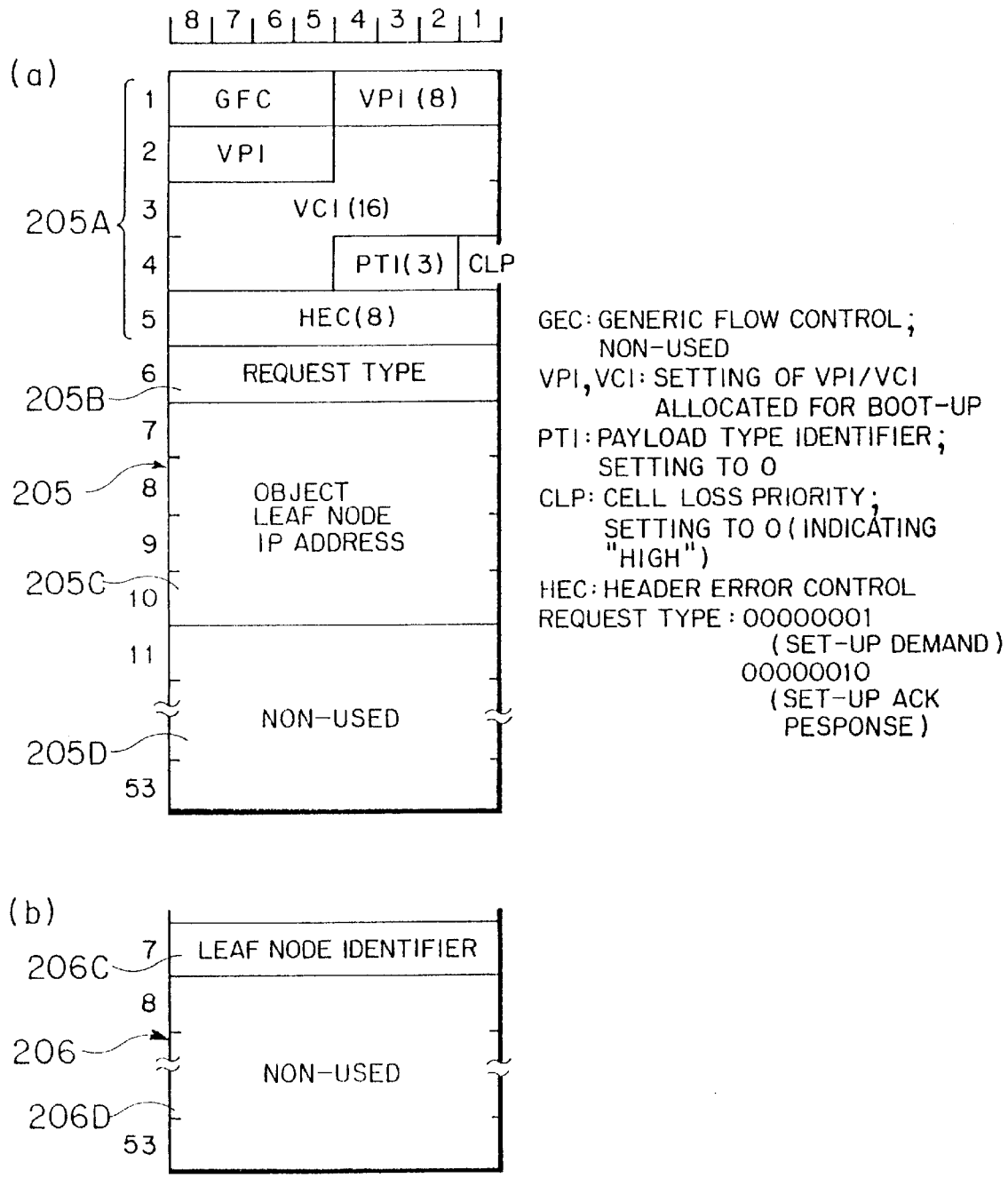
FIGS. 63($a$), 63($b$) and 64 are illustrations of cell formats of an ATM cell transmitted and received in the seventh embodiment of this invention.
Figure 65:
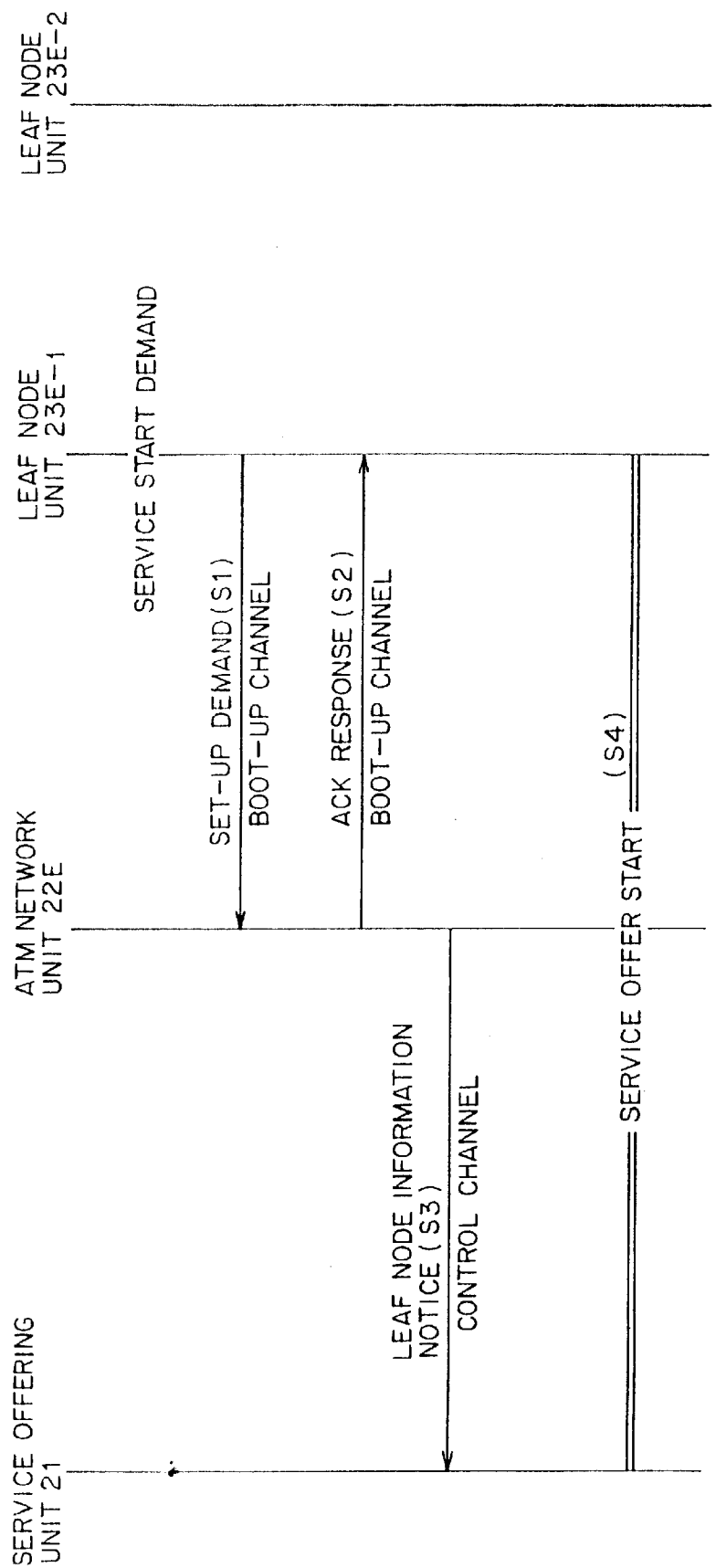
FIG. 65 is a signal sequence illustration for describing an operation of the seventh embodiment of this invention.

In the information offering system 20E having the SVC function, with the above-mentioned arrangements, at the turning-on of a power supply for the leaf node units 23E-1, 23E-2, the transmission and reception of a set-up signal [(S1) in FIG. 65] comprising an ATM cell 205 shown in (a) of FIG. 63 and an ACK response signal [(S2) in FIG. 65] comprising an ATM cell 206 shown in (b) of FIG. 63 are made between the leaf node units 23E-1, 23E-2 and the ATM network unit 22E.

Figure 66:
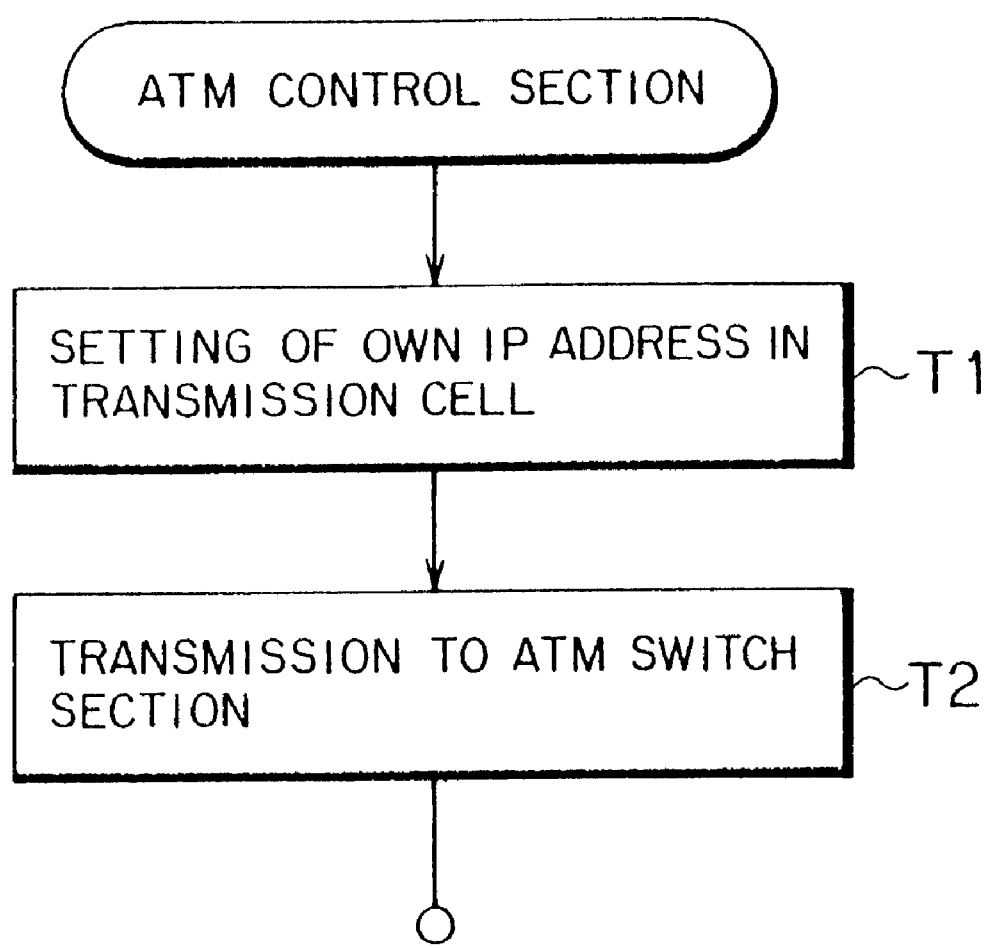
FIG. 66 is a flow chart for describing an operation of the seventh embodiment of this invention.

First, as shown in FIG. 66, in the leaf node units 23E-1, 23E-2, in response to the turning-on of the unit start-up power supply, the ATM control section 23b sets "00000001" indicative of a set-up demand cell in the value of a request type area 205B and further writes an IP address set uniquely to the own leaf node unit in the following 4-byte area, thereby creating the aforesaid ATM cell 205 (step T1).

More specifically, the ATM control section 23b is, as shown in (a) of FIG. 63, provided with a header area 205A (5 bytes) and a request type area 205B (1 byte), and for example, the ATM cell 205 comprising an IP address area 205C (4 bytes) for writing an IP address set uniquely to the leaf node unit and a non-used area 205D (43 bytes) is created as a set-up demand cell.

Thereafter, the created ATM cell 205 is transmitted as the set-up signal to the ATM network unit 22E (step T2).

Figure 67:
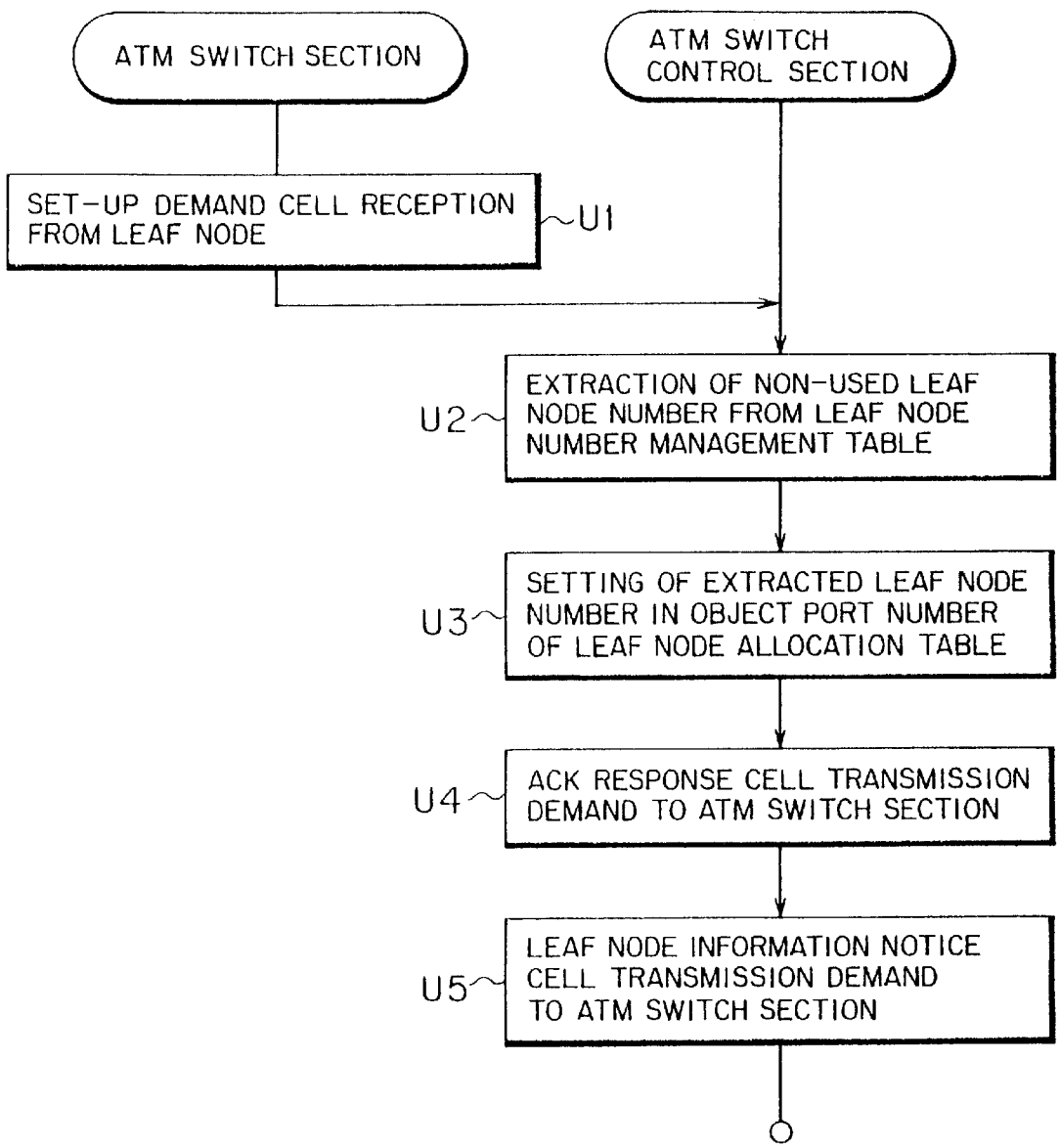
FIG. 67 is a flow chart for explaining an operation of the seventh embodiment of this invention.

Moreover, as shown in FIG. 67, an ATM switch section 22c of the ATM network unit 22E receives the set-up demand cells 205 from the leaf node units 23E-1, 23E-2 (step U1).

Then, an ATM switch control section 22d refers to the leaf node number management table 22ƒ-10 to extract an arbitrary non-used leaf node number as a leaf node number of the set-up demander (step U2).

In other words, when the ATM switch control section 22d of the ATM network unit 22 receives set-up signals from the leaf node units 23E-1, 23E-2, a non-used leaf node number is extracted as desired terminal identifying information (terminal identifying information extracting step).

Furthermore, the extracted leaf node number is registered with the leaf node allocation table 22ƒ-9 in a manner that the port numbers of the line connection ports (not shown) in which those leaf node units 23E-1, 23E-2 are set are used as the address information (step U3).

Whereupon, the ATM switch control section 22d gives a demand for the transmission of an ACK response cell to the ATM switch section 22c (step U4).

That is, an ACK response signal [see (S2) in FIG. 65] acting as a response signal to a set-up signal [see (S1) in FIG. 65] is produced using the leaf node number extracted in the ATM switch control section 22d (response signal producing step), and the produced ACK response signal is transmitted to the leaf node unit 23E-1 or 23E-2 which transmitted the foregoing set-up signal (response signal transmitting step).

The ATM cell (ACK response cell) 206 constituting the aforesaid set-up response signal is, as shown in (b) of FIG. 63, provided with a header area 205A (5 bytes) and a request type area 205B (1 byte) which are similar to those of the setup demand cell 205, and further is equipped with an area 206C for notice of the set leaf node number and a non-used area 206D (47 bytes) (the header area is omitted from the illustration).

Furthermore, the value "00000010" representative of the set-up response cell is set as the value of the request type area 206B set in the aforesaid ATM switch control section 22d.

Subsequently to the transmission of the aforesaid ACK response cell 206, the ATM switch section 22c transmits a leaf node information notice cell 207, for example, shown in FIG. 64 to the service offering unit 21 [step U5, see (S3) in FIG. 65].

In other words, the ATM switch section 22c notifies the information included in the set-up signal [see (S1) in FIG. 65] and the leaf node number being the terminal identifying information extracted as mentioned above to the service offering unit 21 (information notice step).

Figure 64:
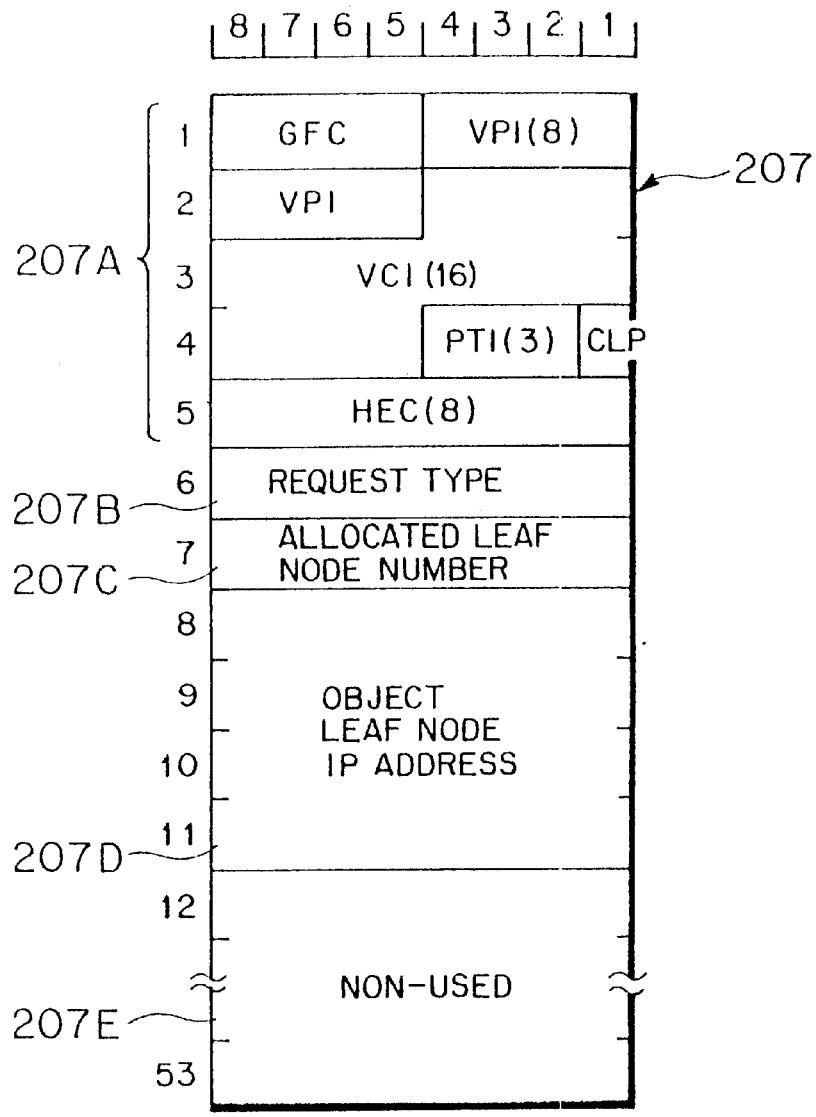

The leaf node information notice cell 207 shown in FIG. 64 is composed of a header area 207A, a request type area 207B (1 byte), an allocation leaf node number area 207C, an IP address area 207D, and a non-used area 207E (43 bytes).

In the aforesaid request type area 207B, for example. "10000001" is stored as the information for notifying that it is an ATM cell for the notice of the allocation result.

Thus, the VPI/VCI is set between the service offering unit 21 and the leaf node units 23E-1, 23E-2, and the leaf node number from the ATM network unit 22E to the leaf node units 23E-1, 23E-2 being the set-up signal sender is set and notified.

Thereafter, the respective leaf node units 23E-1, 23E-2 can receive the offer of a desired service from the service offering unit 21 [see (S4) in FIG. 65].

As described above, according to the seventh embodiment of this invention, in the information offering system 20E employing the SVC, the terminal identifying information is set through the set-up signal producing step, the set-up signal transmitting step, the registration step, the information notice step and the response signal transmitting step and the leaf node number being the terminal identifying information is easily set through the transmission and reception of the set-up signal and the response signal thereto, and therefore, if the leaf node number being the set terminal identifying information is inserted into the data transmitted and received after the setting of the VPI/VCI as in the case of the above-described second embodiment, the service offering unit 21 can identify the leaf node units 23E-1, 23E-2, thus providing advantages substantially similar to those of the second embodiment.

(i) Description of an Eighth Embodiment

Figure 68:
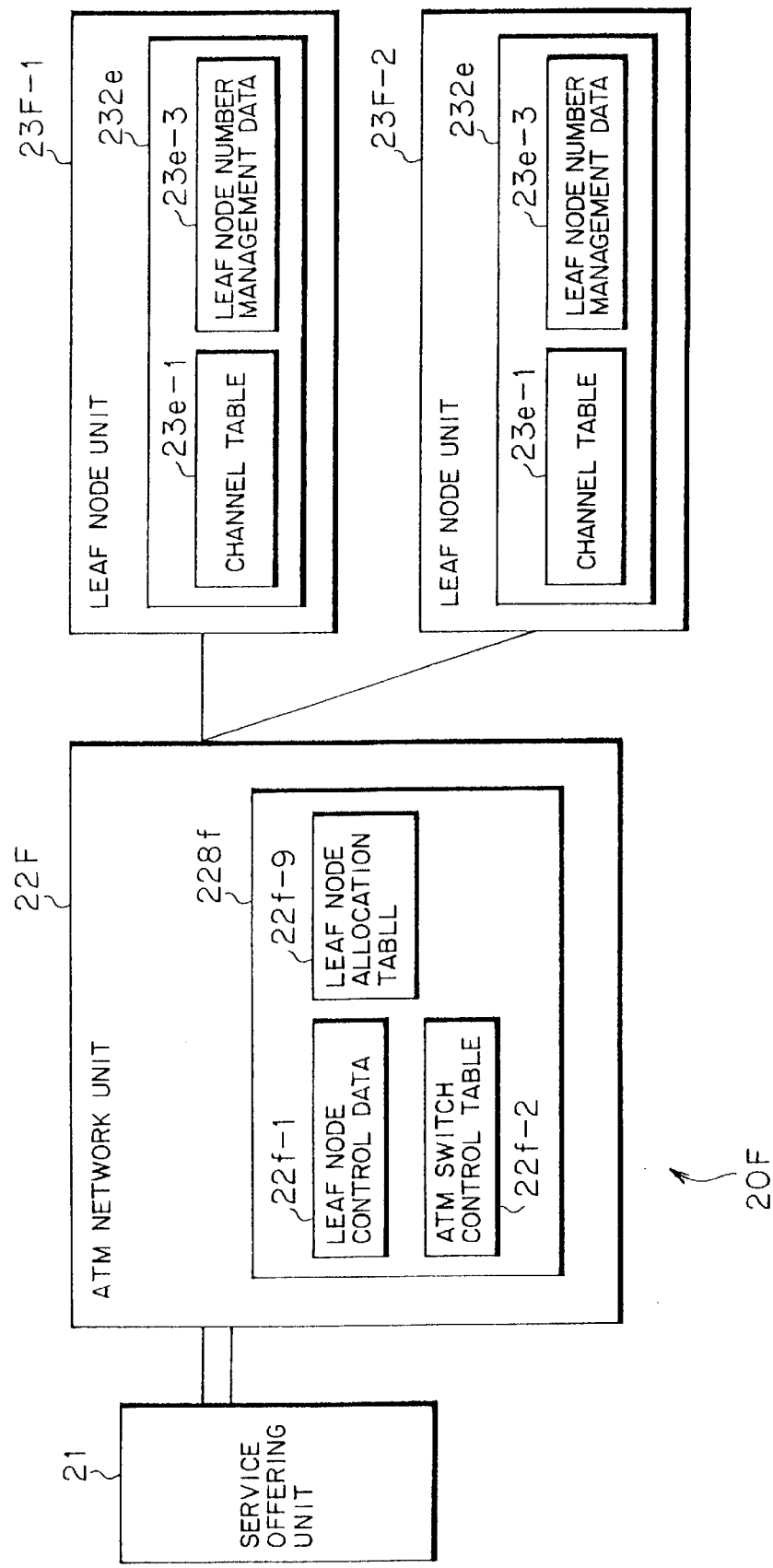
FIG. 68 is a block diagram showing an information offering system according to an eighth embodiment of the present invention.

FIG. 68 is a block diagram showing an information offering system 20F according to an eighth embodiment of the present invention. The information offering system 20F shown in FIG. 68 provides an SVC (Switched Virtual Channel) function as well as the above-described seventh embodiment, and is provided with a service offering unit 21, an ATM network unit 22F and leaf node units 23F-1, 23F-2.

The service offering unit 21 functions as an information offering unit to offer various information such as multimedia information to the leaf node units 23F-1, 23F-2 being the communication terminals as in the case of the seventh embodiment.

The ATM network unit 22F stores a plurality of leaf node units 23F-1, 23F-2, and offers, of the various information from the service offering unit 21, the information required from each of the leaf node units 23F-1, 23F-2 to that leaf node unit 23F-1 or 23F-2 through the use of the VPI/VCI set peculiarly to the information.

As compared with the information offering system 20E according to the seventh embodiment, the difference is that, in the information offering system 20F according to the eighth embodiment, the ATM network unit 22F does not manage the leaf node numbers, but each of the leaf node units 23F-1, 23F-2 manages its own leaf node number, and the other arrangements are substantially the same.

Thus, the ATM network unit 22F according to the eighth embodiment has a storage section 228f different from that of the unit (numeral 22E) in the seventh embodiment, and each of the leaf node units 23F-1, 23F-2 includes a storage section 232e different from that of the units (numerals 23E-1, 23E-2) in the seventh embodiment.

The arrangements other than the storage sections 228f, 232e of the ATM network unit 22F and the leaf node units 23F-1, 23F-2 are the same as those (see FIG. 22) in the above-described second embodiment, and are omitted from the illustration.

The storage section 228f of the ATM network unit 22F is provided with leaf node control data 22f-1, an ATM switch control table 22f-2 and a leaf node allocation table 22f-9 which are the same as those of the storage section (see numeral 231e) in the seventh embodiment.

Furthermore, the storage section 232e of each of the leaf node units 23F-1, 23F-2 is equipped with channel table 23e-1 similar to that (see numeral 231e) in the seventh embodiment and leaf node number management data 23e-3.

The leaf node number management data 23e-3 is for previously recording the leaf node numbers allocated to the respective leaf node units 23F-1, 23F-2.

In an ATM control section 23b of each of the leaf node units 23F-1 to 23F-2, on turning on the unit start-up power supply, a set-up signal is forwarded to the ATM network unit 22F so that the VPI/VCI for receiving the offer of a service gets into the set condition, whereas an allocated leaf node number placed in the leaf node number management data 23e-3 is inserted into an ATM cell constituting this set-up signal.

Figure 69:
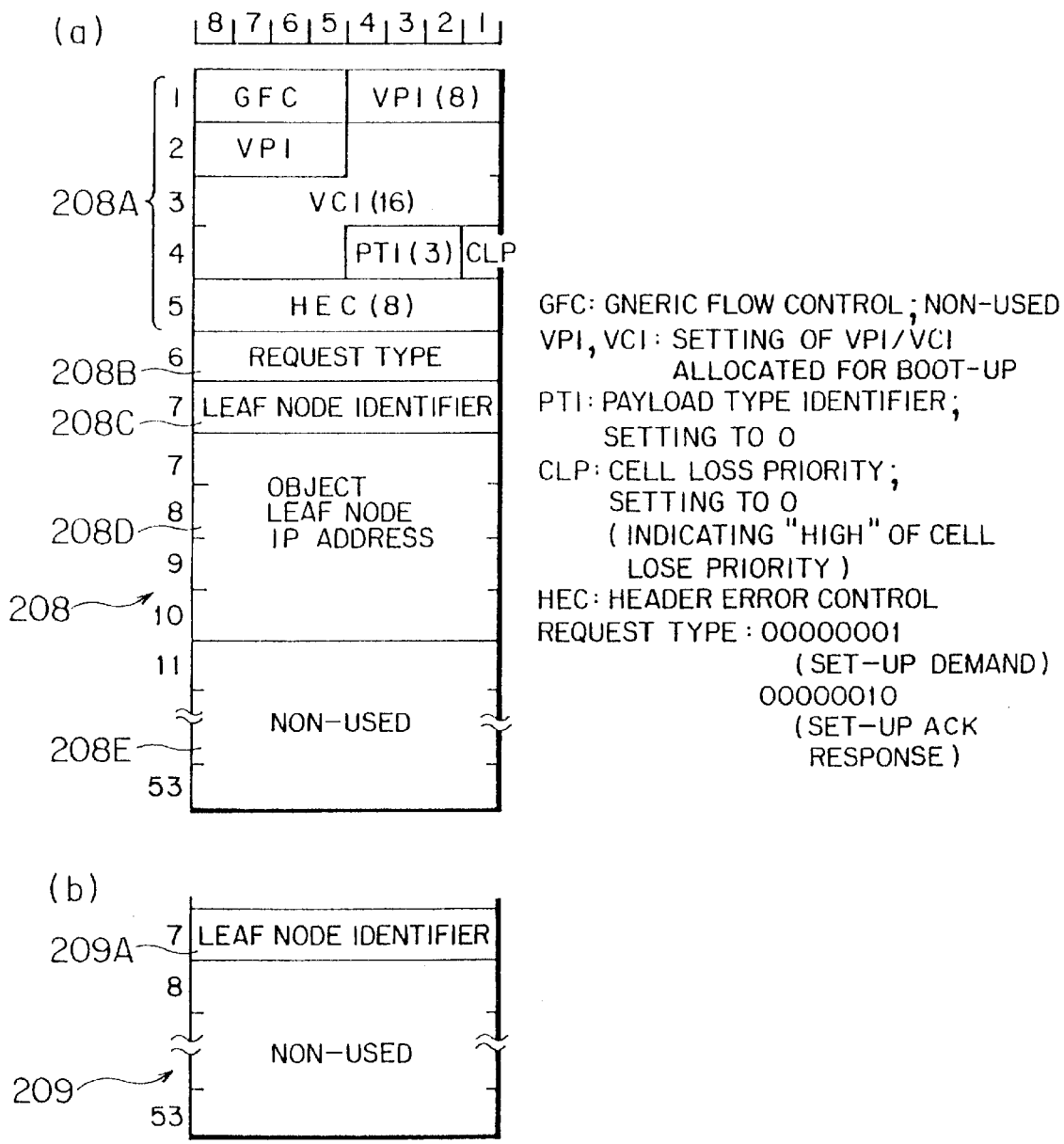
FIGS. 69($a$) and 69($b$) are illustrations of cell formats of an ATM cell transmitted and received in the eighth embodiment of this invention.

In the ATM cell 208 organizing this set-up signal, for example, as shown in (a) of FIG. 69, the allocated leaf node number put in the leaf node number management data 23e-3 is inserted into a 1-byte area 208C subsequent to the header area 208A (5 bytes) and a request type area 208B (1 byte).

A 4-byte area 208D following the aforesaid area 208C is, for example, an IP address area for writing an IP address set uniquely to the leaf node unit, and an area 208E is a non-used area.

Furthermore, in the ATM network unit 22F, when receiving the set-up signal as mentioned above, an ATM switch control section 22d produces as an ACK response signal an ATM cell 209 including an allocation-fixed leaf node number area 209A as shown in (b) of FIG. 69.

Figure 70:
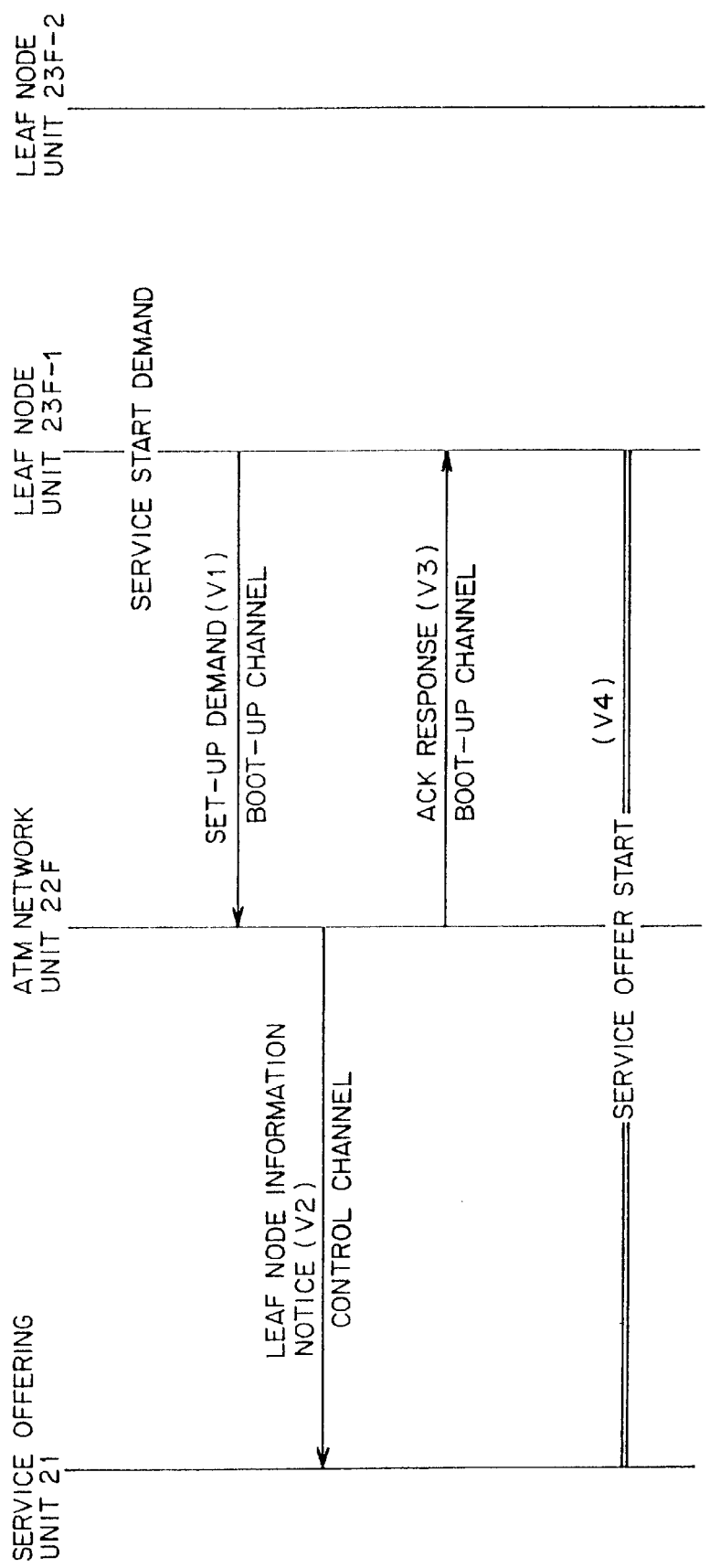
FIG. 70 is a signal sequence illustration for explaining an operation of the eighth embodiment of this invention.

In the information offering system 20F having the SVC function, with the above-described arrangements, at the turning-on of power supply for the leaf node units 23F-1, 23F-2, the transmission and reception of a set-up signal [(V1) in FIG. 70] comprising the ATM cell 208 as shown in (a) of FIG. 69 and an ACK response signal [(V3) in FIG. 70] comprising the ATM cell 209 as shown in (b) of FIG. 69 are done between the leaf node units 23F-1, 23F-2 and the ATM network unit 22F.

Figure 71:
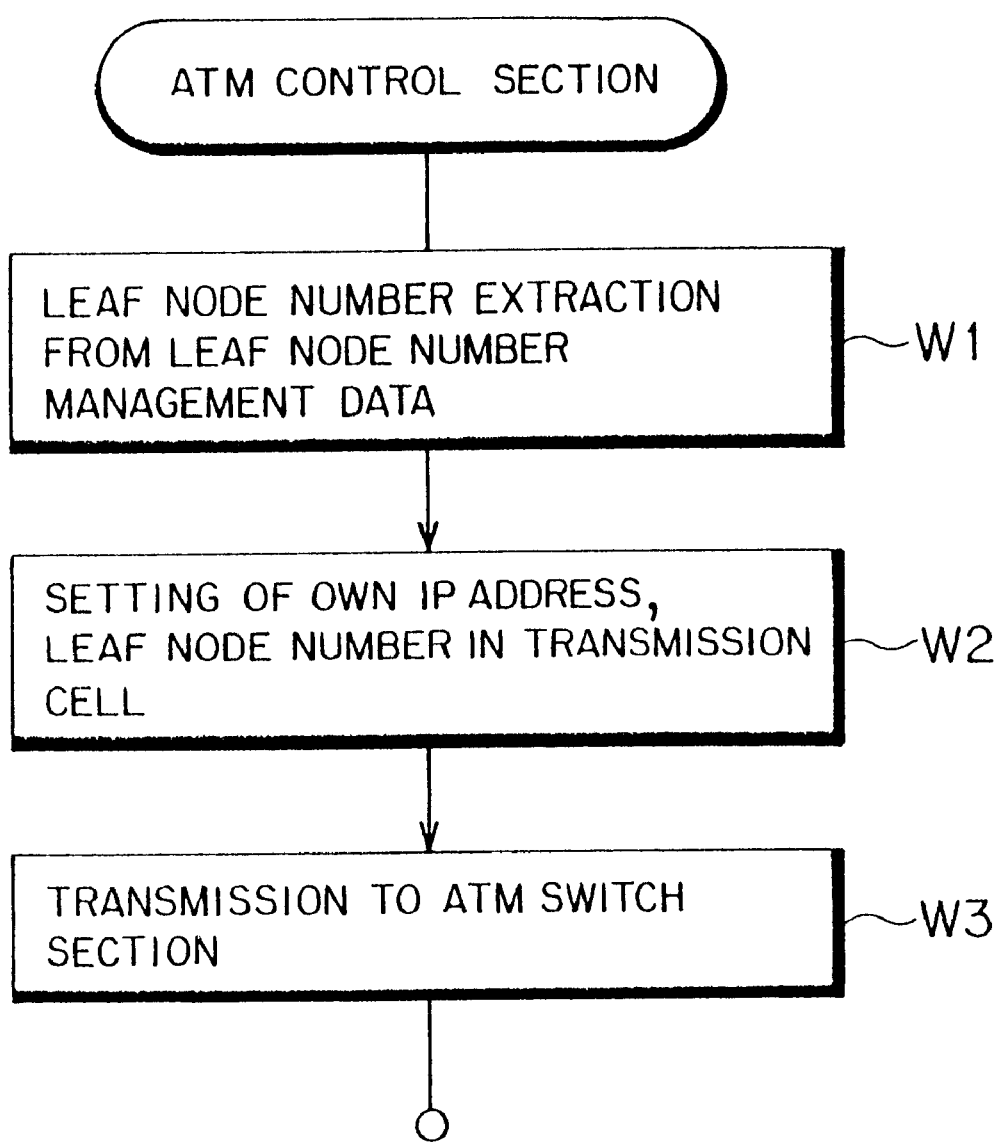
FIGS. 71 and 72 are flow charts for describing an operation of the eighth embodiment of this invention.

First, as shown in FIG. 71, in the leaf node units 23F-1, 23F-2, in response to the turning-on of the unit start-up power supply, the ATM control section 23b refers to the leaf node number management data 23e-3 to extract the leaf node number allocated to the own leaf node unit 23F-1 or 23F-2 (step W1).

Accordingly, the ATM control section 23b sets "00000001" indicative of the set-up signal in a request type area 208B and inserts the extracted leaf node number in an area 208C and further writes an IP address set uniquely to the own leaf node unit in the following 4-byte area 208D, thus creating the aforesaid ATM cell 208 (step W2).

That is, in the leaf node units 23F-1, 23F-2, the set-up signal is produced in a state of including the leaf node number acting as the preset terminal identifying information (set-up signal producing step).

Thereafter, the produced ATM cell 208 is transmitted as the set-up signal to the ATM network unit 22F (set-up signal transmitting step, step W3).

Figure 72:
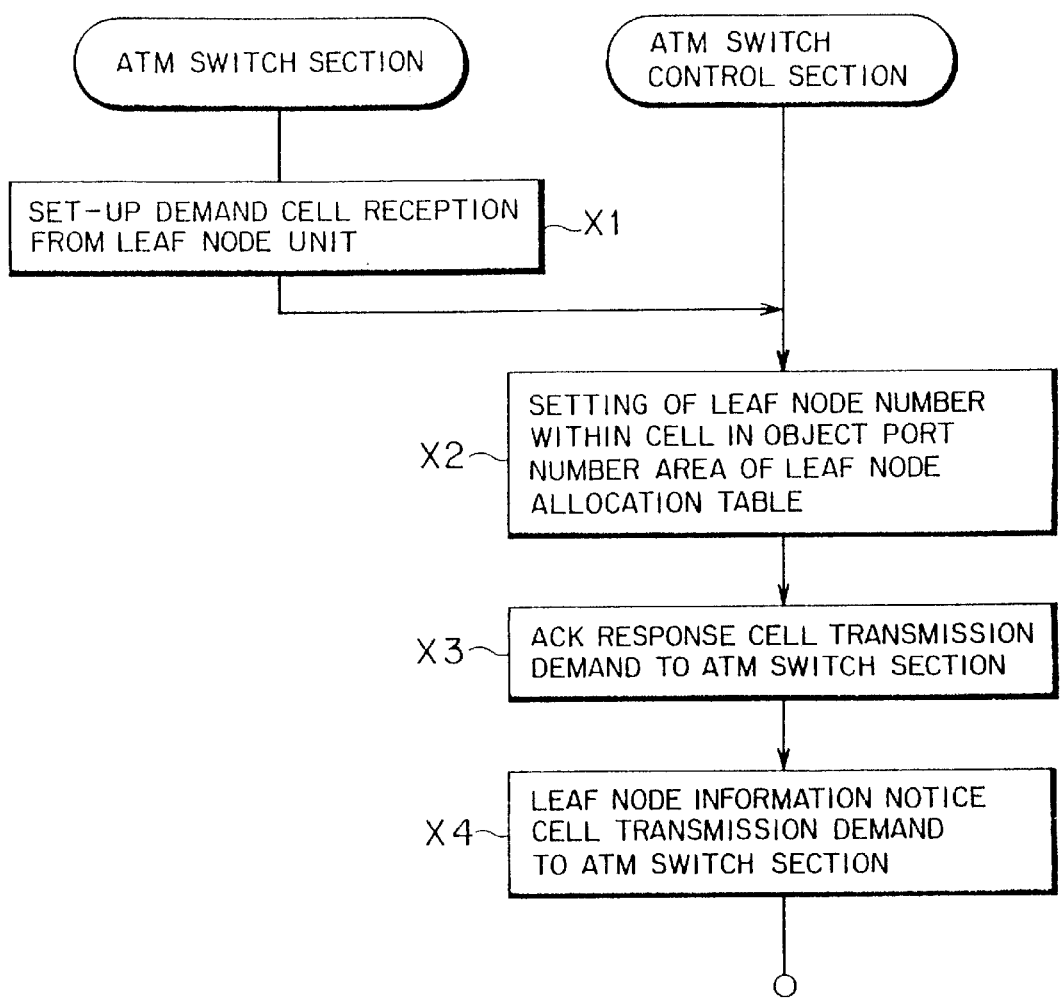

As shown in FIG. 72, when an ATM switch section 22c of the ATM network unit 22F receives the set-up demand cell 208 from the leaf node units 23F-1, 23F-2 (step X1), an ATM switch control section 22d registers it with the leaf node allocation table 22f-9 in a manner that the port number of the line connection port (not shown) in which that leaf node unit 23F-1 or 23F-2 is set is used as the address information (step X2).

That is, when the set-up signal [(V1) in FIG. 70] transmitted in the set-up signal transmitting step is received by the ATM network unit 22F, the ATM switch control section 22d registers the leaf node number being the terminal identifying information included in the set-up signal with the leaf node allocation table 22f-9 (registration step).

Thus, since the leaf node number of the leaf node unit 23F-1 or 23F-2 being the set-up signal sender is fixed, prior to the transmission of the ACK response cell to the leaf node units 23F-1, 23F-2, the aforesaid leaf node information notice cell 207 as shown in FIG. 64 is transmitted to the service offering unit 21 [step X3, see the step (V2) in FIG. 70].

In other words, when the leaf node number is registered with the leaf node allocation table 22f-9 in the registration step, the response signal to the set-up signal is transmitted to the leaf node unit 23F-1 or 23F-2 which transmitted the set-up signal (response signal transmitting step).

Thereafter, the ATM switch control section 22d issues a demand for the transmission of the ACK response cell 209 [see (b) of FIG. 69] to the ATM switch section 22c (step V3 in FIG. 70).

That is, the ATM switch control section 22d transmits the response signal to the set-up signal to the leaf node unit 23F-1 or 23F-2 which transmitted the set-up signal (response signal transmitting step).

Whereupon, the VPI/VCI is established between the service offering unit 21 and the leaf node units 23F-1, 23F-2, and further the leaf node number from the ATM network unit 22F to the leaf node unit 23F-1 or 23F-2 being the set-up signal sender is set and notified.

Incidentally, after this, each of the leaf node units 23F-1, 23F-2 can receive the offer of a desired service from the service offering unit 21 [see (V4) in FIG. 70].

As described above, according to the eighth embodiment, in the information offering system 20F employing the SVC, the terminal identifying information is set through the set-up signal producing step, the set-up signal transmitting step, the registration step, the information notice step and the response signal transmitting step so that the leaf node number being the terminal identifying information is easily set through the transmission and reception of the set-up signal and the response signal thereto, and therefore, if, as in the case of the above-described first embodiment, the leaf node number being the terminal identifying information is put in the data transmitted and received after the setting of the VPI/VCI, the service offering unit 21 can identify the leaf node units 23F-1, 23F-2, thus providing the advantages substantially similar to those of the first embodiment.

(j) Others

Although in the information offering systems 20, 20A to 20F according to the first to fifth, seventh and eighth embodiments, the examples of carrying out the questionnaire collection or the audience research are described in detail as the applicable additional services, the present invention is also applicable to various additional services such as the purchase application procedures from the users in connection with a television shopping broadcast and the imposition processing and others which can be considered for between the service offering side and the users.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A communication terminal for an information for an information offering system structured with an asynchronous transfer mode (ATM) network and including (i) a plurality of communication terminals including said communication terminal, (ii) at least one network unit communicatably connected with said the individual communciation terminals, and (iii)an information offering unit, communicatable connected with the at least one network unit, for offering object information to the individual communication terminals downstream through a virtual path (VP) and a virtual channel (VC) both specific to the object information, said communication terminal comprising:

(a) an inserting section for inserting a terminal ID information, which identifies said communication terminal as a sender, into data to be transmitted from said communication terminal to said information offering unit upstream through said VP and VC; and (b) a transmitting section for tsitting upstream through said VP and VC, via which the offered object information had been received by said communication terminal, the data with the ID information inserted by said inserting section.

2. A communication terminal according to claim 1, wherein said ID information inserting section is operable to insert said ID information into a data portion of a fixed-length cell that constitutes the original offer-information-served-end data.

3. A communication terminal according to claim 1, wherein said ID information inserting section is operable to insert said ID information into an unused region of a header portion of a fixed-length cell that constitutes the original offer-information-served-end data.

4. A communication terminal according to claim 1, wherein said ID information inserting section is operable to insert said ID information into a fixed-length cell for purposes of system maintenance.

5. A communication terminal according to claim 1, wherein said ID information is information peculiar to a respective one leaf node of said communication terminals.

6. A communication terminal according to claim 1, wherein said ID information is peculiar to a respective one of communication terminal groups each comprising a number of leaf nodes of said communication terminals.

7. A communication terminal according to claim 1, wherein said ID information comprises variable-length bit data.

8. A communication terminal according to claim 1, wherein said ID information is alterable in accordance with an instruction from said information offering unit.

9. A network unit for an information offering system structured with an asynchronous transfer mode (ATM) network and including (i) a plurality of communication terminals, (ii) at least one network unit including said network unit and communicatably connected with the individual communication terminals, and (iii) an information offering unit, communicatably connected with the at least one network unit, for offering object information to the individual communication terminals each downstream through a virtual path (VP) and a virtual channel (VC) both specific to the object information, said communication terminal comprising:

(a) a plurality of connection ports, communicatably connected one with each of the communication terminals, for indicating which connection port has received data from an individual communication terminal;

(b) an inserting section for inserting a terminal ID information, which identifies said individual communication terminal as a sender, into data which had been received from said individual communication terminal to the information offering unit upstream through said VP and VC based on the result of indication as to which individual connection port has received the data from said individual communication terminal, and (iii) a transmitting section for transmitting upstream though said VP and VC, via which the offered object information had been received by said network unit, the data with the ID information inserted by said inserting section.

10. A network unit in said information offering system as defined in claim 9, wherein said identifying information inserting section includes:

an identifying information table for storing said terminal identifying information corresponding to the port numbers of said line connection ports;

a port state storing section for storing information about the in-use/out-of-use conditions of said line connection ports;

a port number extracting section for, when data for said information offering unit is inputted to said line connection port which is in use, extracting said port number of said line connection port to which said data is inputted from said port state storing section;

an identifying information extracting section for extracting said terminal identifying information corresponding to said port number extracted in said port number extracting section by referring to said identifying information table; and an inserting section for inserting said terminal identifying information, extracted in said identifying information extracting section, into said data.

11. A network unit in said information offering system as defined in claim 9, wherein said identifying information inserting section is made to insert said terminal identifying information into a data portion of a fixed-length cell constituting said data.

12. A network unit in said information offering system as defined in claim 9, wherein said identifying information inserting section is made to insert said terminal identifying information into a non-used area of a header portion of a fixed-length cell constituting said data.

13. A network unit in said information offering system as defined in claim 9, wherein said identifying information inserting section is made to insert said terminal identifying information into a fixed-length cell for system maintenance and operation.

14. A network unit in said information offering system as defined in claim 9, wherein said terminal identifying information is information specific to each of said communication terminals.

15. A network unit in said information offering system as defined in claim 9, wherein said terminal identifying information is information indicative of the fact that said network unit itself stores said communication terminal.

16. A network unit in said information offering system as defined in claim 9, wherein said terminal identifying information is information specific to each of communication termianl groups comprising said communication terminals.

17. A network unit in said information offering system as defined in claim 9, wherein said terminal identifying information is composed of variable-length bit data.

18. A network unit in said information offering system as defined in claim 9, wherein an inserting mode of said terminal identifying information into said data is variable in accordance with an instruction from said information offering unit.

19. A terminal identifying information setting method for an information offering system structured with an asynchronous transfer mode (ATM) network and including (i) a plurality of communication terminals, (ii) at least one network unit communicatably connected with the communication terminals, and (iii) an information offering unit for offering object information to the individual communication terminals each downstream through a virtual path (VP) and a virtual channel (VC) both specific to the object information, said method comprising the steps of:

at the network unit,
(a) receiving a setup signal from the individual communication terminal;
(b) selecting available terminal ID information from a table based on the received setup signal;
(c) producing a response signal to notify the individual communication terminal of the selected terminal ID information;
(d) transmitting the produced response signal to the individual communication terminal so as to assign said selected terminal ID information to the individual communication terminal which bad transmitted said setup signal; and
(e) notifying information which is included in the received setup signal and the assigned terminal ID information to the information offering unit upstream through said VP and VC.

20. A terminal identifying information setting method for an information offering system structured with an asynchronous transfer mode (ATM) network and including (i) a plurality of communication terminals, (ii) at least one network unit, communicatably connected with the individual communication terminals, and (iii) an information offering unit, communicatably connected with the individual communication terminals via the at least one network, for offering object information to the individual communication terminals each downstream through a virtual path (VP) and a virtual channel (VC) both specific to the object information, said method comprising the steps of:

at each of the communication terminals,
(a) producing a setup signal including preset own-terminal ID information;
(b) transmitting the produced setup signal to the network unit upstream through said VP and VC;

at the network unit,
(c) receiving said setup signal produced by and transmitted from each said communication terminal;
(d) registering said own-terminal ID information included in the received setup signal;
(e) notifying information included in said received setup signal to the information offering unit upstream through said VP and VC; and
(f) transmitting a response signal to each said communication terminal, which had transmitted said setup signal, so as to notify each said communication terminal that said registering has been completed.

21. An information offering system structured with an asynchronous transfer mode (ATM) network, comprising:
(i) a plurality of communication terminals;
(ii) at least one network unit communicatably connected with the individual communication terminals;
(iii) an information offering unit, communicatably connected with said at least one network unit, for offering object information to the individual communication terminals each downstream through a virtual path (VP) and a virtual channel (VC) both specific to the object information;
(iv) an identifying information inserting section, provided in one of said individual communication terminal and/or said network unit, for inserting a terminal ID information, which identifies said individual communication terminal as a sender, into a fixed-length cell to be transmitted from said individual communication terminal to said information offering unit upstream through said VP and said VC, via which the offered object information had been received by said individual communication terminal; and
(v) a transmission terminal identifying section, provided in said information offering unit, for identifying said individual communicating terminal as the sender based on said terminal identifying information inserted in the fixed-length cell transmitted by said individual communication terminal.

22. An information offering system as defined in claim 21, wherein at least one high-rank network unit capable of accommodating a plurality of network units including said network unit is placed as a host network unit, and data from each of said communication terminals is transmitted through said network unit and said high-rank network unit to said information offering unit.

23. An information offering system as defined in claim 22, wherein said high-rank network unit converts said terminal identifying information included in said data from said network unit into identifying information, said host network unit manages, and transmits the converted identifying information.

24. An information offering system as defined in claim 22, wherein one of said high-rank network unit and said network unit specific sets said terminal identifying information at every communication terminal group comprising said communication terminals arbitrarily selected.

25. A set of transmitting and receiving units, communicatably connected with each other through an asynchronous transfer mode (ATM) network, for an information communication system which comprises:
  at a transmitting side,
    (i) a plurality of first communication terminals communicatably connected with each other via a non-ATM network with a first protocol;
    (ii) said transmitting unit communicatably connected with the individual first communication,
      (a) a first outputting section for outputting a first terminal ID information to be included in data received from the individual first communication terminal and written in said first protocol, and for converting the received data written in said first protocol to data written in the ATM protocol,
      (b) a second extracting section for extracting a second terminal ID information written in the ATM protocol based on said first terminal ID information, and
      (c) a second inserting section for inserting the extracted second terminal ID information into the ATM-protocol data,
  at a receiving side,
    (iii) a plurality of second communication terminals communicatably connected with each other via a non-ATM network with a second protocol; and
    (iv) said receiving unit communicatably connected with the individual second communication terminals via the second protocol network including
      (d) a third deriving section for deriving, from the received ATM-protocol data, a third terminal ID information indicating a target communication terminal included in said second communication terminals, and for converting the received ATM-protocol data to data written in said second protocol extracting a fourth terminal ID information, which indicates said target communication terminal and is written in said second protocol, based on the derived third terminal ID information, and (f) a fourth inserting section for inserting the extracted fourth terminal ID information into the second-protocol data.

26. A fixed-length cell transmitting and receiving unit according to claim 25, further comprising an identifying information table for storing one of a corresponding relation between said first terminal identifying information and said second terminal identifying information and a corresponding relation between said third terminal identifying information and said fourth terminal identifying information so that the information-to-fixed-length-cell conversion by said first-terminal-identifying-information converting section or the fixed-length-cell-to-information conversion by said fourth-terminal-identifying-information converting section takes place based on the contents of said identifying information table.

27. A fixed-length cell transmitting and receiving unit according to claim 25, wherein the insertion by said second terminal identifying information inserting section is such that said second terminal identifying information is inserted into a data portion of the fixed-length cell.

28. A fixed-length cell transmitting and receiving unit according to claim 25, wherein the insertion by said second terminal identifying information inserting section is such that said second terminal identifying information is inserted into a non-used area of a header portion of the fixed-length cell.

29. A fixed-length cell transmitting and receiving unit according to claim 25, wherein said second terminal identifying information is information peculiar to each of said communication terminals.

30. A fixed-lenght cell transmitting and receiving unit according to claim 25, wherein said second terminal identifying information is information peculiar to each of a communication terminal groups composed of a plurality of communication terminals.

31. A fixed-length cell transmitting and receiving unit according to claim 25, wherein said second terminal identifying comprises variable-length bit data.

\* \* \* \* \*

UNITED STATES PATENT AND TRADEMARK OFFICE
CERTIFICATE OF CORRECTION

PATENT NO. : 6,226,681 B1
DATED : May 1, 2001
INVENTOR(S) : Masayuki Koga et al.

It is certified that error appears in the above-identified patent and that said Letters Patent is hereby corrected as shown below:

Column 49,
Line 56, delete "for an information"
Line 61, change "commuciation" to -- communication --
Lines 62-63, change "communicatable" to -- communicatably --

Column 50,
Line 6, change "tsitting" to -- transmitting --

Column 53,
Line 27, change "communication," to -- communication terminals via said first protocol network and including --

Column 54,
Lines 4-5, change "protocol" to -- protocol, (e) a fourth extracting section for --

Signed and Sealed this

Eighteenth Day of March, 2003

JAMES E. ROGAN
*Director of the United States Patent and Trademark Office*